US009169981B1

(12) United States Patent
McCollum et al.

(10) Patent No.: US 9,169,981 B1
(45) Date of Patent: Oct. 27, 2015

(54) LED LAMP AND LED LIGHTING ASSEMBLY

(71) Applicant: Rambus Delaware LLC, Brecksville, OH (US)

(72) Inventors: Timothy A. McCollum, Avon Lake, OH (US); Laszlo A. Takacs, San Mateo, CA (US); Gregg M. Podojil, Cleveland, OH (US); Matthew R. Wancata, Strongsville, OH (US); Fumitomo Hide, San Jose, CA (US); Christopher R. Ruhland, Chicago, IL (US); Jeffery R. Parker, Pleasanton, CA (US)

(73) Assignee: Rambus Delaware LLC, Brecksville, OH (US)

( * ) Notice: Subject to any disclaimer, the term of this patent is extended or adjusted under 35 U.S.C. 154(b) by 0 days.

(21) Appl. No.: 14/683,707

(22) Filed: Apr. 10, 2015

Related U.S. Application Data

(63) Continuation of application No. 14/041,561, filed on Sep. 30, 2013, now Pat. No. 9,028,129.

(60) Provisional application No. 61/708,360, filed on Oct. 1, 2012, provisional application No. 61/720,452, filed on Oct. 31, 2012, provisional application No. 61/740,725, filed on Dec. 21, 2012, provisional application No. 61/813,600, filed on Apr. 18, 2013, provisional application No. 61/830,752, filed on Jun. 4, 2013, provisional application No. 61/842,571, filed on Jul. 3, 2013, provisional application No. 61/842,714, filed on Jul. 3, 2013.

(51) Int. Cl.
F21K 99/00 (2010.01)
F21V 8/00 (2006.01)

(52) U.S. Cl.
CPC ............... *F21K 9/52* (2013.01); *G02B 6/0036* (2013.01); *G02B 6/0073* (2013.01); *G02B 6/0075* (2013.01); *G02B 6/0086* (2013.01)

(58) Field of Classification Search
CPC ...... F21K 9/52; G02B 6/0036; G02B 6/0073; G02B 6/0075; G02B 6/0086
See application file for complete search history.

(56) References Cited

U.S. PATENT DOCUMENTS

| 2011/0309735 | A1* | 12/2011 | Parker et al. | 313/46 |
| 2012/0139403 | A1* | 6/2012 | Johnston et al. | 313/46 |
| 2012/0236596 | A1* | 9/2012 | Parker et al. | 362/609 |
| 2014/0092580 | A1* | 4/2014 | McCollum et al. | 362/84 |

* cited by examiner

Primary Examiner — Mary Ellen Bowman
(74) Attorney, Agent, or Firm — Renner, Otto, Boisselle & Sklar, LLP

(57) ABSTRACT

An LED lamp or LED lighting assembly includes a light guide having opposed major surfaces configured to propagate light by total internal reflection and a light input edge extending between the major surfaces. A light source is adjacent to the light input edge and is configured to edge light the light guide. In some embodiments, the light source is moveable relative to the light input edge, and the spectrum of the light output from the light guide may be adjusted by movement of the light source relative to the light input edge.

20 Claims, 43 Drawing Sheets

LED LAMP AND LED LIGHTING ASSEMBLY

RELATED APPLICATION DATA

This application is a continuation of U.S. patent application Ser. No. 14/041,561, filed Sep. 30, 2013, which claims the benefit of U.S. Provisional Patent Application No. 61/708,360, filed Oct. 1, 2012; claims the benefit of U.S. Provisional Patent Application No. 61/720,452, filed Oct. 31, 2012; claims the benefit of U.S. Provisional Patent Application No. 61/740,725, filed Dec. 21, 2012; claims the benefit of U.S. Provisional Patent Application No. 61/813,600, filed Apr. 18, 2013; claims the benefit of U.S. Provisional Patent Application No. 61/830,752, filed Jun. 4, 2013; claims the benefit of U.S. Provisional Patent Application No. 61/842,571, filed Jul. 3, 2013; and claims the benefit of U.S. Provisional Patent Application No. 61/842,714, filed Jul. 3, 2013; the disclosures of which are incorporated herein by reference in their entireties.

BACKGROUND

Energy efficiency has become an area of interest for energy consuming devices. One class of energy consuming devices is lighting devices. Light emitting diodes (LEDs) show promise as energy efficient light sources for lighting devices. But control over the spectrum of the light output from the lighting devices is an issue for lighting devices that use LEDs or similar light sources.

DESCRIPTION

Figure 1:
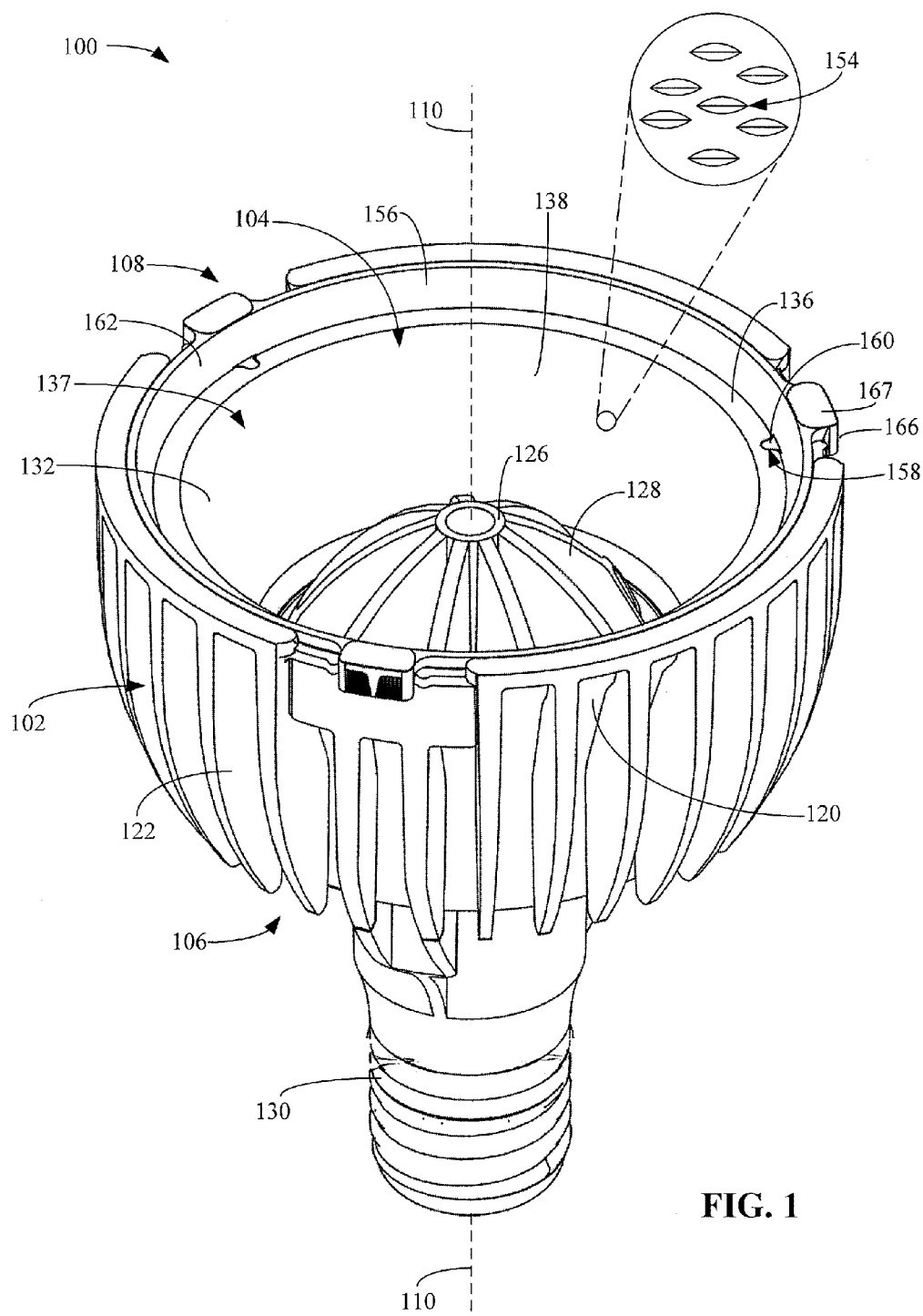
FIG. 1 is a schematic perspective view of an exemplary LED lamp.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments. In this disclosure, angles of incidence, reflection, and refraction and output angles are measured relative to the normal to the surface.

Figure 2:
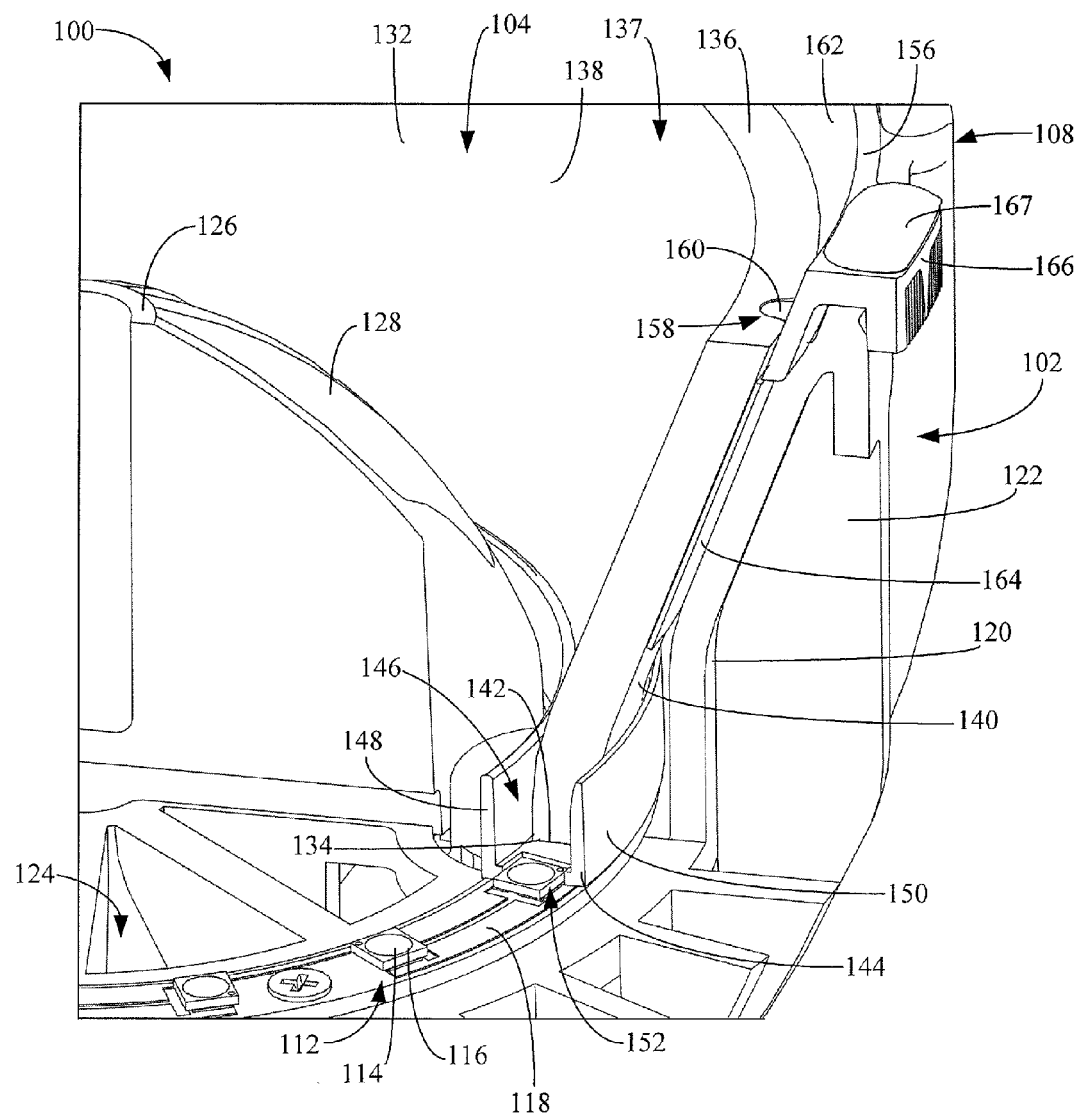
FIG. 2 is a schematic perspective view of a portion of the LED lamp of FIG. 1, shown in cut-away.
Figure 3:
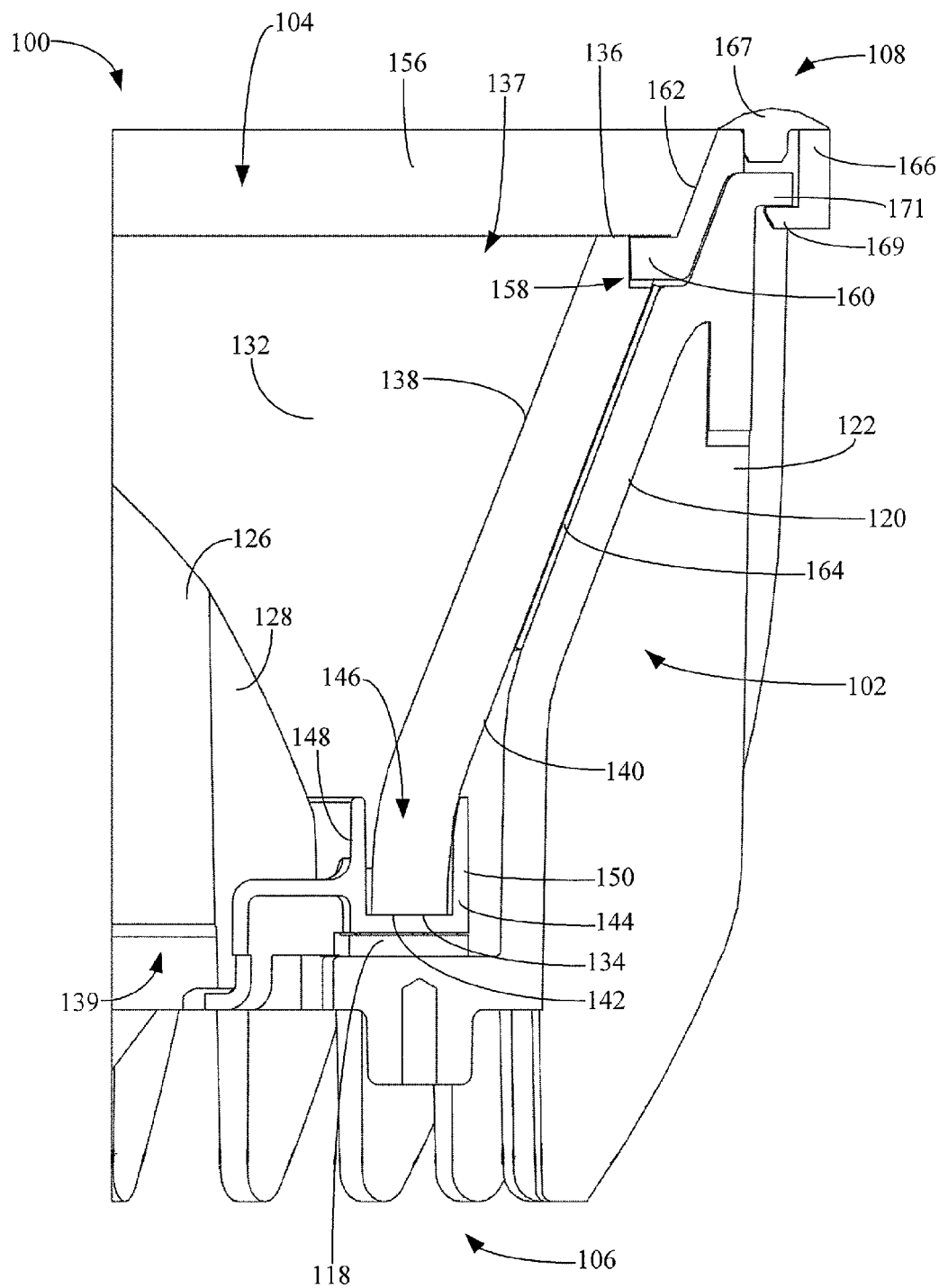
FIG. 3 is a schematic side view of a portion of the LED lamp of FIG. 1, shown in cross-section.

With initial reference to FIGS. 1-3, an exemplary LED lamp is shown at 100. References in this disclosure to a "LED lamp" are meant to broadly encompass light-producing devices that fit into and engage any of various fixtures used for mechanically mounting the light-producing device and for providing electrical power thereto. Examples of such fixtures include, without limitation, a screw-in fixture for engaging an Edison light bulb base, a bayonet fixture for engaging a bayonet light bulb base, and a bi-pin fixture for engaging a bi-pin light bulb base. The term "LED lamp," by itself, does not provide any limitation on the shape of the light-producing device. In the embodiment shown in FIGS. 1-3, the LED lamp conforms to an outer envelope of a parabolic aluminized reflector (PAR) lamp. In other embodiments, the LED lamp conforms to an outer envelope of an A-series lamp. Sometimes, the term "LED lamp" is used interchangeably with the term "LED light bulb." Light is generated from electric power by light emitting diodes (LEDs) or other solid state light emitters such as organic light emitting diodes (OLEDs). Also, the LED lamp need not have an enclosed envelope forming an environment for light generation. The LED lamp may conform to American National Standards Institute (ANSI) or other standards for electric lamps, but the LED lamp does not necessarily have to have this conformance.

The LED lamp 100 includes a housing 102. The housing 102 is configured as an open-ended hollow body surrounding an internal volume 104. The housing extends between a proximal end 106 and a distal end 108 and defines a longitudinal axis 110.

As shown in FIG. 2, the housing 102 retains a light source assembly 112. The light source assembly 112 is disposed in the internal volume 104 of the housing 102 proximate the proximal end 106 of the housing 102. The light source assembly 112 includes light sources 114. Each light source 114 is embodied as one or more solid-state light emitters 116. Exemplary solid-state light emitters 116 include such devices as LEDs and organic LEDs (OLEDs). In an embodiment where the solid-state light emitters 116 are LEDs, the LEDs may be top-fire LEDs or side-fire LEDs, and may be broad spectrum LEDs (e.g., white light emitters) or LEDs that emit light of a desired color or spectrum (e.g., red light, green light, blue light, or ultraviolet light), or a mixture of broad-spectrum LEDs and LEDs that emit narrow-band light of a desired color. In one embodiment, the solid-state light emitters 116 emit light with no operably-effective intensity at wavelengths greater than 500 nanometers (nm) (i.e., the solid-state light emitters 116 emit light at wavelengths that are predominantly less than 500 nm). In some embodiments, the solid-state light emitters 116 constituting light source assembly 112 all generate light having the same nominal spectrum. In other embodiments, at least some of the solid-state light emitters 116 constituting light source assembly 112 generate light that differs in spectrum from the light generated by the remaining solid-state light emitters 116. For example, two different types of solid-state light emitters 116 are alternately located along the light source assembly 112. Other LED lamps described herein may include similar features.

Although not illustrated in detail, the light source assembly 112 also includes structural components to retain the light sources 114. In the embodiment shown, the light sources 114 are mounted to a printed circuit board (PCB) 118, which is mounted to the housing 102. The light source assembly 112 may additionally include circuitry, power supply, electronics for controlling and driving the solid-state light emitters 116, and/or any other appropriate components. Other LED lamps described herein may include similar features.

The housing 102 is thermally coupled to the light source assembly 112. In an example, such thermal coupling is provided by direct contact between the light source assembly 112 and the housing 102. Such direct contact may be enhanced by the use of a suitable thermal compound. In another example, thermal coupling is provided by using a secondary device, such as a heat pipe, to transfer heat produced by the light source assembly 112 to the housing 102. Other housings described herein may include similar features.

In some embodiments, the housing 102 is shaped to provide an increased surface area available for cooling. In such cases, the housing 102 functions as a secondary heat sink. In the embodiment shown in FIGS. 1-3, for example, the outer surface 120 of the housing includes radial fins 122 oriented parallel to the longitudinal axis 110 and extending radially outward. Air flow past radial fins 122 provides some cooling. Vents 124 (FIG. 2) extend through the housing 102 proximate the proximal end 106 and connect to the internal volume 104 of the housing 102 to provide a path for air flow and convection cooling into the internal volume 104. When the LED lamp 100 is oriented with its longitudinal axis 110 vertical (e.g., as shown in FIG. 1), the cooling air flow is an axial flow through the vents 124 and into the internal volume 104. When the orientation of the LED lamp 100 is inverted, the cooling air flow is reversed.

In some embodiments, the housing 102 includes a primary heat sink 126 disposed within the internal volume 104. In the embodiment shown in FIGS. 1-3, for example, the heat sink 126 includes radial fins 128 oriented parallel to the longitudinal axis 110 and extending radially outward. The cooling air flowing through internal volume 104 (e.g., air that enters the internal volume through the vents 124) flows past the heat sink 126 disposed therein. The number and thickness of the fins 128 are chosen such that there is sufficient space between the fins 128 to provide a path for air flow and convective cooling.

A base 130 is coupled to the proximal end 106 of the housing 102. The base 130 is configured to mechanically mount the LED lamp 100 and receive electrical power. In the illustrated example, the base 130 is an Edison screw base. In other examples, the base 130 is a bayonet base, a bi-pin base, or any other suitable configuration to mechanically mount the LED lamp 100 and receive electrical power. Other LED lamps described herein may include similar features.

The LED lamp 100 includes a light guide 132. The light guide 132 is disposed within the internal volume 104 of the housing 102. The light guide 132 is a solid article of manufacture made from, for example, polycarbonate, poly(methylmethacrylate) (PMMA), glass, or other appropriate material. The light guide may also be a multi-layer light guide having two or more layers that may differ in refractive index. In some embodiments, the light guide is a single element. In other embodiments, the light guide includes light guide segments that collectively form the light guide.

The light guide 132 is configured as an open-ended hollow body extending along the longitudinal axis 110 between a proximal end 134 and a distal end 136. In the embodiment shown, the light guide includes an opening 137 at the distal end 136 of the light guide 132 and an opening 139 at the proximal end 134 of the light guide 132. In other embodiments, the light guide may include only one of the openings 137, 139. The light guide 132 includes an inner major surface 138 and an outer major surface 140 opposite the inner major surface 138. The major surfaces 138, 140 extend along the longitudinal axis 110 between the proximal end 134 and the distal end 136. The major surfaces 138, 140 of the light guide 132 may curve about at least one of an axis orthogonal to the longitudinal axis 110 and an axis parallel to the longitudinal axis 110. In the illustrated embodiment, the light guide 132 is substantially frustoconical in shape. However, a portion of the major surfaces 138, 140 of the light guide extending in the longitudinal direction proximate the proximal end 134 has a smaller apex angle than other portions of the light guide 132. A radial dimension of the inner major surface 138 of the light guide 132 at the distal end 136 is larger than the radial dimension of the inner major surface 138 of the light guide 132 at the proximal end 136. In other embodiments, the light guide is cylindrical, a frustrated pyramid, a bell shape, an hourglass shape, or another suitable shape. In the example of LED lamp 100, the light guide 132 is shown as being substantially constant thickness between the proximal end 134 and the distal end 136. Alternatively, the light guide can decrease in thickness (taper) from the proximal end to the distal end. The taper causes some light to be extracted from the light guide. Other light guides described herein may include similar features.

The major surfaces 138, 140 of the light guide 132 each have a cross-sectional shape that is substantially circular (e.g., the light guide 132 has an annular cross-sectional shape) for any cross-section taken perpendicular to the longitudinal axis 110. The light guide can therefore be rotated about the longitudinal axis 110 (e.g., for spectrum-adjustable examples described below)

The length and circumference dimensions of each of the major surfaces 138, 140 are greater, typically ten or more times greater, than the thickness of the light guide 132. The thickness is the dimension of the light guide 132 in a direction orthogonal to the major surfaces 138, 140. The thickness of the light guide 132 may be, for example, about 0.1 millimeters (mm) to about 10 mm.

With specific reference to FIGS. 2 and 3, an edge at the proximal end 134 of the light guide 132 provides a light input edge 142 through which light from light sources 114 is input to the light guide 132. Each light source 114 is configured to edge light the light guide 132 such that light from the light source 114 enters the light input edge 142 and propagates along the light guide 102 by total internal reflection at the inner major surface 138 and the outer major surface 140.

The proximal end 134 of the light guide 132 is retained in a position adjacent to the light source assembly 112 by a proximal end retaining member 144. In this case the proximal end retaining member may also be called the light input end retaining member. In the embodiment shown, the proximal end retaining member 144 includes a recess 146 defined by concentric side walls 148, 150 in which the proximal end 134 of the light guide 132 is disposed. In other embodiments (not shown), the proximal end retaining member 144 includes only one of the side walls 148, 150. The recess 146 includes one or more through-holes 152 extending through the retaining member in the longitudinal direction, each light source 114 disposed in a respective through-hole 152. The light guide is rotatable within the recess 146 such that the angular position of the light input edge 142 is variable relative to the light sources 114. Other light guides described herein may include similar features.

In some embodiments, the proximal end retaining member 144 is a separate element from the housing 102 that is fixedly mounted to the housing 102. In other embodiments, the proximal end retaining member 144 is integrally formed with the housing 102. Regardless, of whether the proximal end retaining member 144 is a separate element from or is integral with the housing, the proximal end retaining member 144 can be considered a part of the housing 102.

Figure 4:
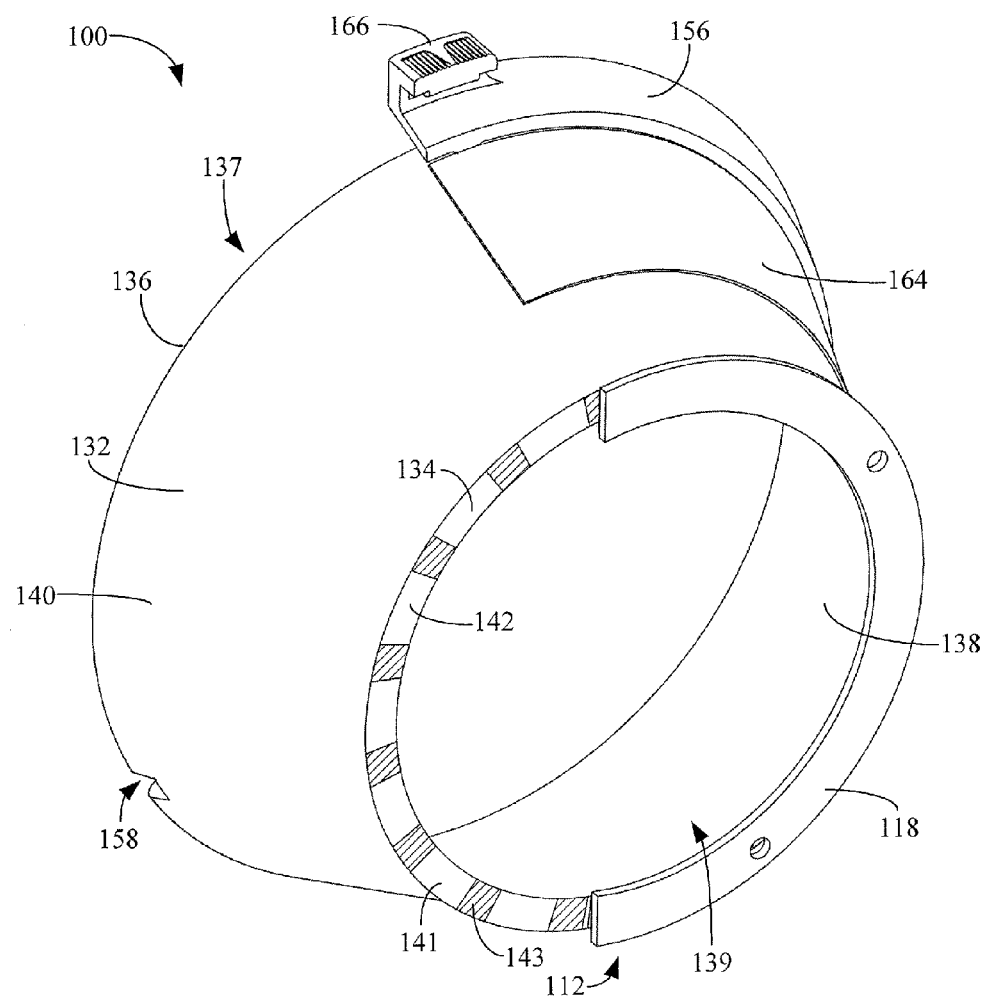
FIG. 4 is a schematic perspective view of parts of the LED lamp of FIG. 1, shown in cut-away.

With additional reference to FIG. 4, each light source 114 (not shown) is associated with multiple light input regions at the light input edge 142. In the embodiment shown, first and second light input regions 141, 143 are alternately located along the light input edge 142, and each light source 114 is associated with two adjacently located light input regions (e.g., a first light input region 141 and a second light input region 143). In other embodiments (not shown), more than two types of light input regions are sequentially located along the light input edge 142 and each light source 114 is associated with more than two adjacently located light input regions. In an example, each light source 114 may be associated with three light input regions located along the light input edge. Other light guides described herein may include similar features.

Each second light input region 143 is associated with an optical modifying characteristic. In some embodiments, the second light input region 143 includes a spectrum adjuster that modifies a spectrum of the light input to the light guide. In one example, the spectrum adjuster is a color attenuating material, for example, a color filter. In another example, the spectrum adjuster is a wavelength-shifting material. Wavelength shifting is used herein to refer to a process in which a material absorbs light of certain wavelengths, and reemits light at one or more different wavelengths. The wavelength-shifting material includes, for example, one or more of a phosphor material, a luminescent material, a luminescent nanomaterial such as a quantum dot material, a conjugated polymer material, an organic fluorescent dye, an organic phosphorescent dye, and lanthanide-doped garnet. Other light guides described herein may include similar features.

In some embodiments, each first light input region 141 is specularly transmissive and therefore lacks an optical modifying characteristic. In other embodiments, each first light input region 141 includes a spectrum adjuster different from the spectrum adjuster of each second light input region 143. Other light guides described herein may include similar features.

The light emitted from the light source 114 and incident on the first light input region 141 is input to the light guide 132 with a first spectrum. The light emitted from the light source 114 and incident on the second light input region 143 is input to the light guide 132 with a second spectrum, different from the first spectrum. Light input to the light guide 132 with the first spectrum and light input to the light guide 132 with the second spectrum mix in the light guide 132 such that the light has a combined spectrum that is the combination of the first spectrum and the second spectrum weighted in accordance with the apportioning of the light between the first light input region 141 and the second light input region 143 for each light source 114. Other light guides described herein may include similar features.

As described in more detail below, the angular position of the light guide 132 is variable relative to the light sources 114. Accordingly, the light emitted from each light source 114 is selectively apportioned between the first light input regions 141 and the second light input regions 143 of the light guide so that a characteristic of the light output from the LED lamp is based on the optical modifying characteristic (or absence thereof) of the light input regions 141, 143 and the relative positioning of the light input regions 141, 143 and the light sources 114. Other light guides described herein may include similar features.

In one example, the color temperature of the light output from the LED lamp (e.g., LED lamp 100) is varied based on the relative positioning of the light input regions and the light sources. Many LED light sources emit light in a range of wavelengths intended to achieve a corresponding color temperature. However, sometimes the LEDs do not produce a color temperature that is desirable to a user or appropriate for a certain lighting application. In this example, the first light input region (e.g., first light input region 141) is specularly transmissive, and light incident thereon enters the light guide with the same spectrum (color temperature in this case) as the light emitted from the light source. The second light input region (e.g., second light input region 143) modifies the light output to be warmer (either or both of more red and less blue). In other embodiments, the second light input region modifies the light output to be cooler (either or both of more blue and less red). The light source (e.g., light source 114) may be selectively apportioned relative to the light input regions to achieve a desired color temperature.

With continued reference to FIG. 1, in some embodiments, the light guide 132 includes light extracting elements 154 in, on, or beneath at least one of the major surfaces 138, 140. Light extracting elements that are in, on, or beneath the major surface 138, 140 will be referred to as being "at" the major surface. Each light extracting element 154 functions to disrupt the total internal reflection of the propagating light that is incident on the light extracting element. In one embodiment, the light extracting elements 154 reflect light toward the opposing major surface so that the light exits the light guide 154 through the opposing major surface. Alternatively, the light extracting elements 154 transmit light through the light extracting elements and out of the major surface of the light guide 132 having the light extracting elements. In another embodiment, both types of light extracting elements 154 are present. In yet another embodiment, the light extracting elements 154 reflect some of the light and refract the remainder of the light incident thereon. Therefore, the light extracting elements 154 are configured to extract light from the light guide 132 through one or both of the major surfaces 138, 140, and light may be similarly extracted through the major surfaces of other light guides described herein. In an example, the light extracting elements 154 are configured to extract light through the inner major surface 138 so that light exits through the opening 137 at the distal end 136 of the light guide 132.

Exemplary light extracting elements include light-scattering elements, which are typically features of indistinct shape or surface texture, such as printed features, ink jet printed features, selectively-deposited features, chemically etched features, laser etched features, and so forth. Other exemplary light extracting elements include features of well-defined shape, such as V-grooves, lenticular grooves, and features of well-defined shape that are small relative to the linear dimensions of the major surfaces (e.g., major surfaces 138, 140), which are referred to herein as micro-optical elements. The smaller of the length and width of a micro-optical element is less than one-tenth of the longer of the length and width (or circumference) of the light guide (e.g., light guide 132) and the larger of the length and width of the micro-optical element is less than one-half of the smaller of the length and width (or circumference) of the light guide. The length and width of the micro-optical element is measured in a plane parallel to the major surface (e.g., major surfaces 138, 140) of the light guide for planar light guides or along a surface contour for non-planar light guides (e.g., light guide 132).

The micro-optical elements are configured to extract light in a defined intensity profile (e.g., a uniform intensity profile) and in a defined light ray angle distribution from one or both of the major surfaces. In this disclosure, intensity profile refers to the variation of intensity with position within a light-emitting region (such as the major surface or a light output region of the major surface). The term light ray angle distribution is used to describe the variation of the intensity of light with ray angle (typically a solid angle) over a defined range of light ray angles. In an example in which the light is emitted from an edge-lit light guide, the light ray angles can range from −90° to +90° relative to the normal to the major surface.

Micro-optical elements are shaped to predictably reflect or refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, are not described in detail in this disclosure. The micro-optical elements may vary in one or more of size, shape, depth or height, density, orientation, slope angle, or index of refraction such that a desired light output from the light guide is achieved over the corresponding major surface.

Light guides having light-extracting elements are typically formed by a process such as injection molding. The light-extracting elements are typically defined in a shim or insert used for injection molding light guides by a process such as diamond machining, laser etching, laser micromachining, chemical etching, or photolithography. Alternatively, any of the above-mentioned processes may be used to define the light-extracting elements in a master that is used to make the shim or insert. In other embodiments, light guides without light-extracting elements are typically formed by a process such as injection molding or extruding, and the light-extracting elements are subsequently formed on one or both of the major surfaces by a process such as stamping, embossing, laser etching, or another suitable process. Light-extracting elements may also be produced by depositing elements of curable material on the major surfaces of the light guide and curing the deposited material using heat, UV-light, or other radiation. The curable material can be deposited by a process such as printing, ink jet printing, screen printing, or another suitable process. Alternatively, the light-extracting elements may be inside the light guide between the major surfaces (e.g., the light-extracting elements may be light redirecting particles and/or voids disposed within the light guide).

Figure 5:
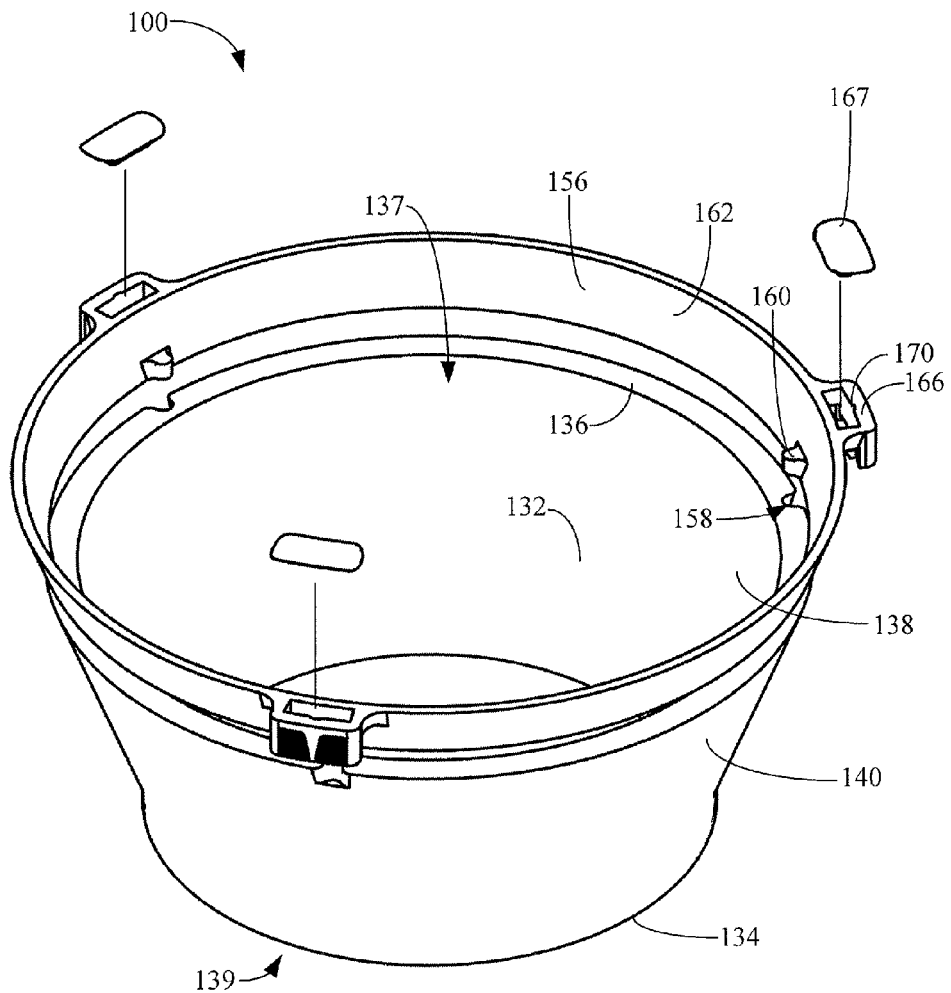
FIG. 5 is a schematic exploded view of parts of the LED lamp of FIG. 1.

With additional reference to FIG. 5, the LED lamp 100 includes an adjustment member 156. The adjustment member 156 holds the light guide 132 within the internal volume 104 of the housing 102 (in some embodiments, in combination with the proximal end retaining member 144) and is configured to vary an angular position of the light guide 132 relative to the housing 102 and the light source assembly 112. The adjustment member can also be referred to as a distal end retaining member.

The adjustment member 156 is annular in shape and is adjacent the outer major surface 140 of the light guide 132 proximate the distal end 136. The adjustment member 156 is fixedly mounted to the distal end 136 of the light guide 132 via one or more retaining elements. In the embodiment shown, the light guide includes radially extending recesses 158 at the distal end 136 of the light guide 132. The adjustment member 156 includes radial retaining tabs 160 complementary to the radially extending recesses 158 that extend radially inward from the adjustment member 156. Each radial retaining tab 160 is respectively disposed in a radially extending recess 158.

Figure 6:
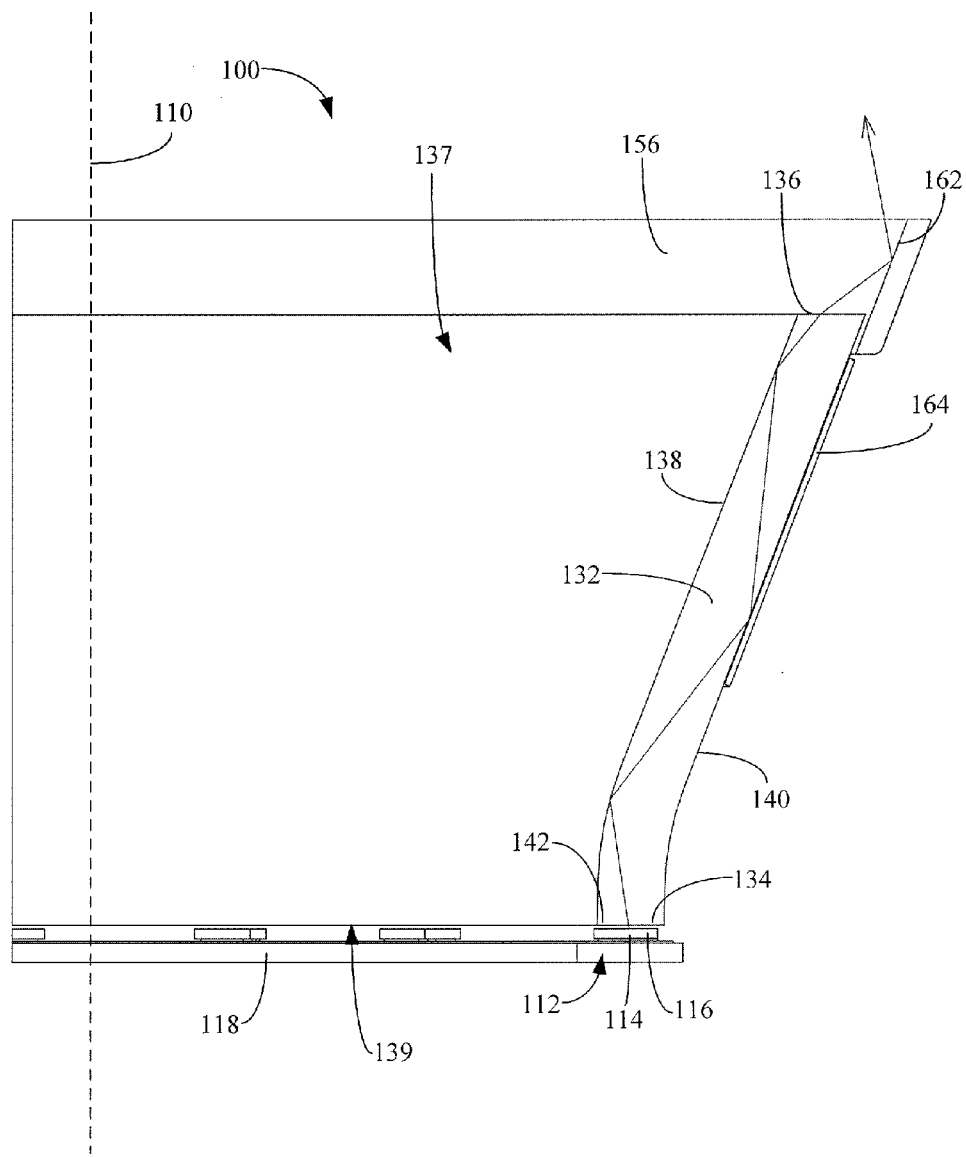
FIG. 6 is a schematic side view of parts of the LED lamp of FIG. 1, shown in cross-section.

In some embodiments, the adjustment member 156 includes one or more features that modify the light ray angle distribution of the light output from the LED lamp 100. In the embodiment shown, the adjustment member 156 extends longitudinally beyond the distal end 136 of the light guide 132 and includes a reflective surface 162 extending in a direction oblique to the longitudinal axis 110. With additional reference to FIG. 6, the reflective surface 162 is configured to reflect a portion of the light output from the distal end 136 of the light guide 132 and incident thereon in a direction having a greater longitudinal component than the longitudinal component of the light prior to being incident on the reflective surface 162. In some examples, the reflective surface 162 is specularly reflective. In other examples, the reflective surface 162 is a diffusive surface. In some embodiments (shown specifically in FIGS. 2-4 and 6), the adjustment member 156 includes a back reflector 164 adjacent the outer major surface 140 and extending along at least a portion of the light guide 132 between the distal end 136 and the proximal end 134. In some embodiments, the back reflector 164 is monolithic with the adjustment member 156. In other embodiments, the back reflector 164 is attached to and retained by the adjustment member 156. The back reflector 164 may conform to the contour of the outer major surface 140 of the light guide 132. Light extracted through the outer major surface 140 and incident the back reflector 164 is reflected back into the light guide 132, and may continue to propagate in the light guide via total internal reflection or may be output through the inner major surface 138. In some examples, the back reflector 164 is specularly reflective. In other examples, the back reflector 164 is diffusive.

The adjustment member 156, and hence the light guide 132, is moveably mounted to the housing 102 via one or more control elements. With additional reference to FIG. 7, the adjustment member 156 includes one or more control tabs 166 mechanically coupled to the distal end 108 of the housing 102. The control tabs 166 are manually rotatable between predetermined positions along the housing 102 so that the light input regions 141, 143 of the light guide 132 are rotatable between predetermined angular positions relative to the light sources 114. In the embodiment shown, the adjustment member 156 includes three tabs disposed at respective positions along the circumference of the distal end 108 of the housing 102. Each tab is fixed relative to one another such that movement of one tab results in movement of all the tabs. The respective positioning of the tabs provides for ease of rotation of the adjustment member (e.g., by a user).

Figure 7:
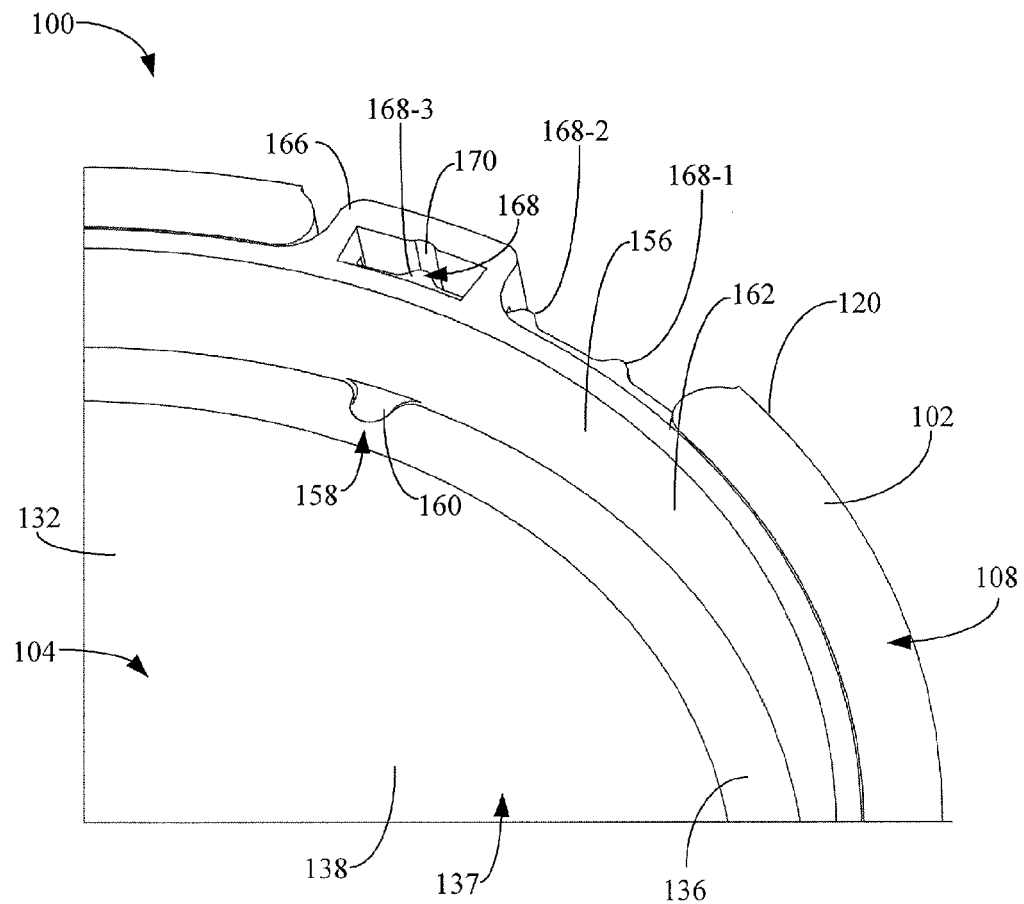
FIG. 7 is a schematic perspective view of a portion of the LED lamp of FIG. 1.

With specific reference to FIG. 7, the housing 102 includes a set of detents 168 extending radially outward from the outer surface 120 of the housing 102. Each tab 166 is respectively located relative to a set of detents 168 and is positionable between respective angular positions defined by the respective detents 168. In the embodiment shown, each set of detents 168 includes three detents 168-1, 168-2, 168-3. In other embodiments, each set of detents 168 may include more or fewer detents. FIGS. 5 and 7 show the tab 166 with the optional cover 167 removed to show an indent 170 (e.g., a notch) formed in the tab 166 that is complementary to each detent 168. The tab 166 is a resilient member that, upon the application of a rotational force thereto, will flex and allow the indent 170 to be moved from a position of contact with one detent to a position of contact with another detent.

In some embodiments, each control tab extends radially outward from the adjustment member and includes a lower lip 169 (FIG. 3) that cooperates with an upper lip 171 (FIG. 3) of the housing 102 to longitudinally retain the adjustment member 156 and, therefore, longitudinally retain the light guide 132.

FIGS. 8-10 show an example of the rotation of the adjustment member 156 (and the light guide fixedly mounted thereto) relative to the variation in the apportionment of the incident light between the light input regions. As described above, the light input edge 142 includes first and second light input regions 141, 143. Each light source 114 is associated with an adjacent first and second light input region 141, 143. Rotation of the adjustment member 156 relative to the housing 102 (e.g., by angular rotation of the tabs 166) results in the rotation of the first and second light input regions 141, 143 relative to the light source 114.

Figure 8A:
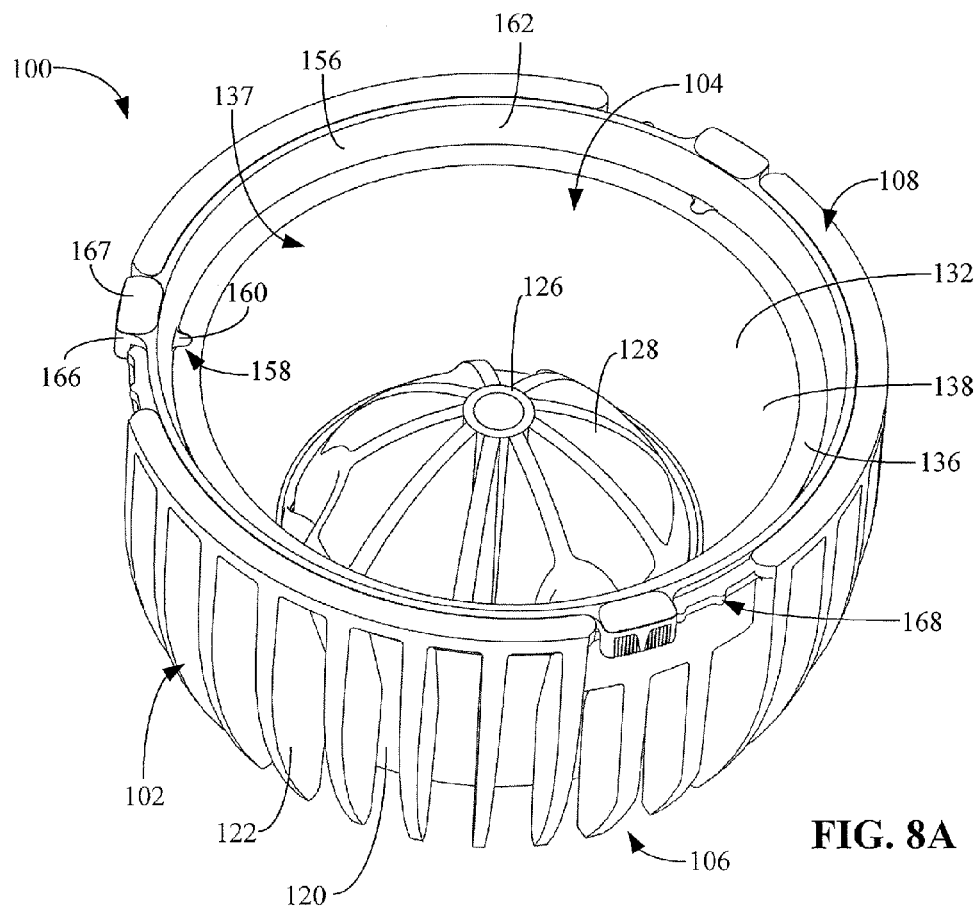
FIG. 8A is a schematic perspective view of the LED lamp of FIG. 1, with the adjustment member in an exemplary first angular position.
Figure 8B:
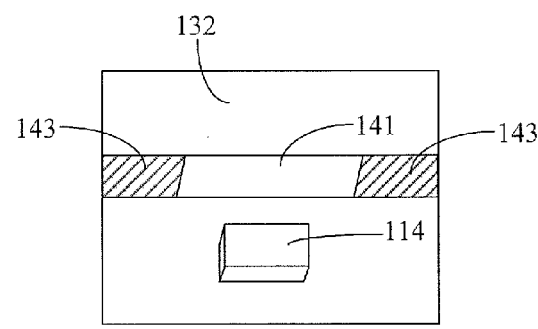
FIG. 8B is a schematic perspective view of an exemplary position of a light source relative to light input regions with the adjustment member in the exemplary first angular position.

In FIG. 8A, the adjustment member 156 is in the first position (as defined by the position at which the indent 170 of the tab 166 and a first one of the protrusions 168 are in contact). As shown in FIG. 8B, in the first angular position, the light guide 132 is positioned such that the light source 114 is adjacent the first light input region 141. More of the light emitted from the light source 114 is incident on the first light input region 141 than on the second light input region 143. Light emitted from the light source 104 and incident on the first light input region 141 is input to the light guide with a first spectrum. In an example, the first light input region 141 is specularly transmissive, and light incident thereon enters the light guide with the same spectrum as the light emitted from the light source 114. In other examples, the first light input region 141 modifies the spectrum of the light input therethrough.

Figure 9A:
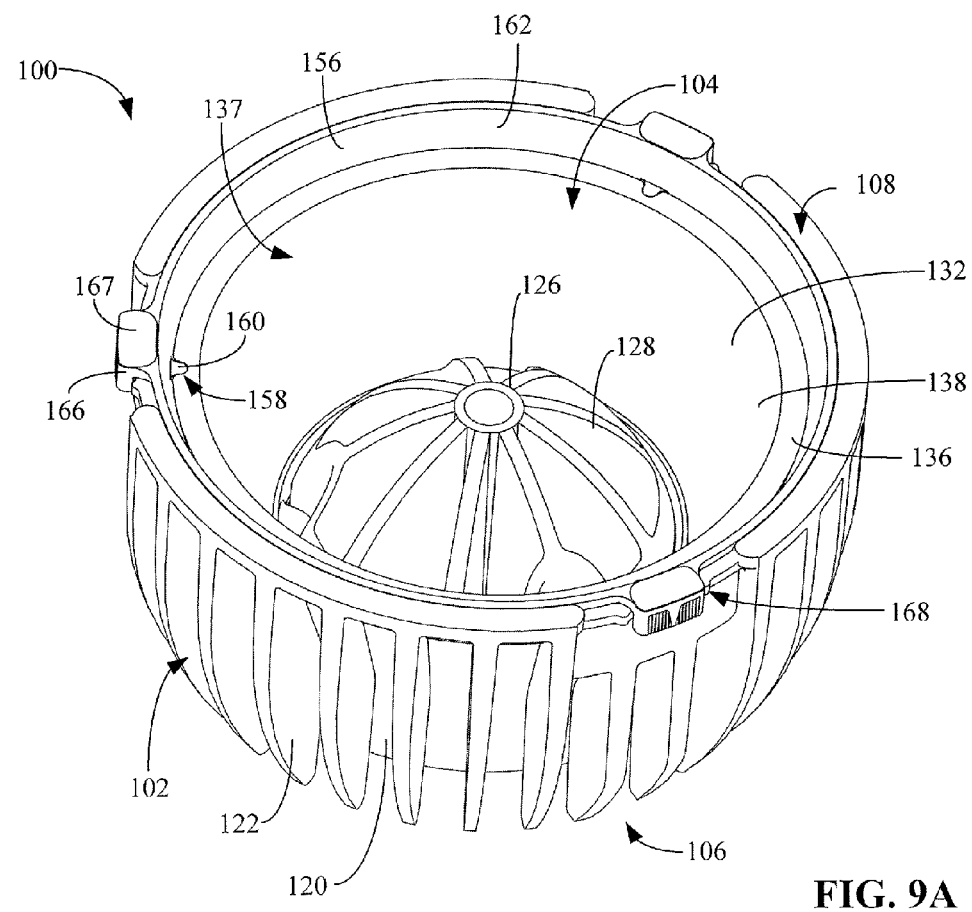
FIG. 9A is a schematic perspective view of the LED lamp of FIG. 1, with the adjustment member in an exemplary second angular position.
Figure 9B:
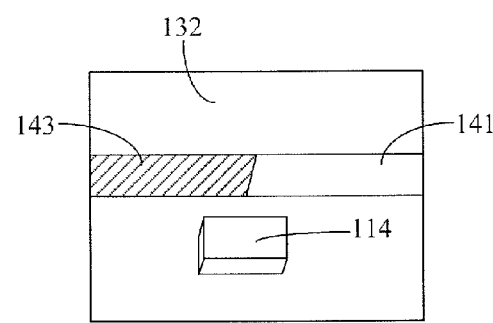
FIG. 9B is a schematic perspective view of an exemplary position of a light source relative to light input regions with the adjustment member in the exemplary second angular position.

In FIG. 9A, the adjustment member 156 is in the second angular position (as defined by the position at which the indent 170 of the tab 166 and a second one of the protrusions 168 are in contact). As shown in FIG. 9B, in the second angular position, the light guide 132 is positioned such that the light source 114 is located in an intermediate position adjacent both the first light input region 141 and the second light input region 143. Similar portions of the light emitted from the light source 114 are respectively incident on the first light input region 141 and the second light input region 143. In an example, the first light input region 141 is specularly transmissive, and light incident thereon enters the light guide with the same spectrum as the light emitted from the light source 114. The second light input region 143 modifies the spectrum of the light input to the light guide 132 therethrough. Accordingly, the light input to the light guide with different spectra from the respective light input regions 141, 143 mixes in the light guide 132 to provide light with a spectrum that is the combination of the spectra of light input to the light guide 132 through the light input regions 141, 143 weighted in accordance with the apportioning of the light between the light input regions 141, 143.

Figure 10A:
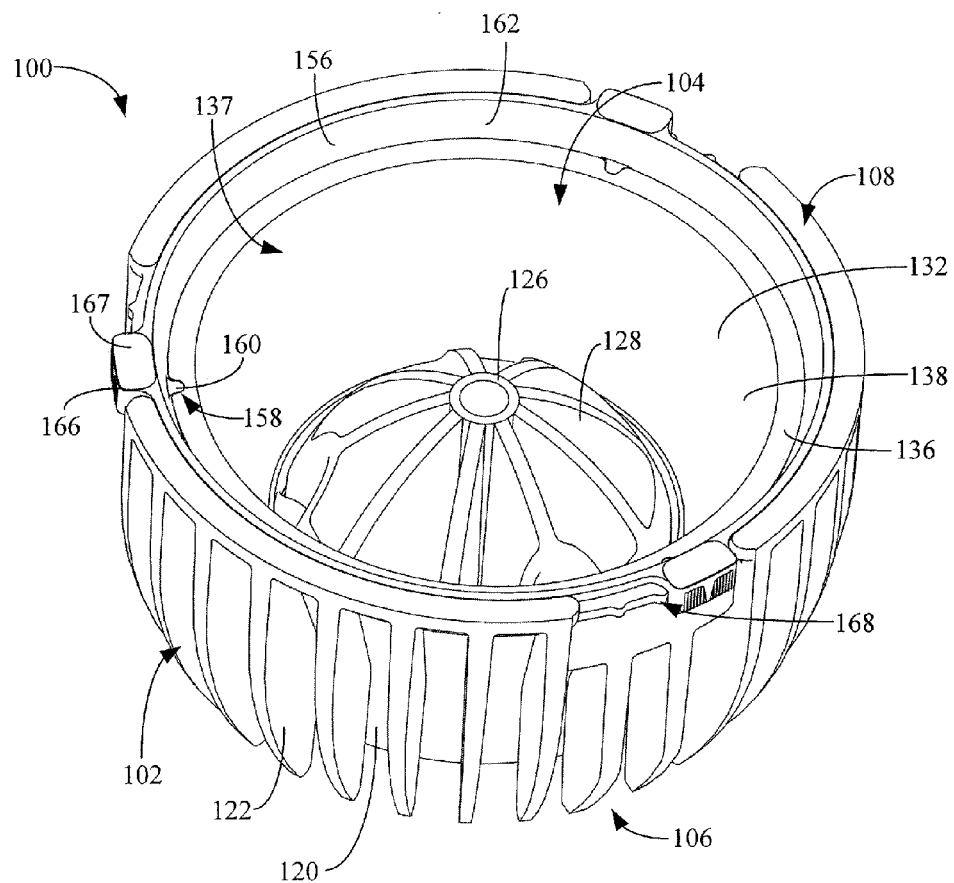
FIG. 10A is a schematic perspective view of the LED lamp of FIG. 1 with the adjustment member in an exemplary third angular position.
Figure 10B:
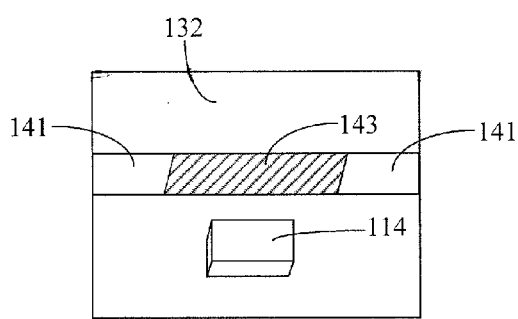
FIG. 10B is a schematic perspective view of an exemplary position of a light source relative to light input regions with the adjustment member in the exemplary third angular position.

In FIG. 10A, the adjustment member 156 is in the third position (as defined by the position at which the indent 170 of the tab 166 and a third one of the protrusions 168 are in contact). As shown in FIG. 10B, in the third angular position, the light guide 132 is positioned such that the light source 114 is adjacent the second light input region 143. More of the light emitted from the light source 114 is incident on the second light input region 143 than the first light input region 141. Light emitted from the light source 114 and incident on the second light input region 143 is input to the light guide with a second spectrum. In an example, the second light input region 143 modifies the spectrum of the light input to the light guide 132 therethrough.

Figure 11:
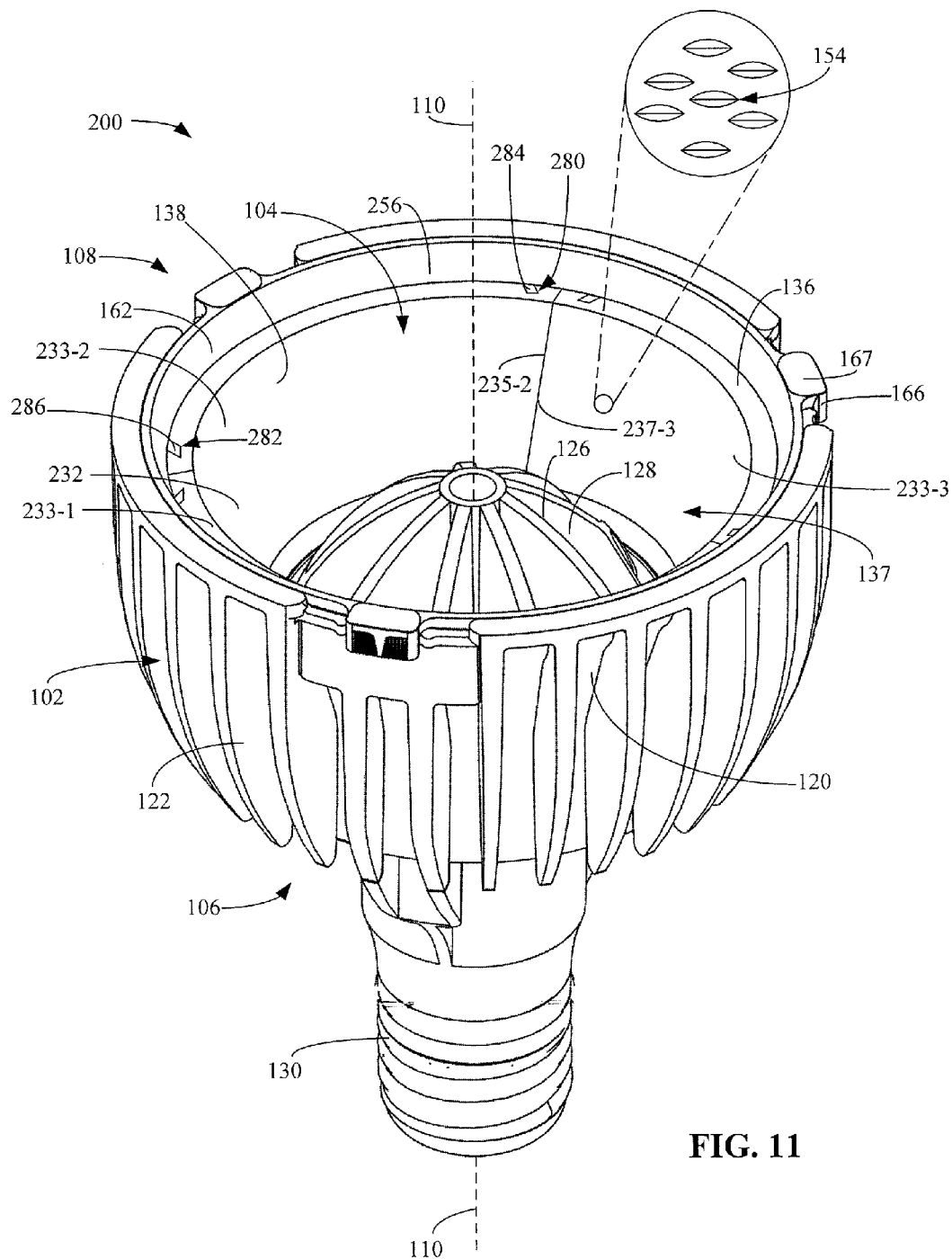
FIG. 11 is a schematic perspective view of another exemplary LED lamp.
Figure 12:
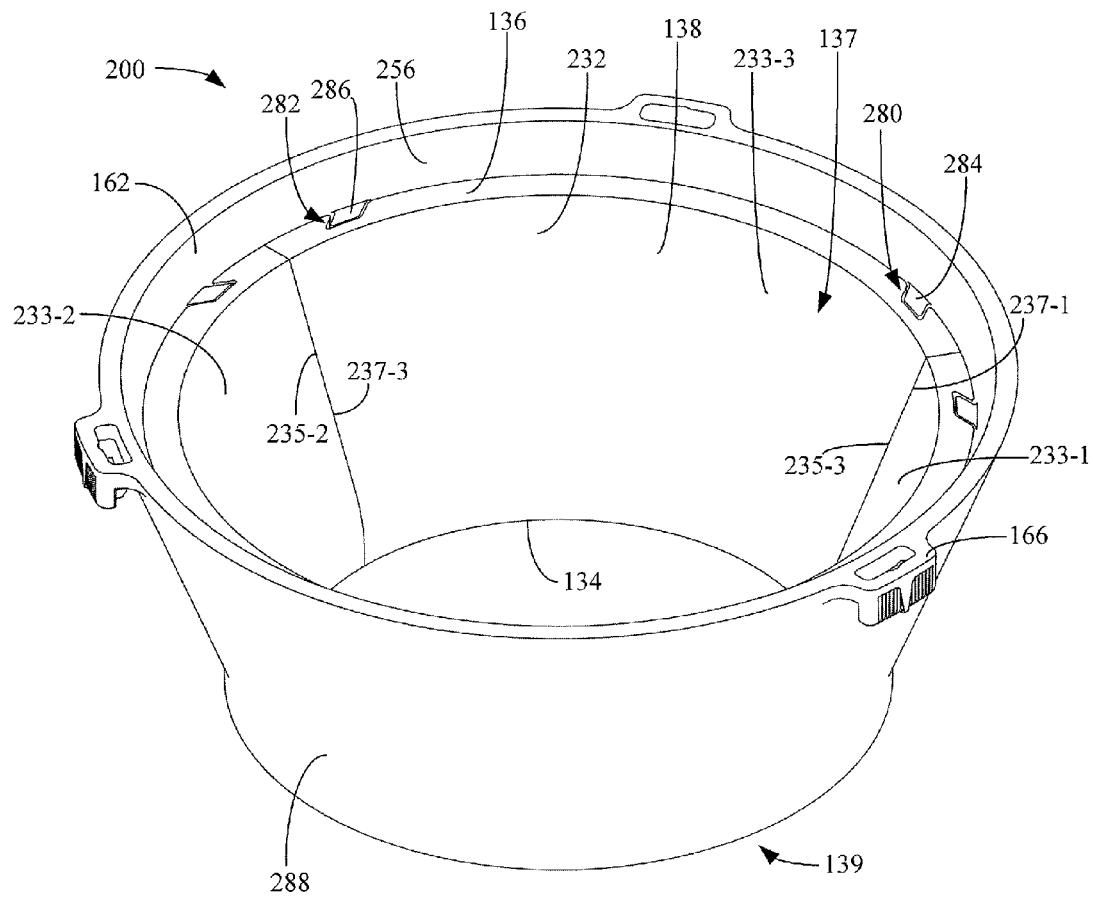
FIGS. 12 and 13 are schematic perspective views of parts of the LED lamp of FIG. 11.
Figure 13:
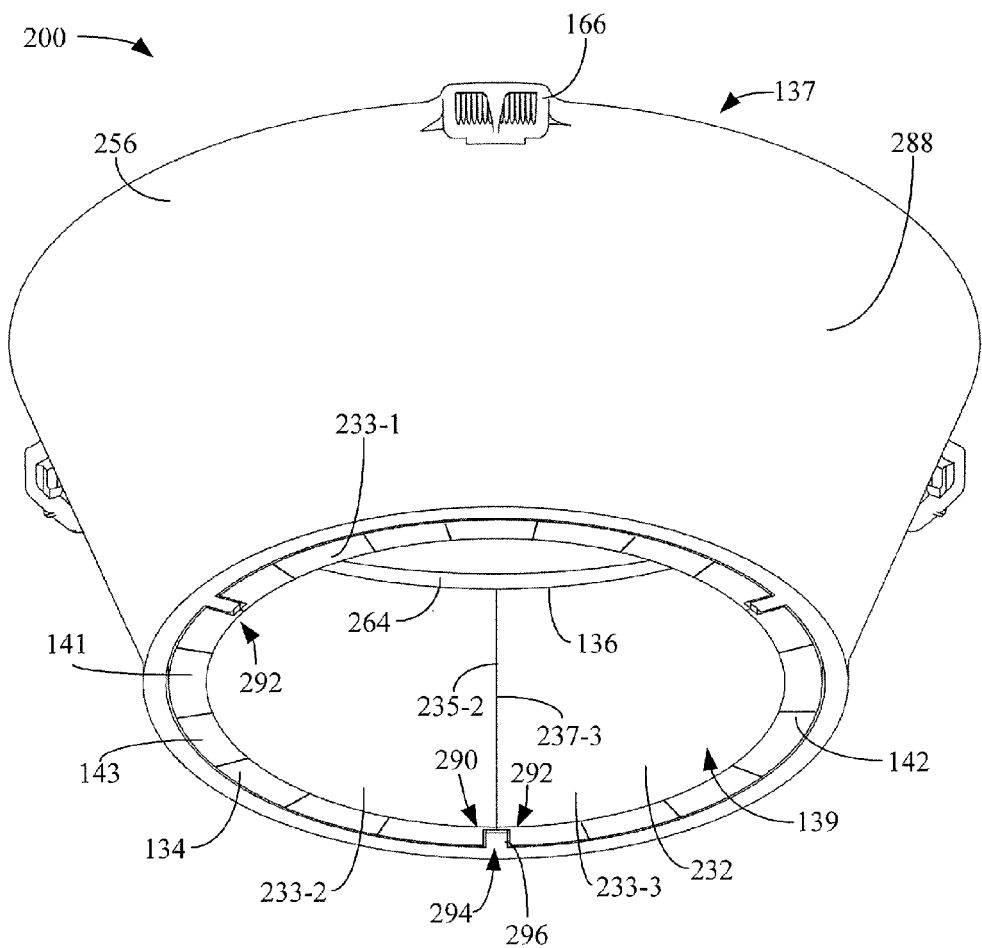

Referring now to FIGS. 11-13, another exemplary embodiment of the LED lamp is shown at 200. The LED lamp 200 is similar to the LED lamp 100, but includes a different embodiment of the light guide and adjustment member.

The light guide 232 is collectively formed by more than one circumferential light guide segment 233. In the embodiment shown, the light guide is collectively formed by three circumferential light guide segments 233-1, 233-2, 233-3. In other embodiments, the light guide 232 may be formed from more or fewer light guide segments. Each light guide segment includes two circumferential side portions 235, 237. For example, light guide segment 233-1 includes circumferential side portions 235-1, 237-1; light guide segment 233-2 includes circumferential side portions 235-2, 237-2; and light guide segment 233-3 includes circumferential side portions 235-3, 237-3. Each circumferential side portion of one of the light guide segments is adjacent the circumferential side portion of another one of the light guide segments. As an example, as shown in FIG. 11, the circumferential side portion 235-2 of the light guide segment 233-2 is adjacent the circumferential side portion 237-3 of the light guide segment 233-3.

The adjustment member 256 is fixedly mounted to the distal end of each light guide segment 233-1, 233-2, 233-3 via one or more retaining elements. Each light guide segment 233-1, 233-2, 233-3 includes at least one radially extending recess at the distal end 136. In the embodiment shown, each light guide segment 233-1, 233-2, 233-3 includes a radially extending recess 280 proximate the circumferential edge 235 and a radially extending recess 282 proximate the circumferential edge 237. The adjustment member includes radial retaining tabs 284, 286 complementary to the recesses 280, 282 and respectively disposed therein.

The adjustment member 256 includes a frame portion 288 adjacent the outer major surface 140 of the light guide 132 (light guide segment 233-1, 233-2, 233-3) and extending between the distal end 136 and the proximal end 134. In some embodiments, the frame portion 288 is monolithic with the adjustment member 256. In other embodiments, the frame portion 288 is attached to and retained by the adjustment member 256. The frame portion 288 may conform to the contour of the outer major surface 140 of the light guide. The frame portion 286 is fixedly mounted to the proximal end 134 of, and retains, each of light guide segment 233-1, 233-2, 233-3 via one or more retaining elements. Each light guide segment 233-1, 233-2, 233-3 includes at least one radially extending recess at the proximal end 134. In the embodiment shown, each light guide segment includes a radially extending recess 290 proximate the circumferential edge 235 and a radially extending recess 292 proximate the circumferential edge 237. In some embodiments, the radially extending recess 290 from one of the light guide segments and the radially extending recess 292 from an adjacent light guide segment collectively form a radially extending recess 294. For example, as shown in FIG. 13, the radially extending recess 290 of the light guide segment 233-2 and the radially extending recess 292 of the light guide segment 233-3 collectively form radially extending recess 294. The frame portion 288 includes radial retaining tabs 296 complementary to the collectively formed recesses 294 at the proximal end and respectively disposed therein.

Although not specifically shown, in some embodiments, a surface of the frame portion 288 proximate the outer major surface 140 of the light guide 232 is a reflective surface (e.g., similar to the back reflector 164 of LED lamp 100). Light extracted through the outer major surface 140 and incident on the reflective surface of the frame portion 288 is reflected back into the light guide 232, and may continue to propagate in the light guide via total internal reflection or may be output through the inner major surface 138. In some examples, the reflective surface of the frame portion 288 is specularly reflective. In other examples, the reflective surface of the frame portion 288 is diffusive.

In the embodiment shown, the adjustment member 256 extends longitudinally beyond the distal end 136 of the light guide 132 and includes a reflective surface 162 extending in a direction oblique to the longitudinal axis 110. With additional reference to FIG. 6, the reflective surface 162 is configured to reflect a portion of the light output from the distal end 136 of the light guide 132 and incident thereon in a direction having a greater longitudinal component than the longitudinal component of the light prior to being incident on the reflective surface 162. In some examples, the reflective surface 162 is specularly reflective. In other examples, the reflective surface 162 is a diffusive surface.

The adjustment member 256 is moveably mounted to the housing 102 via one or more control elements. Similar to the adjustment member 156 of the LED lamp 100, the control tabs 166 of the adjustment member 256 are manually rotatable between predetermined positions along the housing 102. The frame portion 286 and the light guide segments 233-1, 233-2, 233-3 rotate in accordance with rotation of the control tabs 166 such that the light input regions 141, 143 of the light guide 132 are rotatable between predetermined angular positions relative to the light sources 114.

FIGS. 1-13 illustrate exemplary LED lamps 100, 200 that are configured as PAR lamps. In the examples shown, the reflective surface 162 is configured to increase the longitudinal component of the light that exits the LED lamp. A PAR lamp is a representative embodiment for the reflector of the adjustment member that is configured to make the light more longitudinal, which is consistent with the desired output of a PAR lamp. In another example (not shown), a light redirecting member is attached to the distal end 108 of the housing 102 such that the internal volume 104 is enclosed. The light redirecting member includes an inner major surface facing toward the internal volume and an outer major surface opposite the inner major surface and facing away from the internal volume. In some embodiments, the light redirecting member is configured as a sheet, film, or substrate. The light redirecting member can be configured such that substantially all of the light output from the light guide is incident on its inner major surface. However, the light redirecting member can have one or more holes for allowing air flow through the internal volume.

In some examples, the light redirecting member is a member including a pattern of light redirecting optical elements (e.g., such as the light redirecting optical elements disclosed in U.S. Pat. No. 6,752,505) for redirecting the light incident thereon.

In other examples, the light redirecting member is a light diffusing film. In such embodiments, the light output from the LED lamp will be more diffuse than the light output from an identical LED lamp without the light redirecting member. In other embodiments, instead of a light diffusing film, a light diffusing sheet or light diffusing substrate is used as the light redirecting member. Historically, a bulged reflector (BR) lamp has had a more diffuse output than a PAR lamp. Accordingly, embodiments of the LED lamp configured as a PAR lamp and including a light diffusing film, sheet, or substrate may also be referred to as a BR LED lamp, even though the outer profile of the lamp conforms to that of a PAR lamp.

Figure 14:
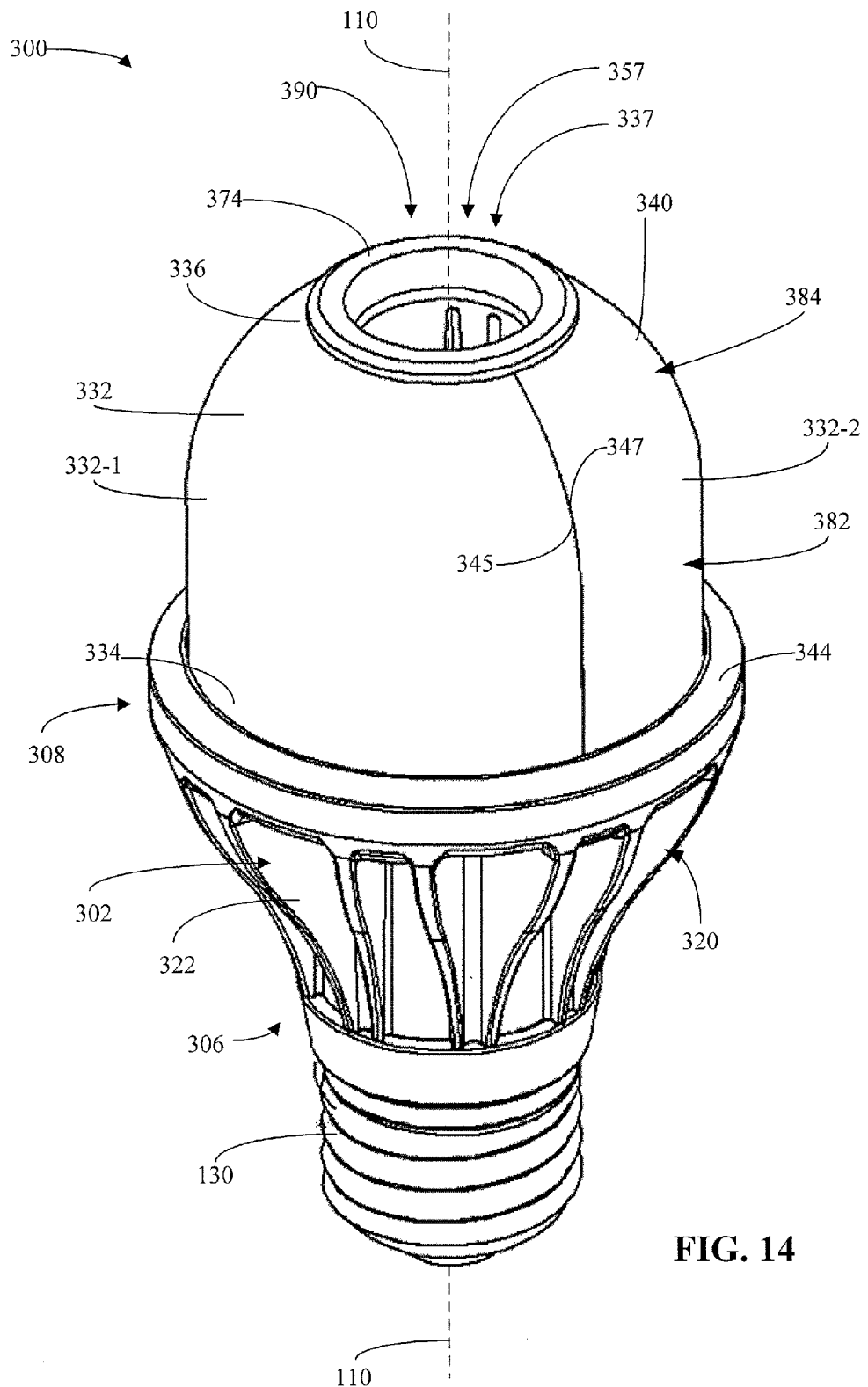
FIG. 14 is a schematic perspective view of another exemplary LED lamp.
Figure 15:
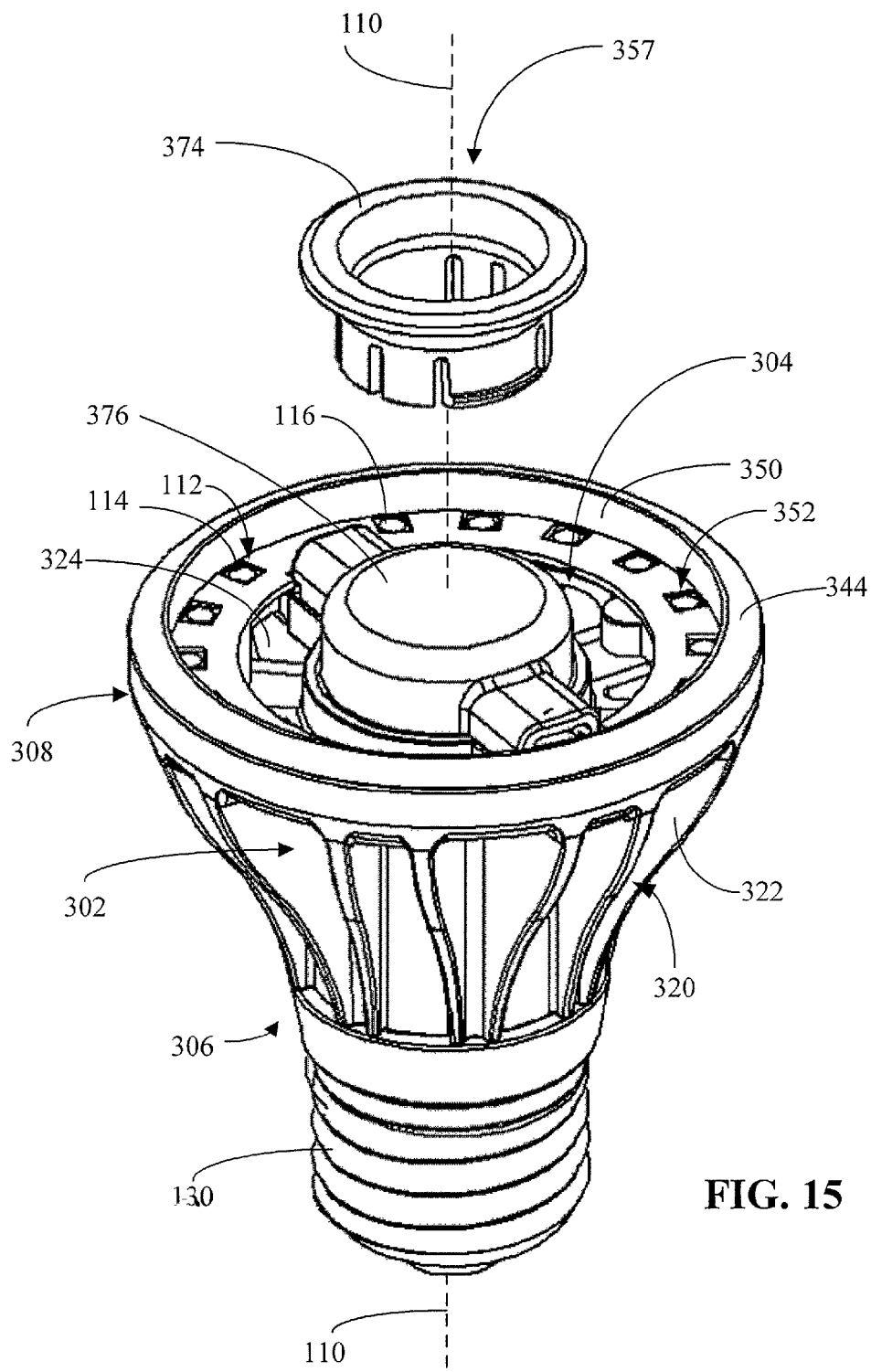
FIG. 15 is a schematic perspective view of the LED lamp of FIG. 14, shown with the light guide removed.
Figure 16:
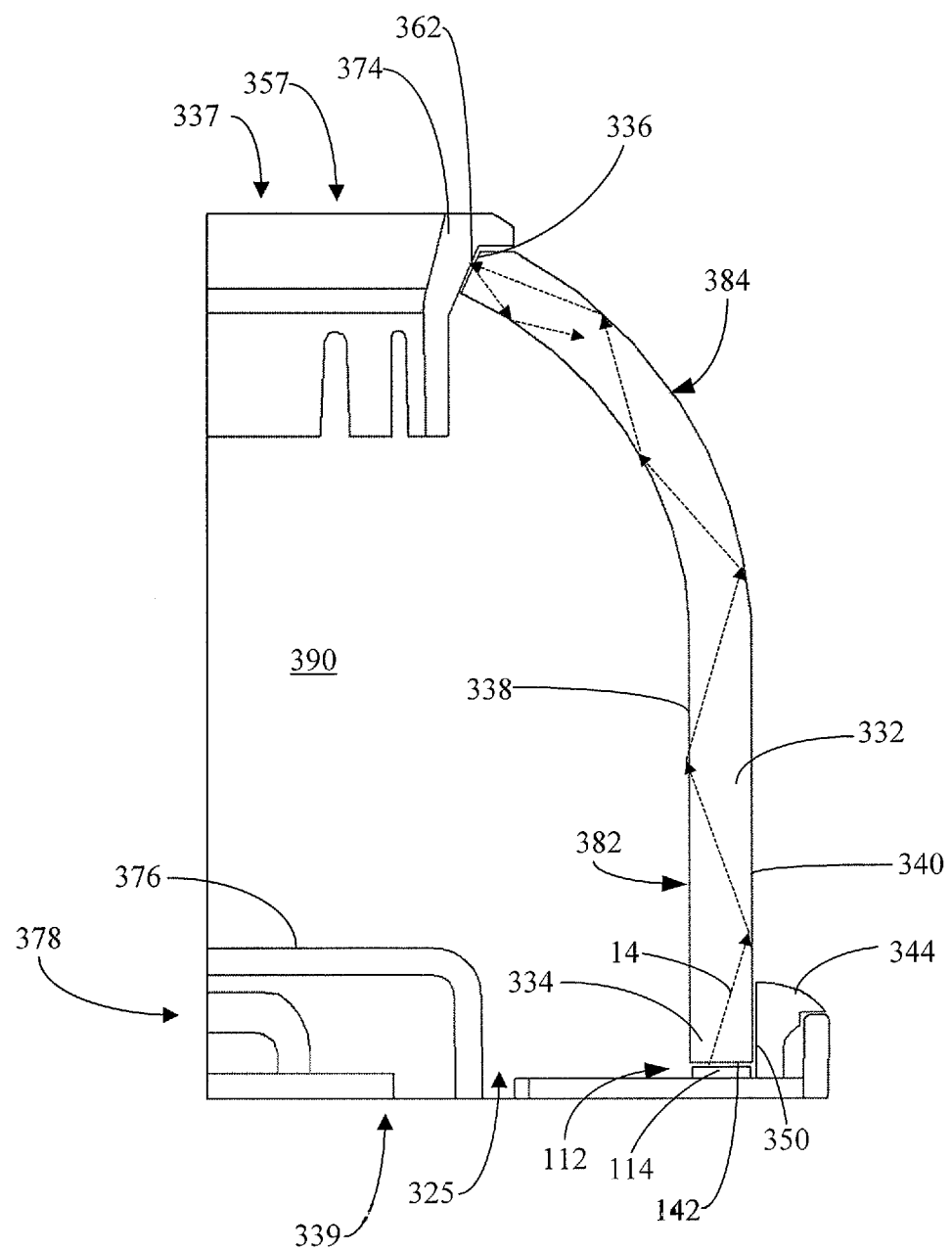
FIG. 16 is a schematic side view of a portion of the LED lamp of FIG. 14, shown in cross-section.

Turning now to FIGS. 14-16, another exemplary LED lamp is shown at 300. The exemplary LED lamp 300 is embodied as an A-series lamp (e.g., conforming to the outer envelope of an A19 lamp). The term A19 refers to one of the common sizes of A-series lamps. Historically, A-series lamps have been made using incandescent lighting technology and have had pear-shaped glass bulbs where the number following the A indicates the maximum width of the bulb in ⅛-inch units. The glass used in the glass bulb may be frosted glass which diffuses the light from the filament or may be clear glass which makes the glowing filament visible for decorative effect. Consumers are interested in LED lamps that are similar in appearance to conventional lamps. In this disclosure, an A-series LED lamp refers to LED lamps conforming to the outer envelope of a conventional A-series lamp.

The LED lamp 300 includes a housing 302. The housing 302 extends between a proximal end 306 and a distal end 308 and defines a longitudinal axis 110. A base 130 is coupled to the proximal end 306 of the housing 302. Features of the base 130 have already been described above.

The LED lamp 300 includes a light guide 332 (FIGS. 14 and 16). The light guide 332 is a solid article of manufacture made from, for example, polycarbonate, poly(methyl-methacrylate) (PMMA), glass, or other appropriate material. The light guide may be made from a transparent material. The light guide may also be a multi-layer light guide having two or more layers that may differ in refractive index. In the embodiment shown (FIG. 14), the light guide 332 includes two circumferential light guide segments 332-1, 332-2 that collectively form the light guide. In other embodiments, the light guide 332 includes more than two circumferential light guide segments that collectively form the light guide. In still other embodiments, the light guide 332 is a single element.

Each light guide segment 332-1, 332-2 includes side surfaces 345, 347 extending along the longitudinal axis 110 between the proximal end 334 and the distal end 336 of the light guide 332. As shown in FIG. 14, the side surface 345 of one light guide segment 332-1 abuts a side surface 347 of another respective light guide segment 332-2. When the term "abut" is used herein to describe a relationship between two components, the components need not touch each other, but may be in close physical proximity such as two juxtaposed surfaces. Although in some embodiments, the components may be in actual physical contact with one another. For example, the side surfaces 345, 347 exemplified in FIG. 14 are retained in physical contact with one another (e.g., via the proximal end retaining member 344 and the distal end retaining member 374, described below).

The light guide 332 is configured as an open-ended hollow body extending along the longitudinal axis 110 between a proximal end 334 and a distal end 336 and enclosing an internal volume 390. In an example, the internal volume 390 of the light guide is devoid of a heat sink. In the embodiment shown, the light guide 332 includes an opening 337 at the distal end 336 of the light guide 332 and an opening 339 (FIG. 16) at the proximal end 334 of the light guide 332. The light guide 332 includes an inner major surface 338 and an outer major surface 340 opposite the inner major surface 338. The major surfaces 338, 340 extend along the longitudinal axis 110 between the proximal end 334 and the distal end 336. The light guide includes a proximal portion 382 extending along the longitudinal axis proximate the proximal end 334, and a distal portion 384 extending along the longitudinal axis proximate the distal end 336.

In some embodiments, the shape of the light guide 332 is chosen such that the LED lamp follows the outer envelope of an A-series lamp. In the embodiment shown, the proximal portion 382 is a straight portion extending along an axis parallel to the longitudinal axis 110 (the proximal portion 382 thereby forming a cylinder), and the distal portion 384 is inwardly curved along the longitudinal axis 110. The radial dimension of the inner major surface 338 of the light guide 332 at the distal end 336 is smaller than the radial dimension of the inner major surface 338 of the light guide 332 at the proximal end 334. Similarly, the radial dimension of the outer major surface 340 of the light guide 332 at the distal end 336 is smaller than the radial dimension of the outer major surface 340 of the light guide 332 at the proximal end 334. In other embodiments the light guide 332 is curved in other ways along the longitudinal axis. For example, in order to even more closely approximate the bulbous outer profile of a conventional A-series incandescent lamp, the proximal portion 382 of the light guide 332 can curve outwards and then inwards from the proximal end along the longitudinal axis 110. Other light guides described herein may include similar features.

The major surfaces 338, 340 of the light guide 332 each have a cross-sectional shape that is substantially circular (e.g., the light guide 332 has an annular cross-sectional shape) for any cross-section taken perpendicular to the longitudinal axis 110. The light guide 332 can therefore be rotated about the longitudinal axis 110 (e.g., for spectrum-adjustable examples described below).

Figure 17:
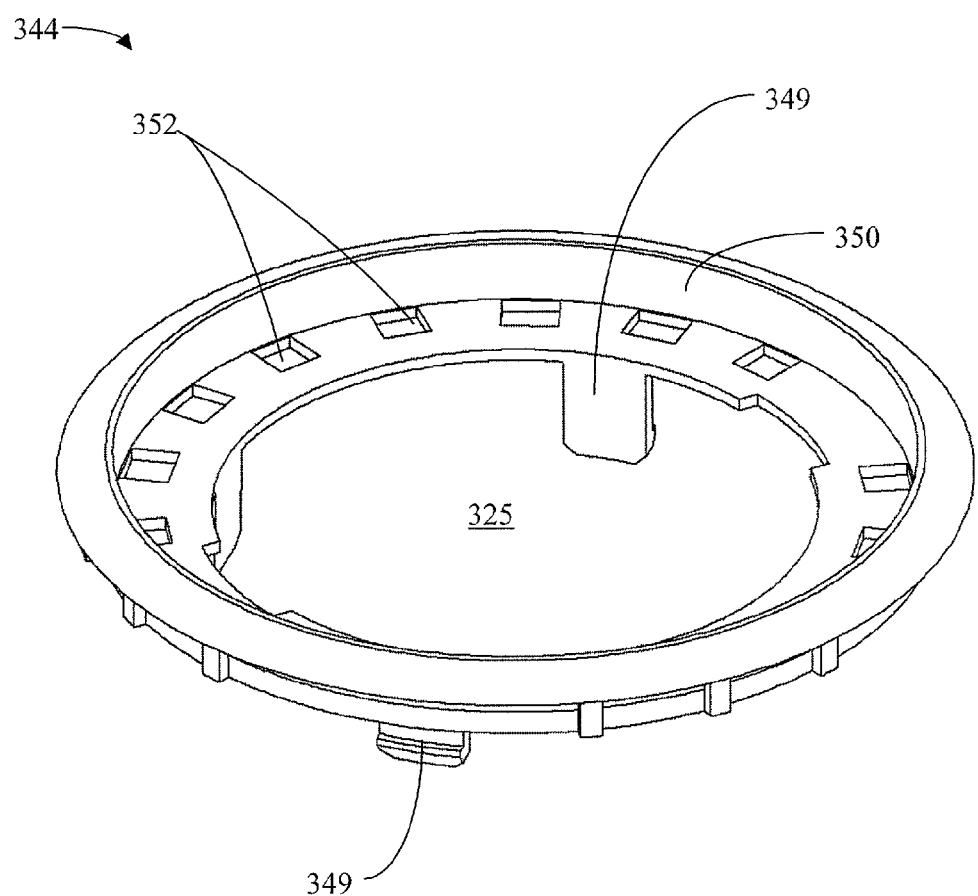
FIGS. 17 and 18 are schematic perspective views of the proximal end retaining member of the LED lamp of FIG. 14.
Figure 18:
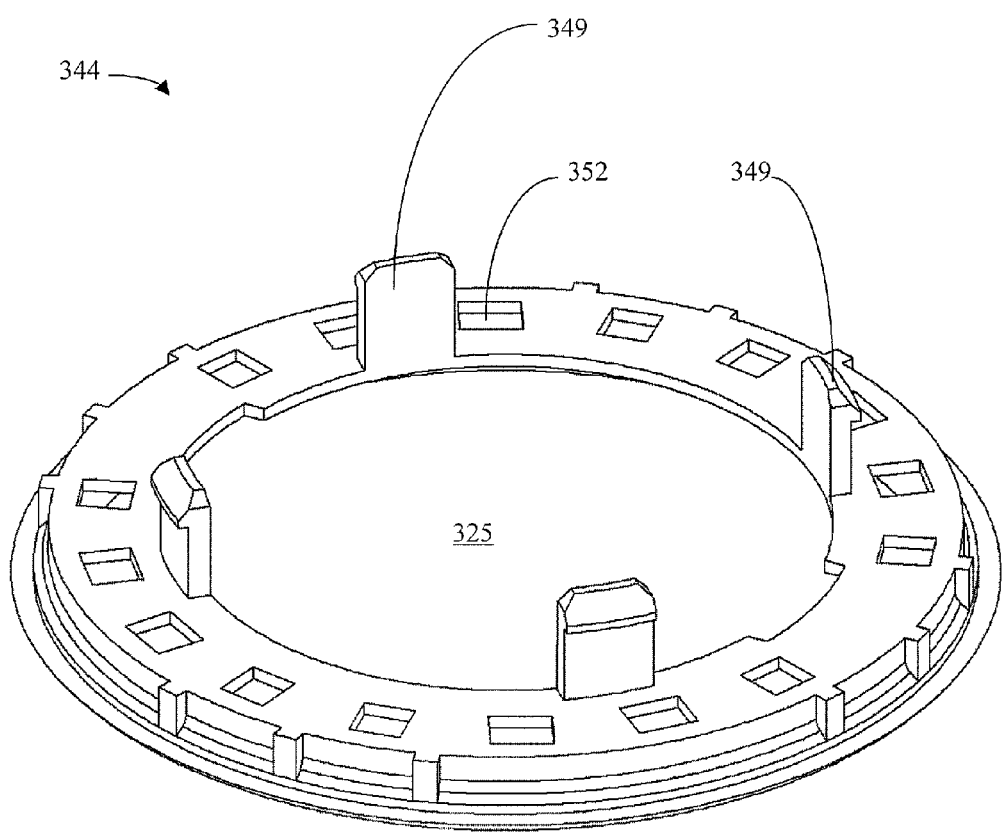

The LED lamp 300 includes a proximal end retaining member 344. The proximal end retaining member 334 retains the proximal end 334 of the light guide 332 in a position adjacent to the light source assembly 112. FIGS. 17 and 18 are top and bottom schematic perspective views, respectively, of an exemplary proximal end retaining member 344. In the embodiment shown, the proximal end retaining member 344 includes an outer circumferential wall 350 at the proximal end 334 of the light guide 332. The term "outer" as used in connection with the outer circumferential wall 350 indicates that the outer circumferential wall 350 is located adjacent the outer major surface 340 of the light guide 332 (e.g., to the outside of the light guide). In some embodiments, the outer circumferential wall 350 includes a reflective circumferential surface extending along the longitudinal axis and abutting the outer major surface of the light guide to reflect light into the light guide. In other examples discussed in more detail below, the proximal end retaining member 334 additionally includes an inner circumferential wall, which is concentric with the outer circumferential wall 350. The outer circumferential wall and the inner circumferential wall collectively form a recess in which the proximal end of the light guide is disposed. The proximal end retaining member includes an opening 325 to allow air flow through the opening 339 into or out of the internal volume 390 of the light guide 332.

In some embodiments, the proximal end retaining member 334 is a separate element from the housing 302 and is fixedly mounted to the housing 302. For example, as shown in FIGS. 17 and 18, the light input retaining member 344 includes clips 349 configured to attach the light input retaining member 344 to the housing 302. In such an embodiment, the housing includes complementary recesses (not shown) into which the clips 349 can be inserted. Other methods of attaching the proximal end retaining member 334 to the housing 302 are possible (e.g., adhesive, fastening members, etc.). In other embodiments, the proximal end retaining member 344 is integrally formed with the housing 302. Regardless, of whether the proximal end retaining member 344 is a separate element from the housing or is integral with the housing, the proximal end retaining member can be considered a part of the housing.

The LED lamp 300 includes a distal end retaining member 374 at the distal end of the light guide. As discussed above, the radial dimension of the distal end 336 of the light guide 332 may be smaller than the radial dimension of the proximal end 334 of the light guide 332. Accordingly, in some embodiments, the distal end retaining member 374 has a smaller radial dimension and a smaller circumference than the proximal end retaining member 344. In some embodiments, the distal end retaining member 374 retains the distal end 336 of the light guide 332. In an example in which the light guide 332 includes light guide segments 332-1, 332-2, the distal end retaining member 374 maintains the relative positioning of the light guide segments 332-1, 332-2 in cooperation with the proximal end retaining member 344.

Figure 19:
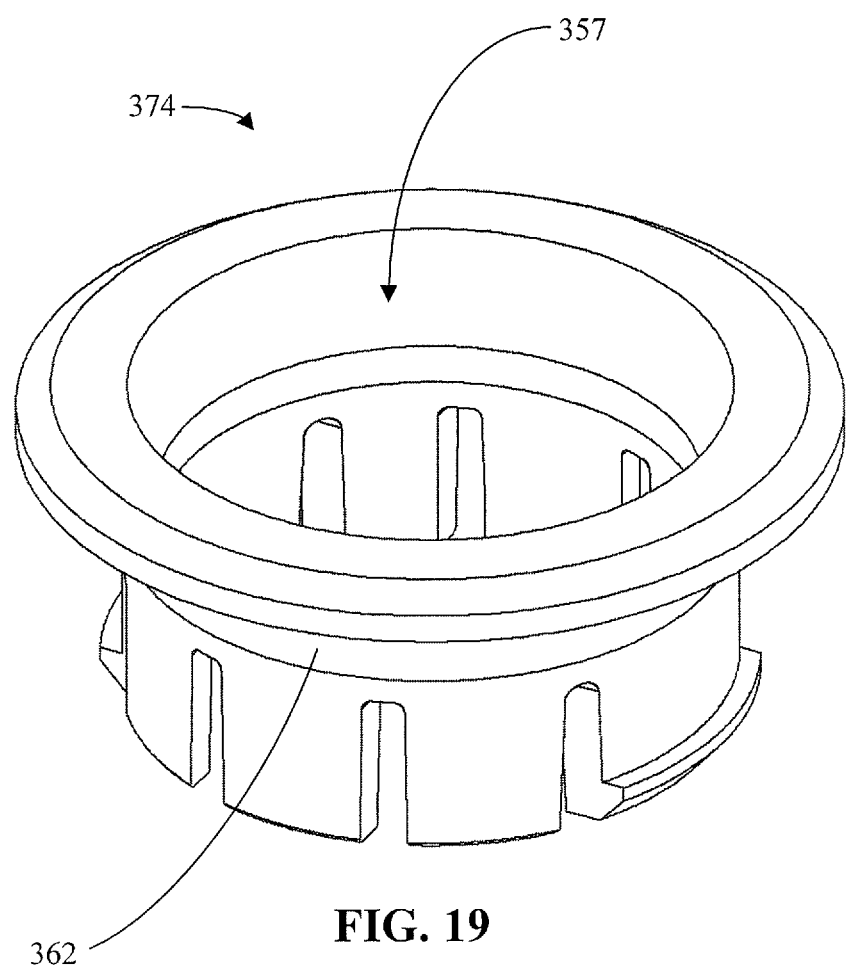
FIGS. 19 and 20 are schematic perspective views of the distal end retaining member of the LED lamp of FIG. 14.
Figure 20:
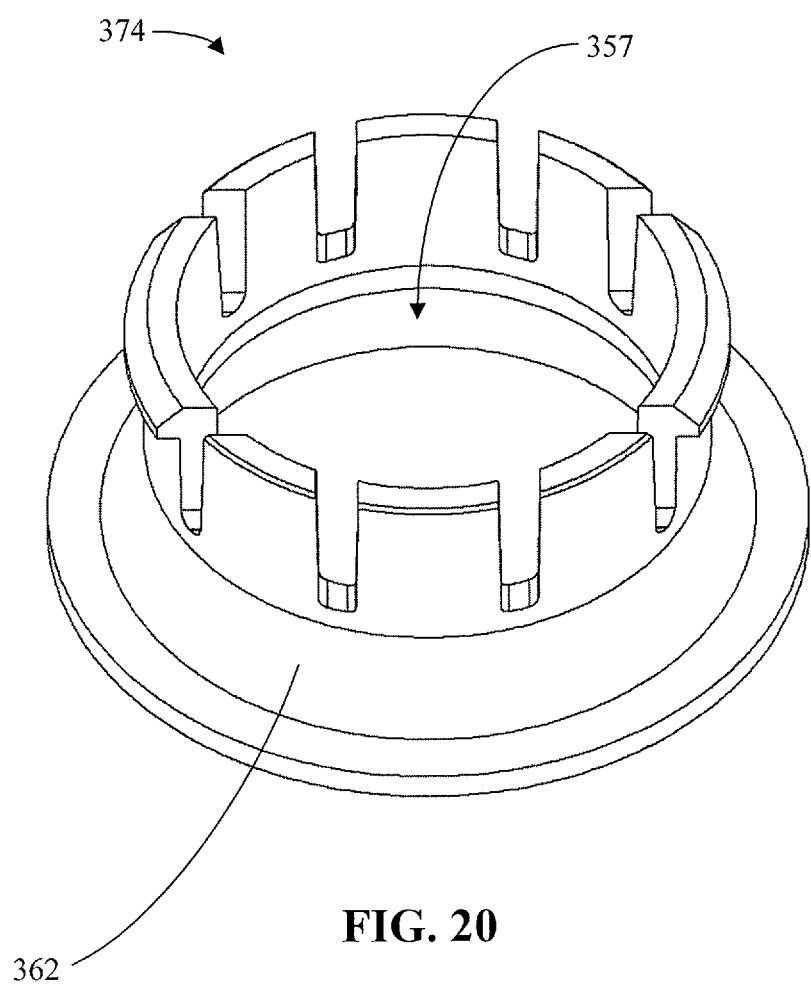

FIGS. 19 and 20 are top and bottom schematic perspective views, respectively, of an exemplary embodiment of the distal end retaining member 374. The distal end retaining member 374 includes an opening 357 to allow air flow through the opening 357 into or out of the internal volume 390 of the light guide 332. The distal end retaining member 374 also includes a circumferential distal surface 362 which abuts the distal end 336 of the light guide 332.

In some embodiments, the distal end retaining member 374 provides an optical modifying characteristic to light propagating in the light guide 332 and incident on the distal end retaining member 374. In an example, the distal surface 362 is specularly reflective and reflects light rays incident thereon back into the light guide. In implementations in which the light guide includes light extracting elements, the light extracting elements can be configured to extract the light reflected back into the light guide (e.g., through the outer major surface) from the light guide in a direction having a longitudinal component toward the proximal end and a radially outward component. In another example, the distal surface 362 is diffusely reflective. In one implementation, the distal surface 362 can be made diffusely reflective by making the distal end retaining member from white plastic (e.g., plastic containing light scattering white pigment). In yet another example, the distal end retaining member 374 is made from transparent plastic and the distal surface 362 includes light redirecting optical elements. Light output from the light guide and incident on the distal surface 362 may pass through the distal end retaining member and have its light ray angle distribution modified. This example may be desired for a see-through LED lamp. In yet another example, the distal end retaining member 374 is made from transparent plastic and the distal surface 362 is made to be specularly transmissive.

With continued reference to FIGS. 15 and 16, the housing 302 retains a light source assembly 112. The light source assembly 112 is disposed in the internal volume 304 of the housing 302 proximate the distal end 308. The light source assembly 112 includes light sources 114, each light source 114 being embodied as one or more solid-state light emitters 116. Features of the light source assembly 112, the light sources 114, as well as any structural components to retain the light source 114, have already been described above.

The housing 302 is thermally coupled to the light source assembly 112, similar to the embodiments of the LED lamps 100, 200 described above. As exemplified in FIGS. 14 and 15, the outer surface 320 of the housing includes radial fins 322 oriented parallel to the longitudinal axis 110 and extending radially outward. Air flow past radial fins 322 provides cooling. Vents 324 (FIG. 15) extend through the housing 302 proximate the proximal end 306 and connect to the internal volume 304 of the housing 302 to provide a path for air flow and convection cooling into the internal volume 304. Additionally there is a path for air flow and convection cooling between the internal volume 304 and the outside of the LED lamp 300 through the internal volume 390 in the light guide. When the LED lamp 300 is oriented with its longitudinal axis 110 vertical (e.g., as shown in FIG. 14), the cooling air flow is an axial flow through the vents, through the opening 325 in the proximal end retaining member, through the internal volume 390 of the light guide, and through the opening 357 in the distal end retaining member. When the orientation of the LED lamp 300 is inverted, the cooling air flow is reversed.

With specific reference to FIG. 16, an edge at the proximal end 334 of the light guide 332 provides a light input edge 142 through which light from light sources 114 is input to the light guide 132. For illustration, a light ray 14 is shown. Light ray 14 is emitted from the light source 114, enters the light guide 332 through the light input edge 142, propagates along the light guide 332 by total internal reflection at the major surfaces 338, 340, and exits the light guide 332 at the distal end 336. The light ray is incident on the circumferential distal surface 362. In this example, the distal surface 362 is specularly reflective and reflects the light ray back into the light guide 332.

As shown in FIGS. 15, 17, and 18, the proximal end retaining member 344 includes one or more through-holes 352 extending through the retaining member in the longitudinal direction, each light source 114 being disposed in a respective through-hole 352 (FIG. 15). The through-hole 352 has a longitudinal dimension that defines the spacing between a light emitting surface of the light source disposed in the through-hole and the light input edge of the light guide. Other LED lamps described herein may include similar features.

The light guide 332 is rotatable about the longitudinal axis 110 adjacent a perimeter defined by the circumferential wall 350 of the proximal end retaining member 344 such that the light guide is moveably mounted to the proximal end retaining member 344 and the housing 302. Accordingly, the angular position of the light input edge 142 is variable relative to the light sources 114. Adjustment of the angular position of the light input edge 142 relative to the light sources 114 is desired for spectrum-adjustable LED lamps.

Although not specifically shown with respect to the LED lamp 300, in some embodiments, each light source 114 is associated with multiple light input regions at the light input edge 342 of the light guide 332. For example, with reference to FIG. 4, discussed above, first and second light input regions are alternately located along the light input edge, and each light source is associated with two adjacently located light input regions (e.g., a first light input region and a second light input region). In other embodiments (not shown), more than two types of light input regions are sequentially located along the light input edge and each light source is associated with more than two adjacently located light input regions. Features of the light input regions have already been described above.

Reference is further made to FIGS. 8B, 9B, and 10B, which illustrate rotation of the light guide and the variation in the apportionment of the incident light from the light source between the light input regions. As shown in FIG. 8B, in the first angular position, the light guide is positioned such that the light source 114 is adjacent the first light input region 141. More of the light emitted from the light source 114 is incident on the first light input region 141 than on the second light input region 143. As shown in FIG. 9B, in the second angular position, the light guide is positioned such that the light source 114 is located in an intermediate position adjacent both the first light input region 141 and the second light input region 143. Similar portions of the light emitted from the light source 114 are respectively incident on the first light input region 141 and the second light input region 143. As shown in FIG. 10B, in the third angular position, the light guide 132 is positioned such that the light source 114 is adjacent the second light input region 143. More of the light emitted from the light source 114 is incident on the second light input region 143 than the first light input region 141. Such features have been described above in detail.

With continued reference to FIG. 16, in some embodiments, the LED lamp 300 includes an electronics module 378. The electronics module 378 is configured to receive electrical power through the base 130 and includes circuitry and electronics for controlling and driving the light sources 114 and any other component. In some embodiments, the electronics module is covered with an insulating cover 376. The insulating cover 376 can prevent a user from inadvertently contacting the electronics module. In an example, the electronics module cover 376 is formed integrally with the proximal end retaining member. In some implementations, the electronics module cover 376 includes a diffusely reflecting surface facing toward the inner volume of the light guide. The vents 324 are located between the electronics module and the light sources 114. Other LED lamps described herein may include similar features.

In some embodiments, the light guide 332 includes light extracting elements 154 in, on, or beneath at least one of the major surfaces 338, 340. Features of the light extracting elements 154, as well as methods of manufacturing light guides including light extracting elements 154, have already been described above.

Figure 21:
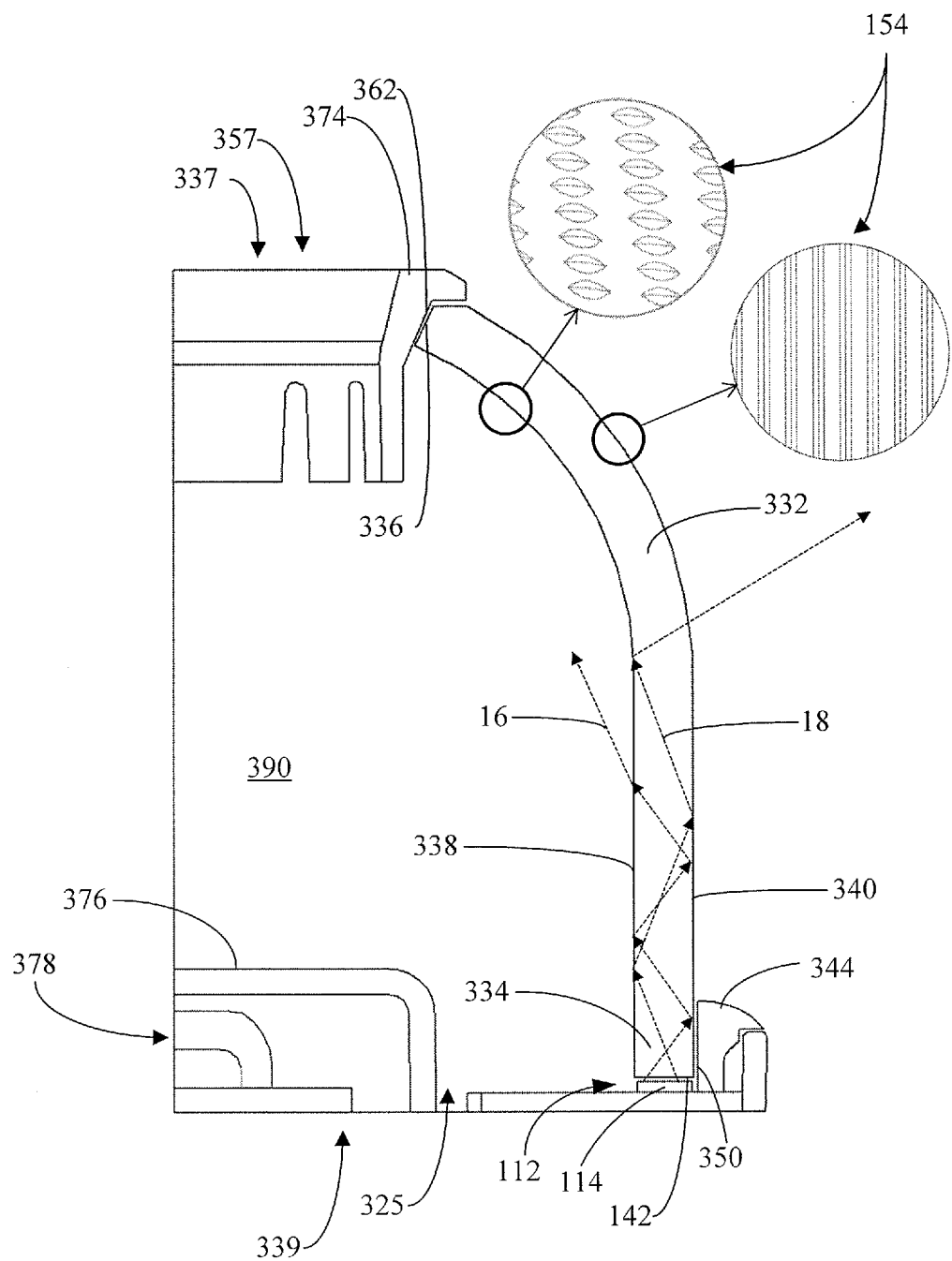
FIG. 21 is a schematic side view of a portion of the LED lamp of FIG. 14, shown in cross-section, additionally illustrating an example of light extracting elements.

FIG. 21 illustrates an exemplary embodiment of the LED lamp 300 including light extracting elements 154. Specifically, as shown in FIG. 21, micro-optical elements are present on the inner major surface 338, and V-groove elements are present on the outer major surface 340 extending along the longitudinal direction. Exemplary light rays 16 and 18 are input from the light source 114 into the light guide 332 through the input edge 142. Light ray 16 is extracted from the light guide 332 by an optical element at the inner major surface 338 towards the internal volume 390 of the light guide 332. Light ray 18 is extracted from the light guide 332 by an optical element at the inner major surface 338 towards the outer major surface 340 and then towards the outside of the LED lamp. In some examples, the light extracting elements allow for light to be output from the LED lamp in many directions (e.g., a lambertian output). In some examples, the V-groove elements extending along the longitudinal direction also reduce the visual effect of one or more relatively high-intensity columns of light extending along the light guide 332 from the light input edge, which is also referred to herein as a "headlighting" effect.

Other configurations of light extracting elements 154 are also possible. In one example, micro-optical elements are present on or in both of the major surfaces 338, 340 of the light guide 332. In another example, V-groove elements are present on the inner major surface 338 of the light guide 332 extending along the circumferential direction, and V-groove elements are present on the outer major surface 340 of the light guide 332 extending along the longitudinal direction. In configurations where micro-optical elements are present on or in both major surfaces 338, 340, the patterning of the micro-optical elements on or in a major surface can be randomized (e.g., with respect to positioning and/or spacing) relative to other micro-optical elements on or in the same major surface, and can be randomized (e.g., with respect to positioning and/or spacing) relative to micro-optical elements on or in the other major surface. Such randomization can reduce or prevent moiré.

In some embodiments, the LED lamp 300 has a see-through appearance. The term "see-through" as used herein indicates that an object on one side of the LED lamp is visible through the LED lamp from a vantage point on an opposite side of the LED lamp. For example, when the light guide is not illuminated, an object on a first side of the LED lamp adjacent the outer major surface of the light guide is visible through the light guide and through the internal volume from a vantage point at a second side of the LED lamp adjacent the outer major surface of the light guide and opposite the first side. An object is considered to be "visible" even though the object may appear distorted. For example, although the light guide is transparent to visible light, the object may appear distorted due to refraction or scattering caused by curvature of the light guide and/or the presence of light extracting elements 154.

In order to enhance the "see-through" appearance of LED lamp 300, the density of light extracting optical elements can be reduced. For example, the taper and the curvature of the light guide 332 will cause some light to be extracted from the light guide without refraction or reflection by light extracting elements, and the density of light extracting elements at that portion of the light guide can be reduced accordingly.

Figure 22:
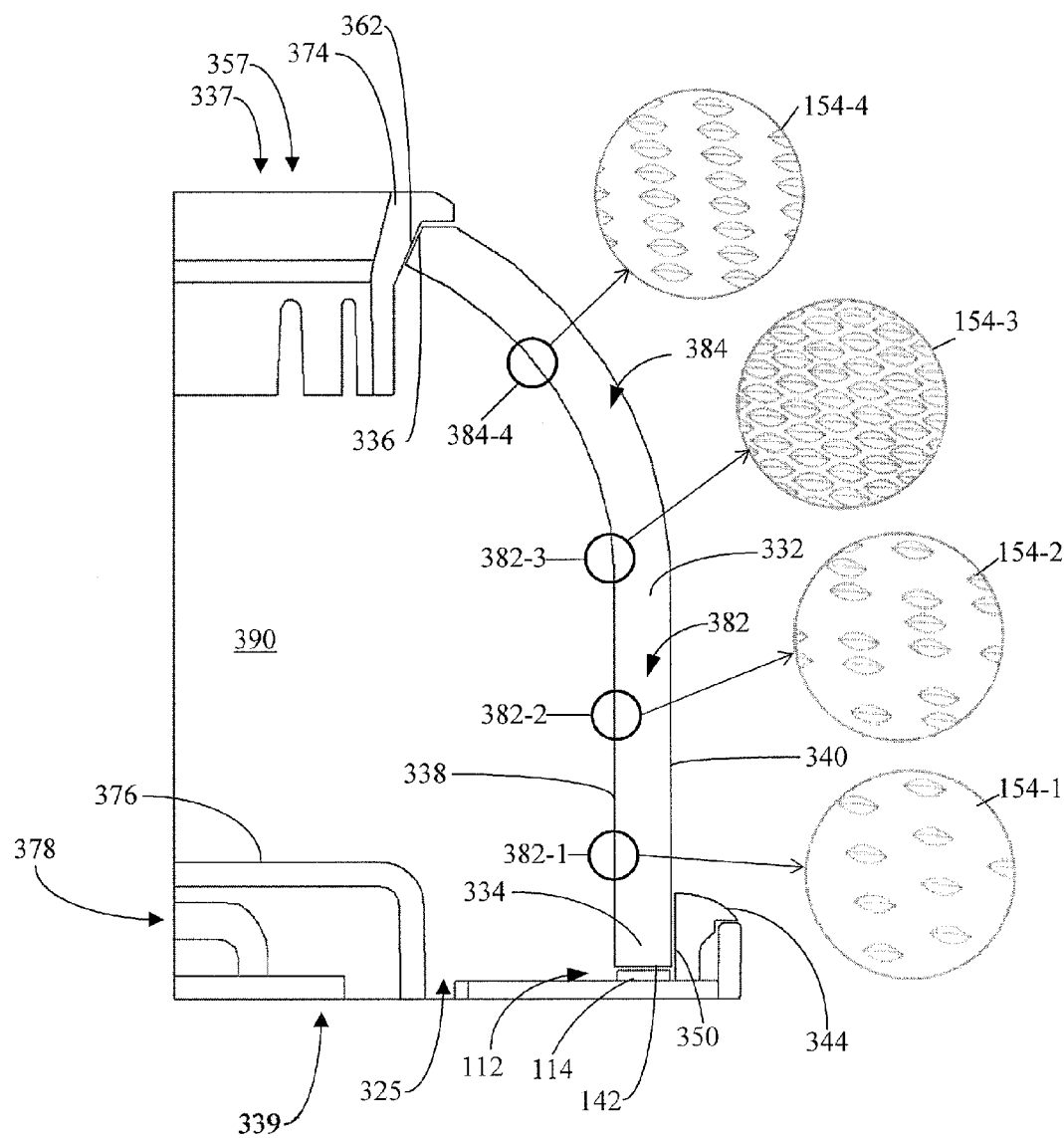
FIG. 22 is a schematic side view of a portion of the LED lamp of FIG. 14, shown in cross-section, additionally illustrating an example of a variation in the density of light extracting elements.

FIG. 22 illustrates another exemplary embodiment of the LED lamp 300 including light extracting elements 154. Micro-optical elements are present on the inner major surface 338 of the light guide 332. As discussed above, the light guide 332 includes a proximal portion 382 (being a straight portion) closer to the proximal end 334 of the light guide 332 and a distal portion 384 (being a curved portion) closer to the distal end 336 of the light guide 332. For illustration, three locations along the proximal portion 382 are shown: 382-1 (closest to the light input edge 142 among the three locations), 382-2 (second closest to the light input edge 142 among the three locations), and 382-3 (furthest from the light input edge among the three locations). Additionally, a location 384-4 along the distal portion 384 is shown. An enlarged schematic illustration of the density of micro-optical elements 154-1, 154-2, 154-3, 154-4 at each of the respective locations 382-1, 382-2, 382-3, and 384-4 is also shown. In this example, in the proximal portion 382, the density of micro-optical elements increases as a function of distance from the proximal end 334. In the distal portion 384 (the curved portion), there is some light extraction from the curvature of the light guide in the propagation direction of the light, which is generally the longitudinal direction. As a result, the density of optical elements at location 384-4 in the distal portion is lower than the density of optical elements at location 382-3 in the proximal portion. The micro-optical elements are characterized by a density $\rho(x)$ per unit area as a function of position x along the contour of the light guide away from the proximal end and towards the distal end. The density $\rho(x)$ satisfies the following relationships:

$$\rho(x_1) < \rho(x_2); \text{ and}$$

$$\rho(x_2) > \rho(x_3);$$

where $x_3 > x_2 > x_1$, $x = x_1$ is the location 382-2 in the proximal portion 382, $x = x_2$ is the location 382-3 in the proximal portion 382, and $x = x_3$ is the location 384-4 in the distal portion 384. Other light guides described herein may include similar features.

Alternatively or in addition to the above, the rate of change of density of the micro-optical elements changes (the rate of increase of the density decreases) from the proximal portion (straight portion) to the distal portion (curved portion). The density of micro-optical elements is characterized by a density $\rho(x)$ per unit area as a function of position x along the contour of the light guide away from the proximal end and towards the distal end, wherein $\rho(x)$ satisfies the following relationships:

$$\rho(x_1) < \rho(x_2); \text{ and}$$

$$\frac{d\rho(x_2)}{dx} > \frac{d\rho(x_3)}{dx};$$

where $x_3 > x_2 > x_1$, $x=x_1$ is the location 382-2 in the proximal portion 382, $x=x_2$ is the location 382-3 in the proximal portion 382, and $x=x_3$ is the location 384-4 in the distal portion 384. Other light guides described herein may include similar features.

In the examples shown, light guide 332 has substantially constant thickness between its proximal end 334 and distal end 336. Alternatively, the light guide can decrease in thickness (taper) from the proximal end to the distal end. The taper causes some light to be extracted from the light guide.

Referring now to FIGS. 23-27, another exemplary embodiment of the LED lamp is shown at 400. The LED lamp 400 is similar to the LED lamp 300, but includes a different embodiment of the proximal end retaining member 444. Specifically, the light input retaining member 444 additionally includes a reflective extension 464 that extends towards the distal end 336 of the light guide 332. Whereas embodiments of the LED lamp 300 are considered to be "see-through" in that an observer on one side of the lamp can see through the interior volume of the light guide, LED lamp 400 is not considered "see-through" because the reflective extension obscures the view of the interior of the light guide. In some embodiments, the reflective extension provides an appearance mimicking the frosted glass of a conventional A-series lamp.

The reflective extension 464 is embodied as an inner circumferential wall abutting the inner major surface 338 of the light guide 332. The term "inner" as used in connection with the inner circumferential wall indicates that the inner circumferential wall (reflective extension) is located adjacent the inner major surface 338 of the light guide 332 (e.g., to the inside of the light guide). The reflective extension 464 generally follows the contour of the light guide 332 and extends between a proximal end 434 and distal end 436. In the illustrated example, the reflective extension includes a proximal portion 492 closer to the proximal end 434, and a distal portion 494 closer to the distal end 436. The proximal portion 492 is a straight portion extending along an axis parallel to the longitudinal axis 110 (forming a cylinder), and the distal portion 494 is inwardly curved along the longitudinal axis 110. In some embodiments, the reflective extension extends from the proximal end 334 to the distal end 336 of the light guide. In other embodiments (not shown), the reflective extension extends partway to the distal end of the light guide. The reflective extension 464 defines a cavity 459.

Figure 25:
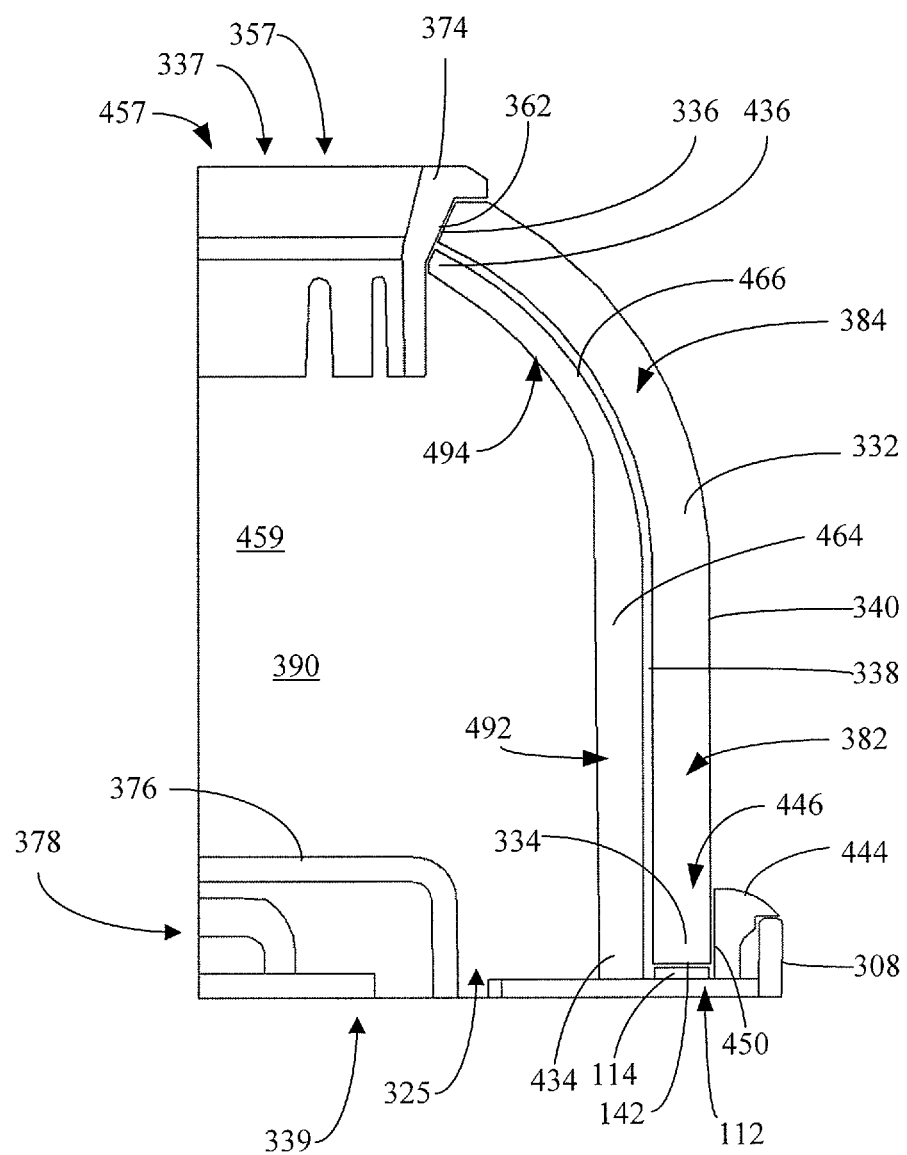
FIG. 25 is a schematic side view of a portion of the LED lamp of FIG. 23, shown in cross-section.
Figure 26:
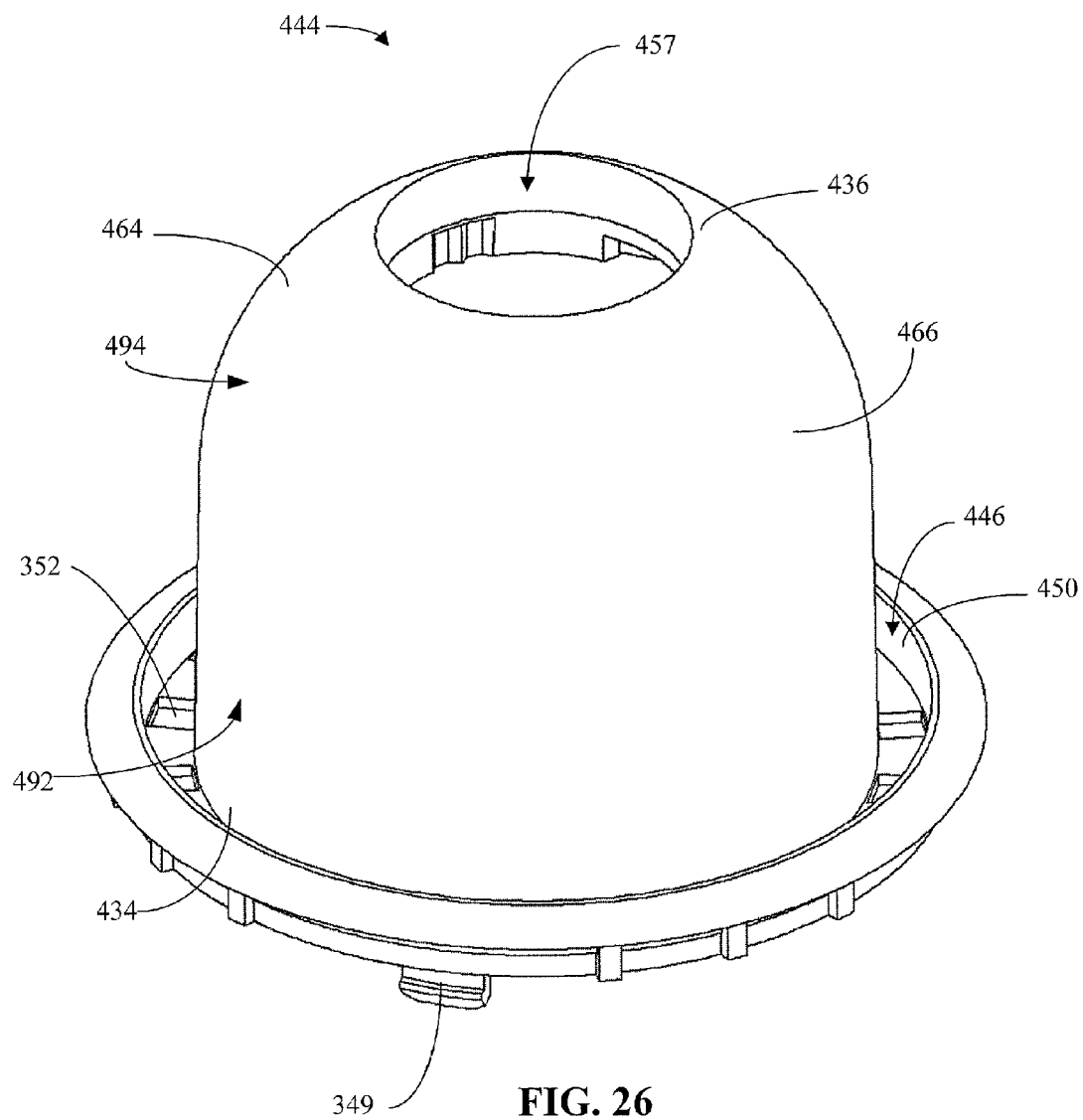
FIGS. 26 and 27 are schematic perspective views of the proximal end retaining member of the LED lamp of FIG. 23.
Figure 27:
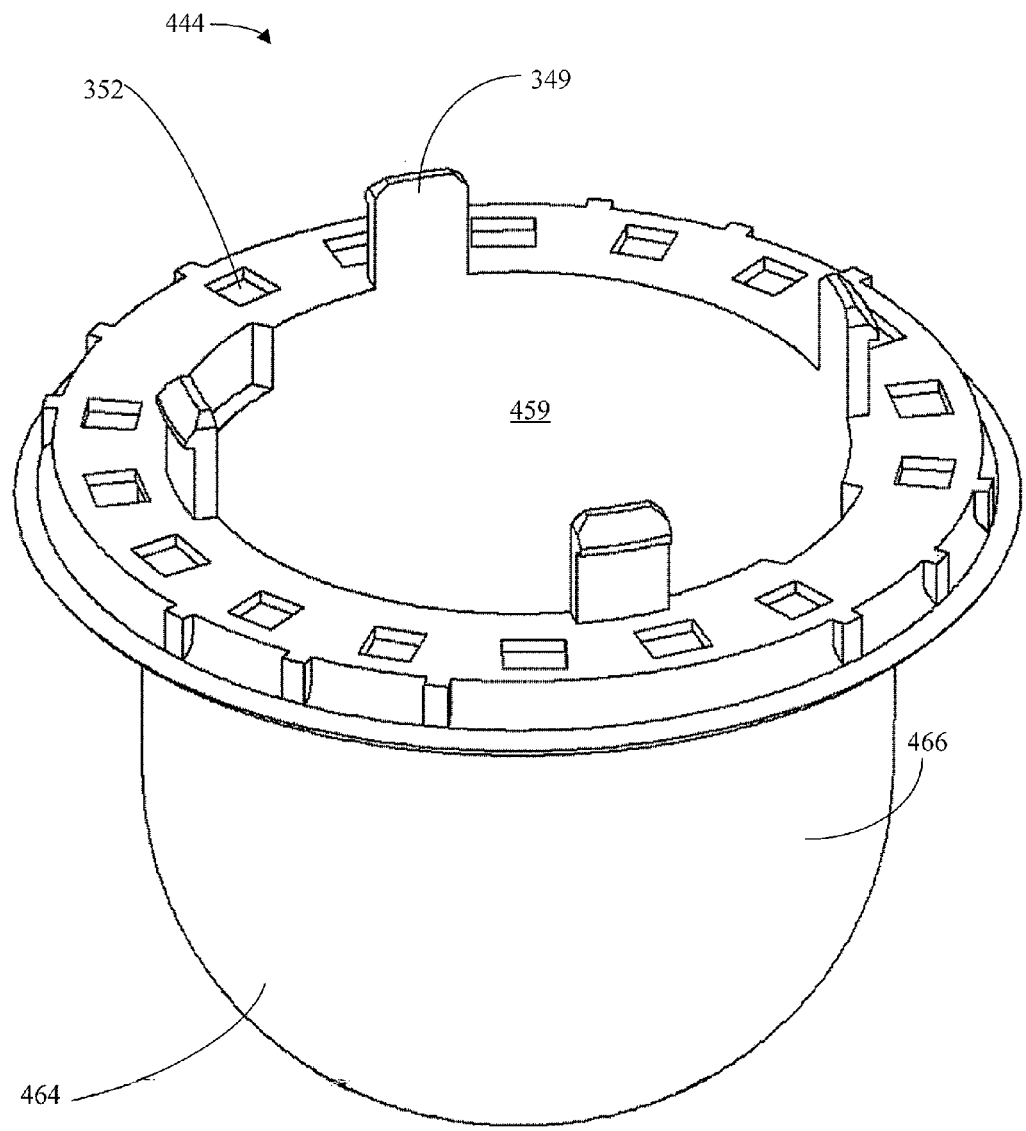

FIGS. 26 and 27 are top and bottom perspective views, respectively, of the proximal end retaining member 444 of the LED lamp 400. In the embodiment shown, the proximal end retaining member 444 includes an outer circumferential wall 450 and an inner circumferential wall 464. The concentric circumferential walls 464, 450 form a recess 446 in which the proximal end 334 of the light guide 332 is disposed (FIG. 25). In some embodiments, the outer circumferential wall 450 includes a reflective circumferential surface extending along the longitudinal axis abutting the outer major surface of the light guide to reflect light into the light guide.

The reflective extension 464 includes a reflecting surface 466 facing toward the inner major surface 338 of the light guide 332. In some embodiments, the reflecting surface 466 is a diffusely reflective surface. In this way, the light output from the LED lamp 400 is made to approximate the appearance of a frosted incandescent A19 lamp.

In some embodiments, the proximal end retaining member 444 is a separate element from the housing 302 that is fixedly mounted to the housing 302. In the exemplary embodiment shown in FIGS. 26 and 27, the light input retaining member 344 includes clips 349 configured to attach the light input retaining member to the housing 302. In such embodiment, the housing includes complementary recesses (not shown) into which the clips 349 can be inserted. Other methods of attaching the proximal end retaining member 334 to the housing are possible (e.g., adhesive, fastening members, etc.). In other embodiments, the proximal end retaining member 444 is integrally formed with the housing 302. Regardless, of whether the proximal end retaining member 444 is a separate element from or is integral with the housing, the proximal end retaining member 444 can be considered a part of the housing 302.

Figure 23:
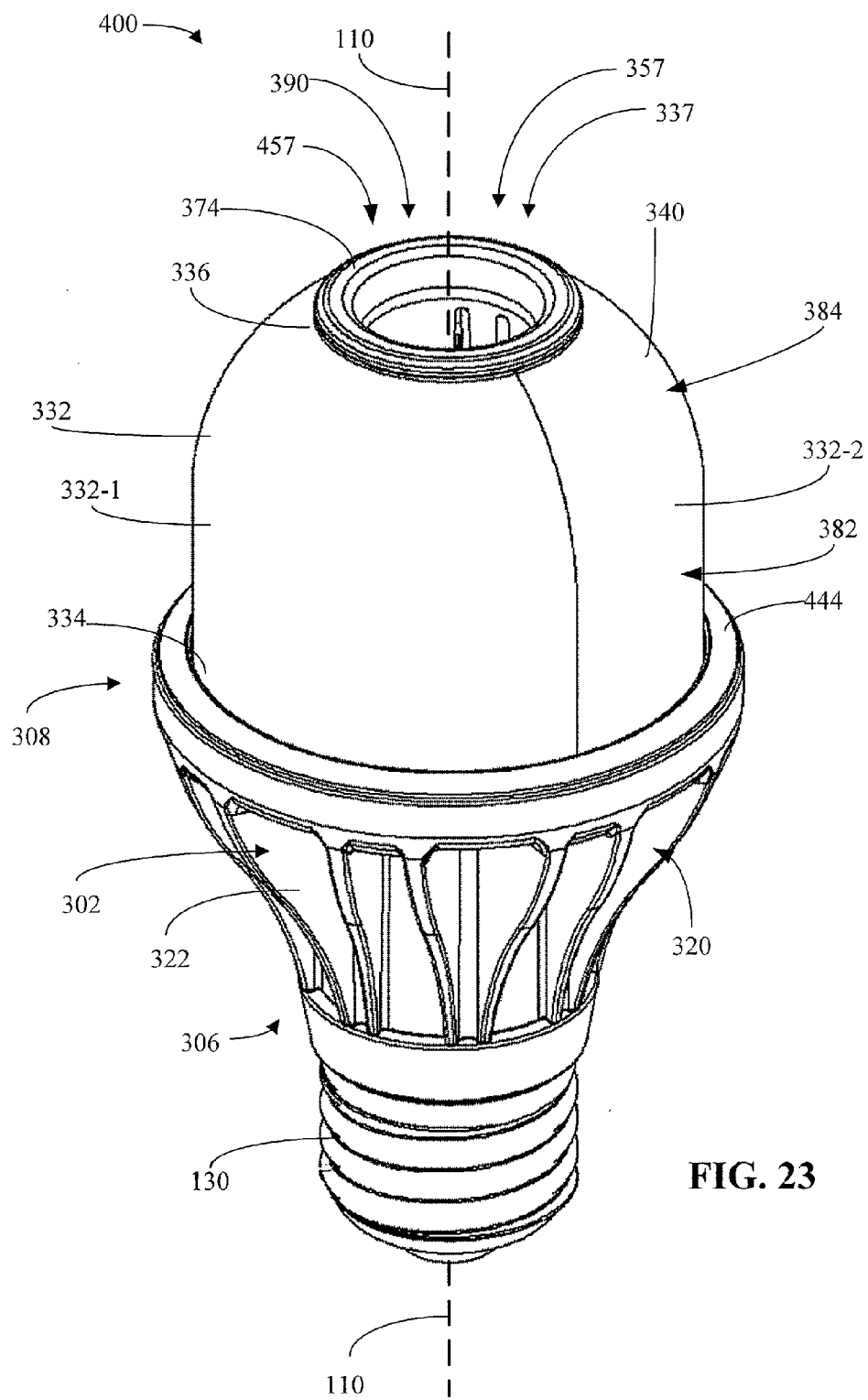
FIG. 23 is a schematic perspective view of another exemplary LED lamp.
Figure 24:
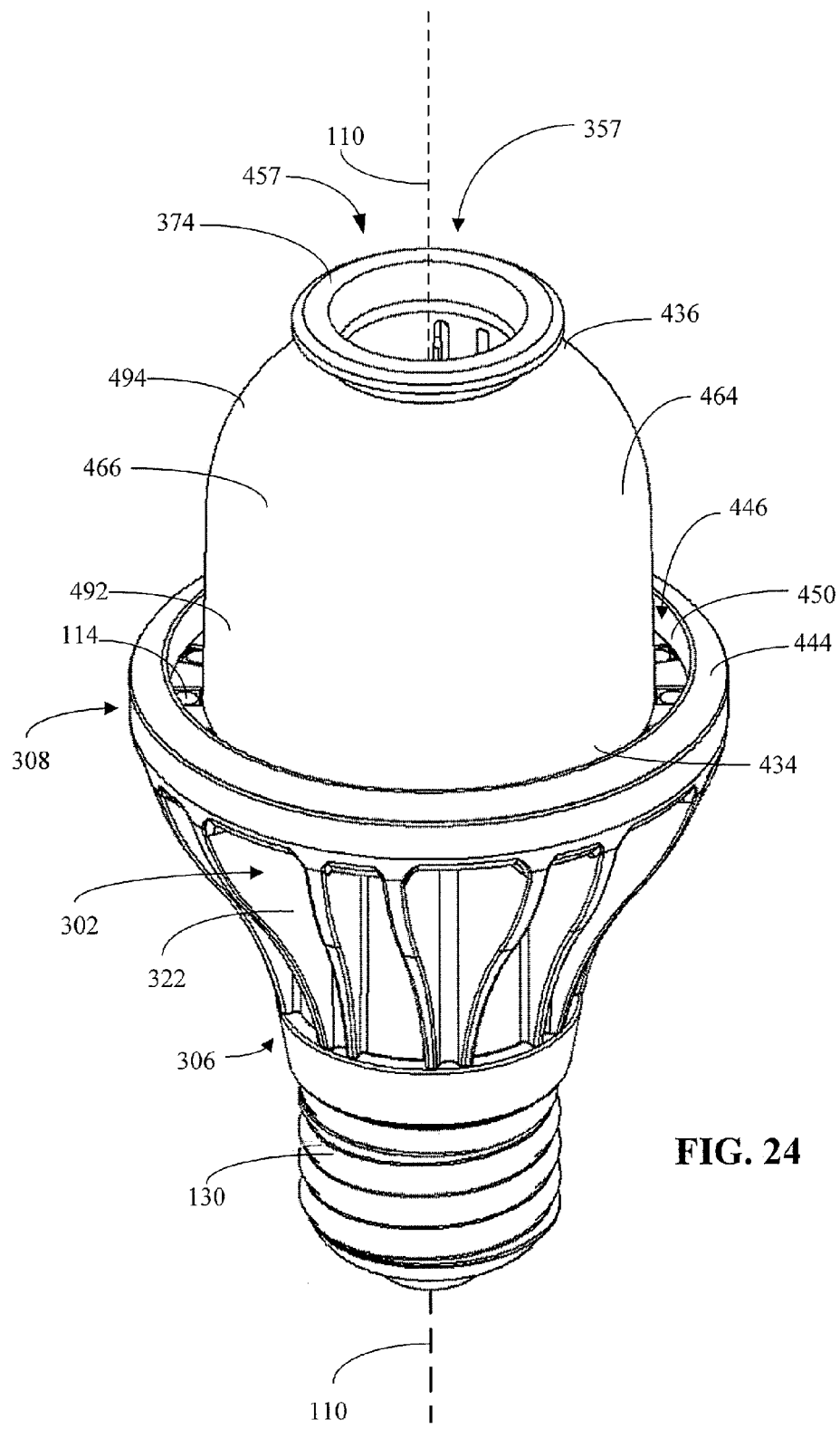
FIG. 24 is a schematic perspective view of the LED lamp of FIG. 23, shown with the light guide removed.

The reflective extension 464 includes an opening 457 at its distal end 436. The distal end retaining member 374 attaches to the distal end 436 of the reflective extension 464 and retains the distal end 336 of the light guide 332. As shown in FIGS. 23-25, the distal end retaining member 374 is fixedly attached to the reflective extension 464. The opening 457 aligns with the opening 357 of the distal end retaining member when assembled, and permits air flow through the cavity 459 of the reflective extension 464 and the internal volume 304 of the housing 302.

In some embodiments, the distal end retaining member 374 is fixedly mounted to the reflective extension 464 of the proximal end retaining member 444, the proximal end retaining member 444 being fixedly mounted to the housing 302. Accordingly, in embodiments in which the light guide 332 is rotatable relative to the housing, the angular position of the light guide including the light input edge 142 is variable relative to the distal end retaining member 374, the proximal end retaining member 444 (including the light sources 114), and the housing 302. Adjustment of the angular position of the light input edge 142 relative to the light sources 114 is desired for spectrum-adjustable LED lamps.

Similar to the LED lamp 300, in some embodiments, each light source 114 is associated with multiple light input regions at the light input edge 142 of the light guide 332. For example, with reference to FIG. 4, discussed above, first and second light input regions are alternately located along the light input edge, and each light source is associated with two adjacently located light input regions (e.g., a first light input region and a second light input region). In other embodiments (not shown), more than two types of light input regions are sequentially located along the light input edge and each light source is associated with more than two adjacently located light input regions. Features of the light input regions have already been described above.

In some embodiments, the light guide 332 includes light extracting elements 154 in, on, or beneath at least one of the major surfaces 338, 340. Features of the light extracting elements 154, as well as methods of manufacturing light guides including light extracting elements 154, have already been described above.

Figure 28:
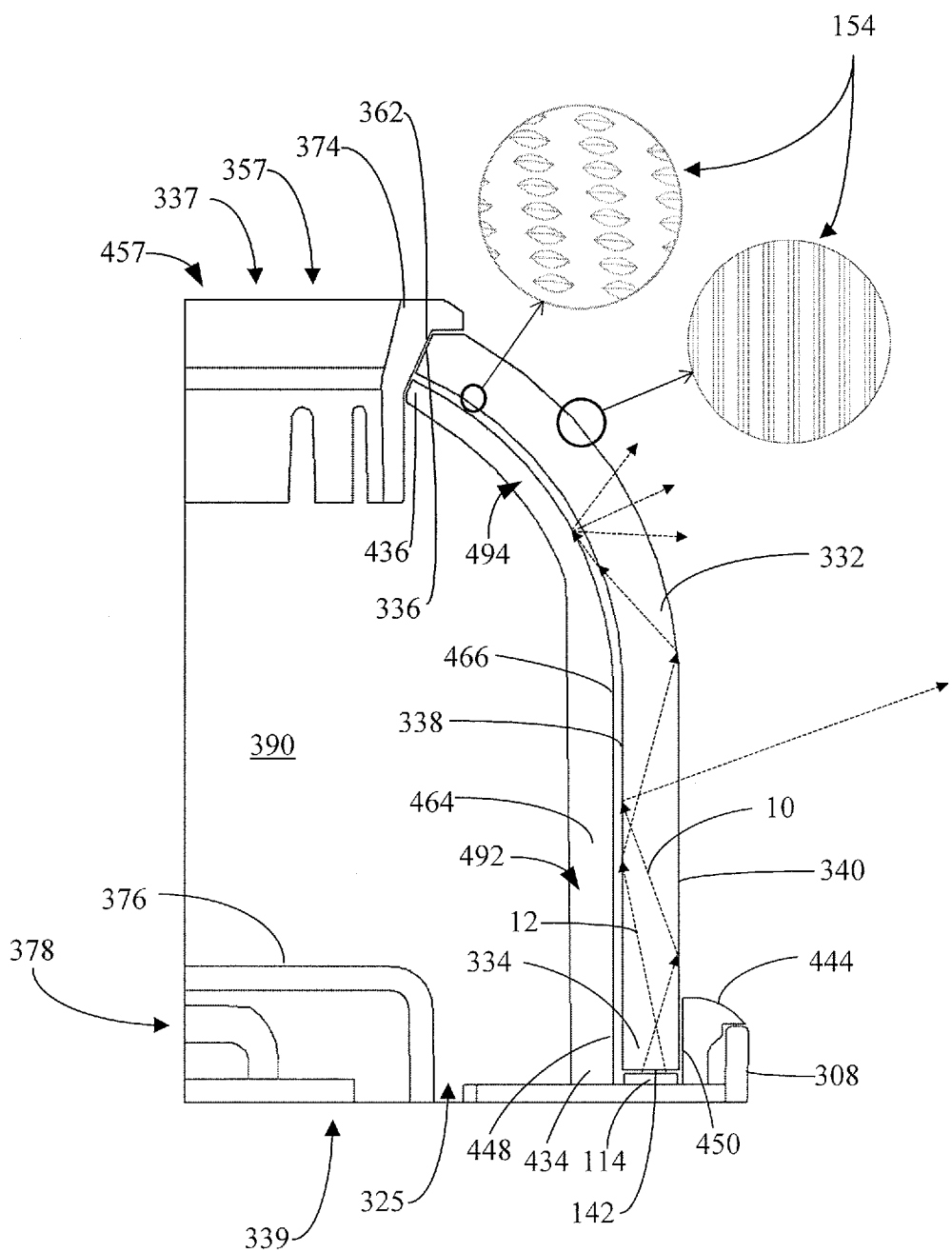
FIG. 28 is a schematic side view of a portion of the LED lamp of FIG. 23, shown in cross-section, additionally illustrating an example of light extracting elements.

FIG. 28 illustrates an exemplary embodiment of the LED lamp 400 including light extracting elements 154. Specifically, micro-optical elements are present on the inner major surface 338 and V-groove elements are present on the outer major surface 340 extending along the longitudinal direction. Exemplary light rays 10 and 12 are input from the light source 114 into the light guide 332 through the input edge 142. Light ray 10 is extracted from the light guide by an optical element at the inner major surface towards the outer major surface and then towards the outside of the LED lamp. Light ray 12 is totally internally reflected at the outer major surface and transmitted through the inner major surface towards the reflective surface 466 of the reflective extension where the light is diffusely reflected. In some examples, the light extracting elements and the reflective extension allow for light to be output from the LED lamp in many directions (e.g., a lambertian output). In some examples, the V-groove elements extending along the longitudinal direction also reduce the visual effect of one or more relatively high-intensity columns of light extending along the light guide 332 from the light input edge, which is also referred to herein as a "head-lighting" effect.

As discussed above in relation to LED lamps 100, 200, 300, 400, in some embodiments, the light guide 132, 232, 332 is rotatable about the longitudinal axis 110 such that the angular position of the light input edge 142 is variable relative to the light sources 114. Each light source 114 is associated with multiple light input regions at the light input edge of the light guide.

FIGS. 29A-29D illustrate an exemplary configuration of light input regions relative to exemplary positions of the light source. Such exemplary configuration is discussed herein in relation to the light input edge 142 of LED lamp 100. However, it will be appreciated that this and other exemplary configurations of the light input regions discussed herein are applicable to the light input edge of other LED lamps (e.g., LED lamps 200, 300, 400).

In the embodiment shown, each light source 114 is associated with first light input region 141 and a second light input region 143 on the light input edge 142. The second light input region 143 includes a spectrum adjuster, and may also be referred to as a spectrum-adjusting region. In one example, the spectrum adjuster is a color attenuating material, for example, a color filter. In another example, the spectrum adjuster is a wavelength-shifting material, for example, one or more of a phosphor material, a luminescent material, a luminescent nanomaterial such as a quantum dot material, a conjugated polymer material, an organic fluorescent dye, an organic phosphorescent dye, and lanthanide-doped garnet.

In some examples, the second light input region 143 is configured as a recessed pocket 145 in which a measured amount of spectrum-adjusting material (e.g., phosphor material such as an amber phosphor or a red phosphor in a polymer matrix) is applied and is cured. The second light input region 143 extends between circumferential end positions 143-1 and 143-4. The second light input region 143 includes sub-region 143-2 adjacent end position 143-1 and sub-region 143-3 adjacent end position 143-4. In some embodiments, the thickness (in the longitudinal direction) of the spectrum adjuster is constant over the area of the recessed pocket 145. In other embodiments, the thickness (in the longitudinal direction) of the spectrum adjuster is varied over the area of the recessed pocket 145. The first light input region 141 is the remainder of the light input edge outside of the second light input region 143.

Sub-region 143-3 is relatively wide, i.e., its dimension in the radial direction is about the same as or greater than the radial extent of the light source (e.g., the light emitting portion of the light source), and its dimension in the circumferential direction is about the same as or greater than the circumferential extent of the light source (e.g., the light emitting portion of the light source). Although, in some embodiments, one or both of the dimensions of the sub-region 143-3 in the radial direction and the circumferential direction can be smaller than the extent of the light source in the associated direction. The sub-region 143-3 is contiguous to itself and is sized to adjust the spectrum of substantially all light from the light source 114 input to the light guide 132 when the light source is positioned adjacent to the first sub-region by relative positioning of the light source 114 and the light guide 132.

Sub-region 143-2 is contiguous with the sub-region 143-3 and extends in a circumferential direction toward the end position 143-1. The radial dimension of sub-region 143-2 tapers from sub-region 143-3 to end position 143-1. In other words, the dimension of the sub-region 143-2 in the radial direction decreases from sub-region 143-3 to end position 143-1 as a function of distance from sub-region 143-3.

In the embodiment shown, light source 114 is configured as a solid-state light emitter package including a blue LED and a circular phosphor region 115 in the optical path of the light from the blue LED with a resultant broad white spectrum that is incident on the light input edge. Other embodiments of the light source 114 and the features associated therewith have already been described above.

With exemplary reference to FIGS. 29A-29D, the second light input region including the spectrum-adjuster is configured to progressively adjust the combined spectrum of the light from the light source input to the light guide as a function of the angular position of the light guide relative to the light source. The term "progressively adjust" as used herein indicates that the adjustment is effectuated in a continuous manner to increasingly change a characteristic of the light or to decreasingly change a characteristic of the light. The change in characteristic may be linearly, nonlinearly, polynomially, exponentially, and/or monotonically related to change in position.

Figure 29A:
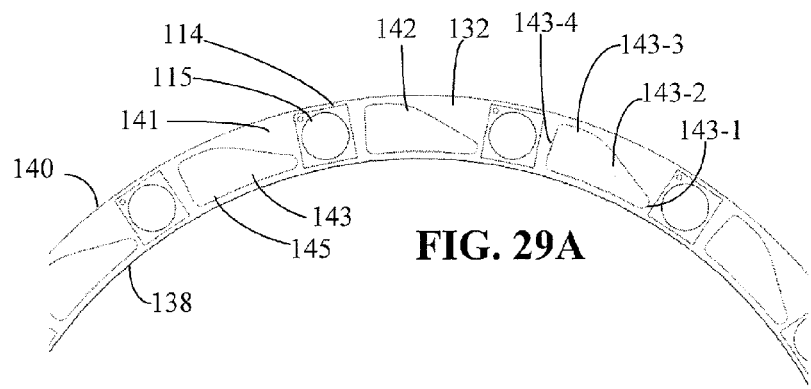
FIGS. 29A-29D are schematic plan views of exemplary positions of a light source relative to light input regions.
Figure 29B:
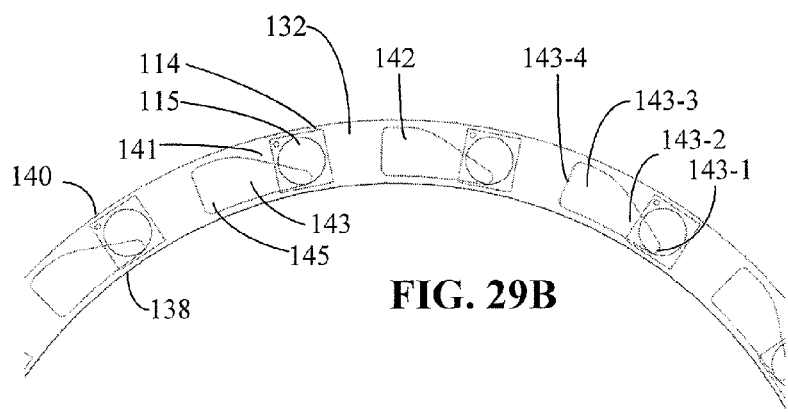
Figure 29C:
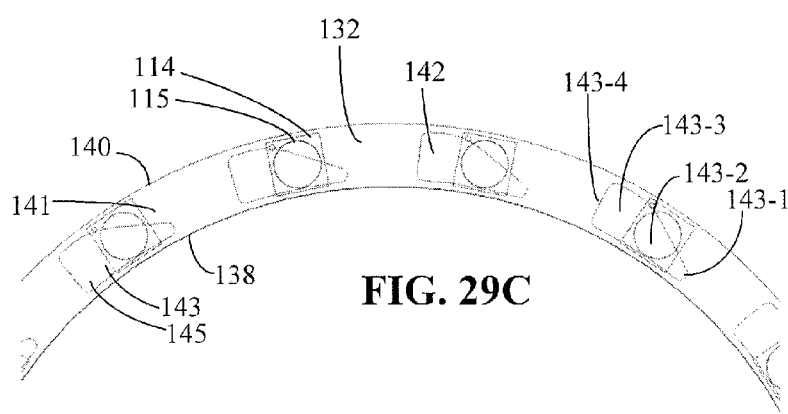
Figure 29D:
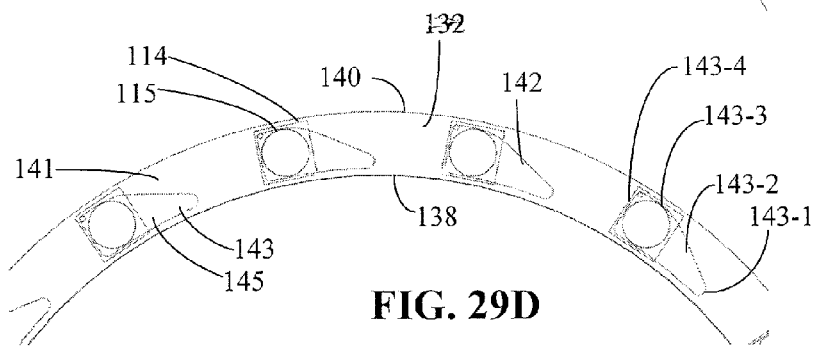

In FIG. 29A, the angular position of the light guide 132 relative to the light source 114 is such that the light source 114 is completely overlapped with the first light input region 141. In this case, there is negligible effect on the light from the spectrum adjuster included in the second light input region 143. In FIG. 29B, the light source 114 is partly overlapped with the first light input region 141 and partly overlapped with the second light input region 143, including the end position 143-1 and the tapered sub-region 143-2. Therefore, there is some effect from the spectrum adjuster included in the second light input region 143. In FIG. 29C, the light source 114 is overlapped with more of the second light input region 143 and with less of the first light input region 141 than in FIG. 29B. Therefore, there is more effect from the spectrum adjuster included in the second light input region 143 than when the relative positioning is as shown in FIG. 29B. In FIG. 29D, the light source 114 is overlapped with the second light input region 143 in the sub-region 143-3. The dimensions of the circular phosphor region 115 of the light source are approximately the same as the dimensions of sub-region 143-3 so substantially all of the light from the light source 114 incident on the light input edge 142 is incident on the second light input region 143. Therefore, there is more effect from the spectrum adjuster than when the relative positioning is as shown in FIG. 29C.

FIGS. 29A-29D show an embodiment of the second light input region including two sub regions between the circumferential end positions. In some embodiments, the second light input region includes more than two sub-regions. In other embodiments, the second light input region includes only one sub-region. For example, although not specifically shown, in some embodiments a sub-region similar to sub-region 143-2 extends between the end positions 143-1 and 143-4. Accordingly, the radial dimension of second light input region may taper from end position 143-4 to end position 143-1.

FIGS. 30-33 illustrate other exemplary configurations of light input regions 141, 143. Similar to the embodiment shown in FIG. 29, each configuration of the second light input region is formed in a recessed pocket. The recessed pocket provides a space for a measured amount of spectrum adjusting material (e.g., phosphor material such as an amber phosphor or a red phosphor in a polymer matrix) to be deposited.

Figure 30:
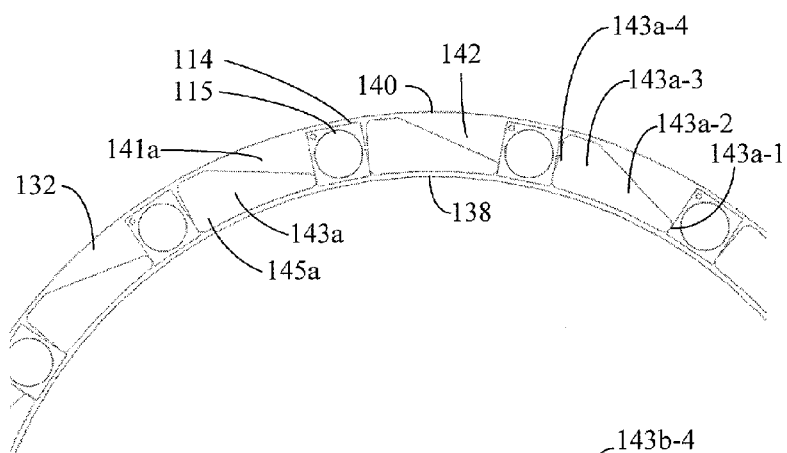
FIGS. 30-33 are schematic plan views of a light source and different light input regions.

FIG. 30 shows an example including a first light input region 141a and a second light input region 143a. Each second light input region 143a includes a relatively wide sub-region 143a-3 adjacent end position 143a-4 is contiguous to itself and is sized to adjust the spectrum of substantially all light from the light source 114 input to the light guide 132 when the light source is positioned adjacent to the sub-region 143a-3 by relative positioning of the light source 114 and the light guide 132. A sub-region 143a-2 is contiguous with the sub-region 143a-3 and tapers in radial dimension from sub-region 143a-3 to end position 143a-1. The second light input region 143a is configured as a recessed pocket 145a in which a measured amount of spectrum-adjusting material (e.g., phosphor material such as an amber phosphor or a red phosphor in a polymer matrix) is applied and is cured. The first light input region 141a is the remainder of the light input edge outside of the second light input region 143a. The light input regions 141a, 143a are similar to the light input regions 141, 143 shown in FIGS. 29A-29D, but the circumferential separation of adjacent second light input regions 143a is smaller such that the circumferential extent between adjacent second light input regions 143a is approximately the circumferential extent of the light source 114. In this way the number of light sources adjacent the light input edge can be increased.

Figure 31:
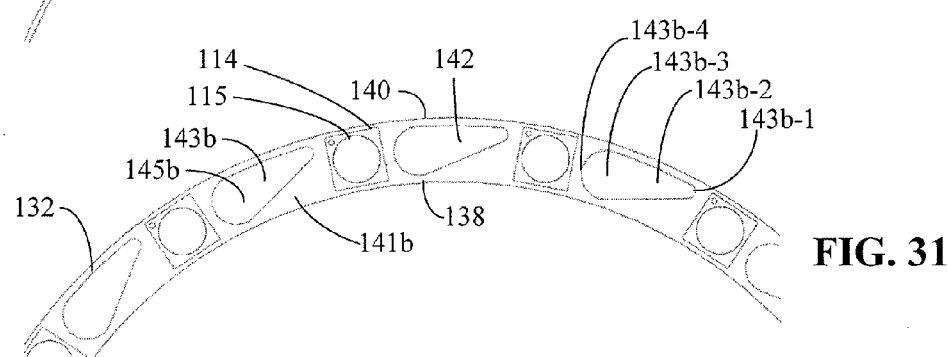

FIG. 31 shows an example including a first light input region 141b and a second light input region 143b. Each second light input region 143b includes a relatively wide sub-region 143b-3 adjacent end position 143b-4 is contiguous to itself and is sized to adjust the spectrum of substantially all light from the light source 114 input to the light guide 132 when the light source is positioned adjacent to the sub-region 143b-3 by relative positioning of the light source 114 and the light guide 132. A sub-region 143b-2 is contiguous with the sub-region 143b-3 and tapers in radial dimension from sub-region 143b-3 to end position 143b-1. The second light input region 143b is configured as a recessed pocket 145b in which a measured amount of spectrum-adjusting material (e.g., phosphor material such as an amber phosphor or a red phosphor in a polymer matrix) is applied and is cured. The first light input region 141b is the remainder of the light input edge outside of the second light input region 143b. The light input regions 141b, 143b are similar to the light input regions 141, 143 shown in FIGS. 29A-29D, but the sub-region 143b-2 of the second light input region 143b tapers toward the outer major surface 140. Also, the sub-region 143b-3 adjacent to the end position 143b-4 has a semi-circular outline (e.g., corresponding to the outline of the circular phosphor region 115 when the light source is overlapped with the sub-region 143b-3). This configuration results in a reduction in the amount of spectrum-adjusting material compared to configurations wherein the sub-region 143-3 includes a rectangular shape.

Figure 32:
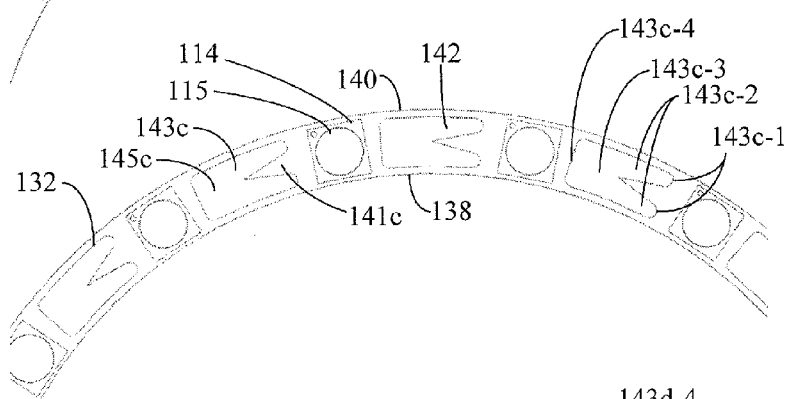

FIG. 32 shows an example including a first light input region 141c and a second light input region 143c. Each second light input region 143c includes a relatively wide sub-region 143c-3 adjacent end position 143c-4 is contiguous to itself and is sized to adjust the spectrum of substantially all light from the light source 114 input to the light guide 132 when the light source is positioned adjacent to the sub-region 143c-3 by relative positioning of the light source 114 and the light guide 132. A sub-region 143c-2 is contiguous with the sub-region 143c-3 and tapers in radial dimension from sub-region 143c-3 to end position 143c-1. The second light input region 143c is configured as a recessed pocket 145c in which a measured amount of spectrum-adjusting material (e.g., phosphor material such as an amber phosphor or a red phosphor in a polymer matrix) is applied and is cured. The first light input region 141c is the remainder of the light input edge outside of the second light input region 143c. The light input regions 141c, 143c are similar to the light input regions 141, 143 shown in FIGS. 29A-29D, but the light input region 143c bifurcates from sub-region 143c-3 toward end position 143c-1 and sub-region 143c-2 tapers toward both the outer major surface 140 and the inner major surface 138.

Figure 33:
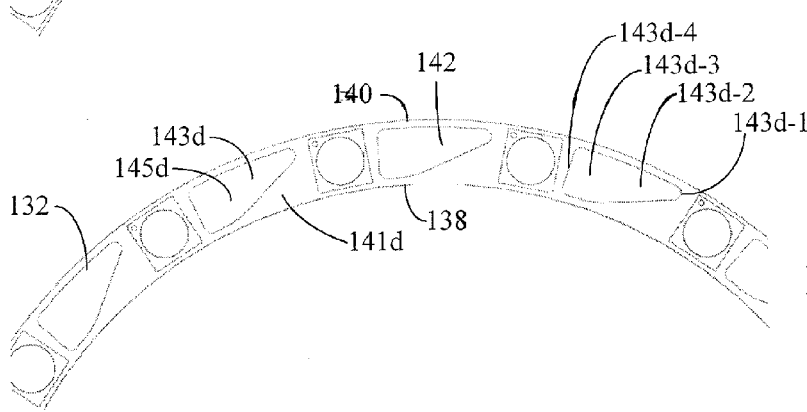

FIG. 33 shows an example including a first light input region 141d and a second light input region 143d. Each second light input region 143d includes a relatively wide sub-region 143d-3 adjacent end position 143d-4 is contiguous to itself and is sized to adjust the spectrum of substantially all light from the light source 114 input to the light guide 132 when the light source is positioned adjacent to the sub-region 143d-3 by relative positioning of the light source 114 and the light guide 132. A sub-region 143d-2 is contiguous with the sub-region 143d-3 and tapers in radial dimension from sub-region 143d-3 to end position 143d-1. The second light input region 143d is configured as a recessed pocket 145d in which a measured amount of spectrum-adjusting material (e.g., phosphor material such as an amber phosphor or a red phosphor in a polymer matrix) is applied and is cured. The first light input region 141d is the remainder of the light input edge outside of the second light input region 143d. The light input regions 141d, 143d are similar to the light input regions 141, 143 shown in FIGS. 29A-29D, but the sub-region 143d-2 tapers toward the outer major surface 140 of the light guide.

In the exemplary embodiments of the light input regions described above, the first light input region 141 is devoid of a spectrum adjuster or other optical modifying element. In other examples, the first light input region 141 imparts an optical modifying characteristic to the light incident thereon.

When a phosphor material is used as a spectrum-adjusting material in the second light input region, the spectrum-adjusting material has an effect of scattering the light passing through the second light input region. When the phosphor absorbs the incident light (shorter-wavelength light) and re-emitted longer wavelength light, the phosphor acts as a Lambertian emitter. Therefore, in some embodiments, a light-scattering material is provided in the first light input region having a light-scattering property. The light scattering property of the first light input region is configured to nominally match the light-scattering property of the spectrum-adjusting material in the second light input region. For example, the light scattering material in the first light input region is at least one of titanium dioxide particles, aluminum oxide particles, silicon dioxide particles, and micro beads dispersed in a transparent matrix at a predetermined concentration. In this way, light from the light source 114 input into the light guide through the light input edge has a similar angular distribution regardless of the degree of spectrum adjustment. In some embodiments, the light-scattering material is selected to have a suitable light-scattering property but negligible spectrum-adjusting property. Accordingly, the spectrum of the light input to the light guide is primarily a function of the second light input region.

Figure 34:
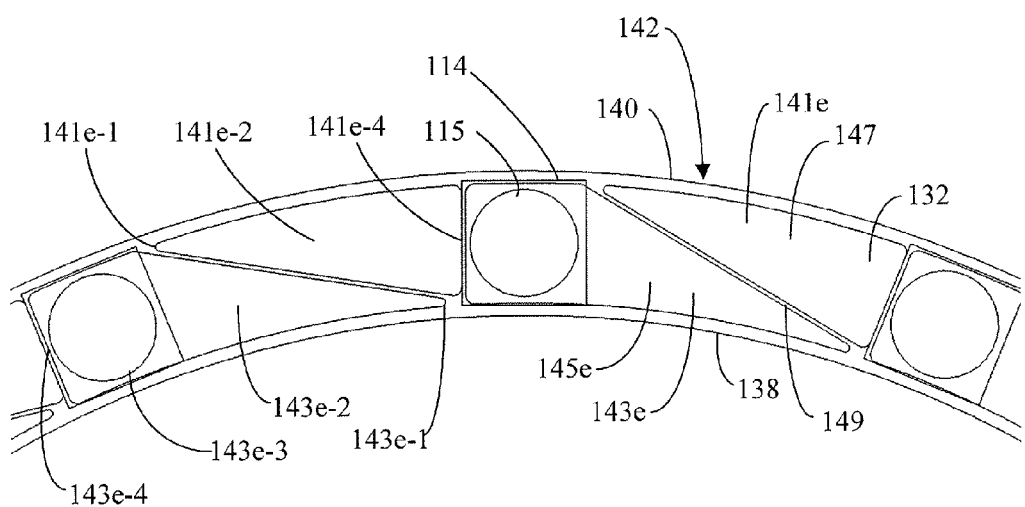
FIG. 34 is a schematic plan view of a light source and different light input regions.

FIG. 34 shows another exemplary configuration of light input regions in which the light input regions are embodied as a spectrum adjuster and a light redirector, respectively. More specifically, the second light input region 143e includes a spectrum-adjusting material (e.g., a phosphor material) disposed in a second recessed pocket 145. The second light input region 143e includes sub-region 143e-2 adjacent end position 143e-1 and sub-region 143e-3 adjacent end position 143e-4. The second light input region 143e is similar to the second light input regions 143 shown in FIGS. 29A-29D.

The first light input region 141e includes a light-scattering material (e.g., titanium dioxide, aluminum oxide, silicon dioxide, and/or micro beads) disposed in a first recessed pocket 147. In such an embodiment, the first light input region may also be referred to as a light-redirecting region. The first light input region 141 extends between circumferential end positions 141e-1 and 141e-4. The first light input region 141 has intermediate region 141e-2 extending between end position 141e-1 and end position 141e-4. The radial dimension the intermediate region 141e-2 tapers from end position 143e-4 to end position 143e-1. In other words, the dimension of the intermediate region 143-2 in the radial direction decreases from end position 143e-4 to end position 143e-1 as a function of distance from end position 143e-4. In some embodiments, the thickness (in the longitudinal direction) of the light scattering material is constant over the area of the recessed pocket recessed pocket 145. In other embodiments, the thickness (in the longitudinal direction) of the light scattering material is varied over the area of the recessed pocket 147.

Each light source 114 is associated with the first light input region 141e and the second light input region 143e. The shape of first light input region 141e and the shape of the second light input region 143e are complementary to each other such that substantially all of the light from the light source is incident on the spectrum adjuster or light redirector. At any particular circumferential location, the sum of the radial dimension of the first and second light input regions remains approximately constant and approximately equal to or greater than the radial dimension of the light source 114. In this way, most of the light output from the light source 114 is apportioned between the first and second light input regions and the angular position of the light source relative to the first and second light input regions determines the fraction of apportionment between the first and second light input regions. In the example of FIG. 34, there is no position where the light is not incident on the spectrum adjuster. Therefore, there is always some amount of spectrum adjustment.

The recessed pockets 145, 147 are separated by a barrier wall 149. The barrier wall 149 can be made as thin as practically possible to reduce the light lost at the barrier wall 149. In the example shown, the barrier wall 149 traverses diagonally across the light input edge between locations close to the major surfaces 138, 140 of the light guide.

Figure 35A:
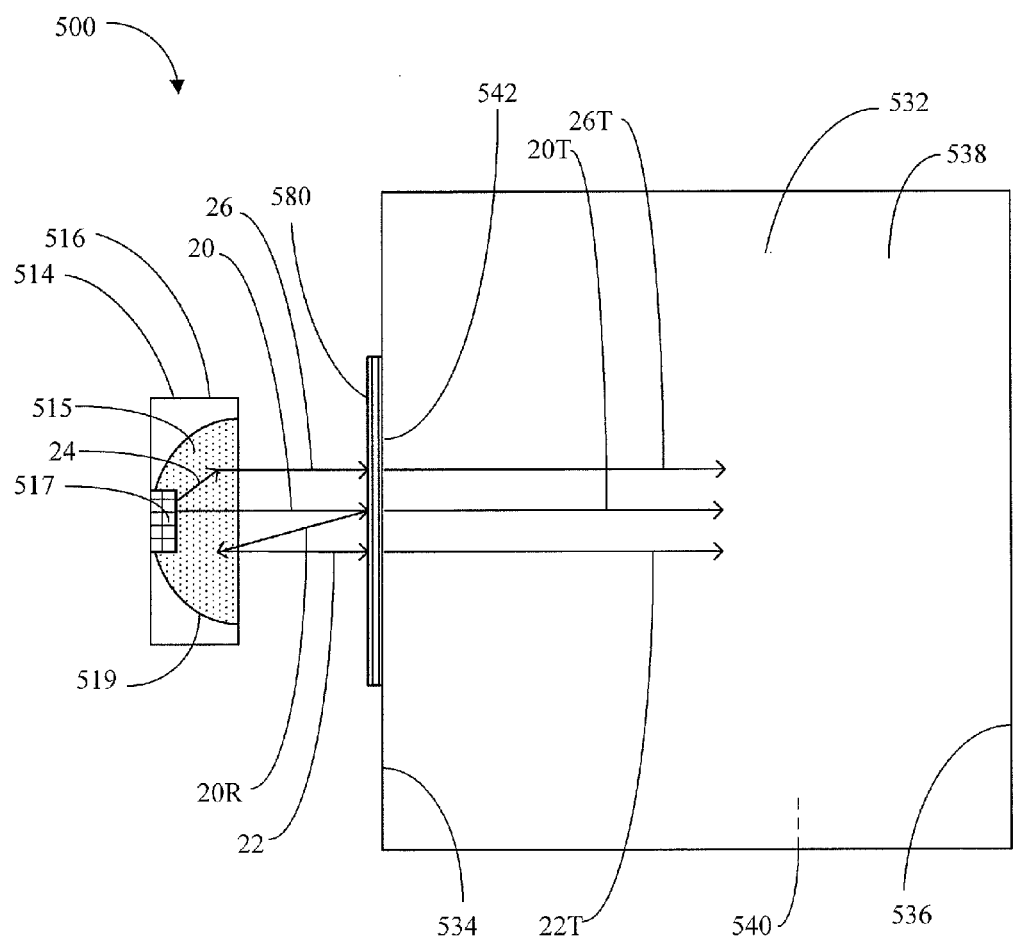
FIGS. 35A-35C are schematic diagrams of exemplary optical configurations suitable for use in an LED lamp.

Turning now to FIG. 35A, an exemplary optical configuration suitable for use in a LED lamp is shown at 500. The optical configuration includes a light source 514 and a light guide 532.

The light guide 532 is a solid article of manufacture made from, for example, polycarbonate, poly(methyl-methacrylate) (PMMA), glass, or other appropriate material. The light guide may also be a multi-layer light guide having two or more layers that may differ in refractive index. The light guide 532 includes opposed major surfaces 538, 540 that extend between a proximal end 534 and a distal end 536. The proximal end 534 of the light guide 532 provides a light input edge 542 through which light from the light source 514 is input to the light guide 532. Each light source 514 is configured to edge light the light guide 532 such that light from the light source 514 enters the light input edge 542 and propagates along the light guide 532 by total internal reflection at the opposed major surfaces.

A wavelength filter 580 is positioned at the light input edge 542 of the light guide 532. In the illustrated example, the wavelength filter 580 is fixed in position relative to the light guide 532. Details regarding the wavelength filter 580 are discussed in more detail below with reference to FIGS. 37A, 37B, and 37C.

The light source 514 is configured as a solid-state light emitter package 516 including a pump light emitter 517 and a wavelength shifter 515. In some embodiments, the pump light emitter is a light emitter with pump light output having at least one peak in a wavelength range of 400 nm-470 nm. Examples of such a pump light emitter 517 include a blue LED (output peak in a wavelength range 450 nm-470 nm) and a violet LED (output peak in a wavelength range 400 nm-450 nm). In some embodiments, the wavelength shifter 515 is configured as a phosphor region including a phosphor. The wavelength shifter 515 (phosphor region) is defined by a volume within a reflective cup 519, with the pump light emitter 517 being positioned at the bottom of the cup 519. In other embodiments, the wavelength shifter 515 includes luminescent nanomaterials (e.g., quantum dots) and organic luminescent materials (e.g., conjugated polymers).

The wavelength shifter 515 absorbs a portion of the pump light emitted from the pump light emitter 517 and re-emits the light as down-converted light. In some embodiments, the down-converted light is in a wavelength range of 500 nm-750 nm. The remainder of the pump light (e.g., a minority of the pump light) is not absorbed by the wavelength shifter and is output from the light source 514. Accordingly, the light output by the light source 514 includes a portion of the pump light and a portion of the down-converted light, and is collectively referred to as source light. In the configuration shown in FIG. 35, substantially all of the source light output by the light source is incident on the wavelength filter 580.

Figure 35B:
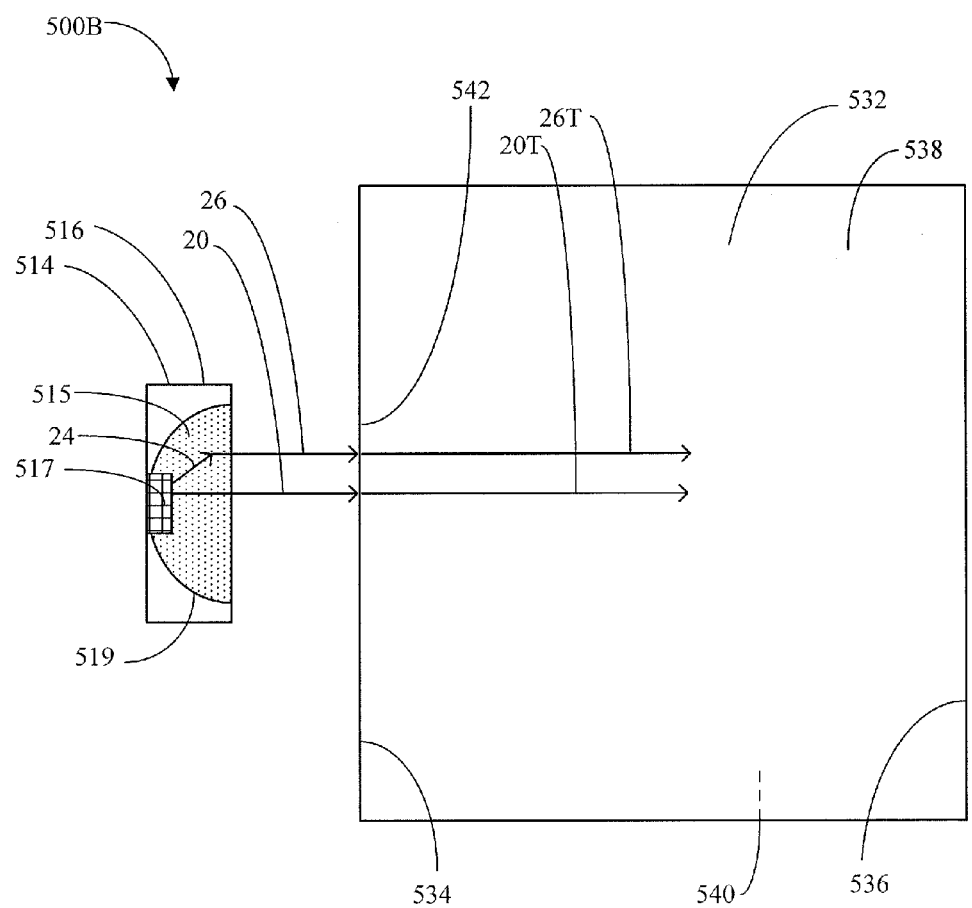
Figure 35C:
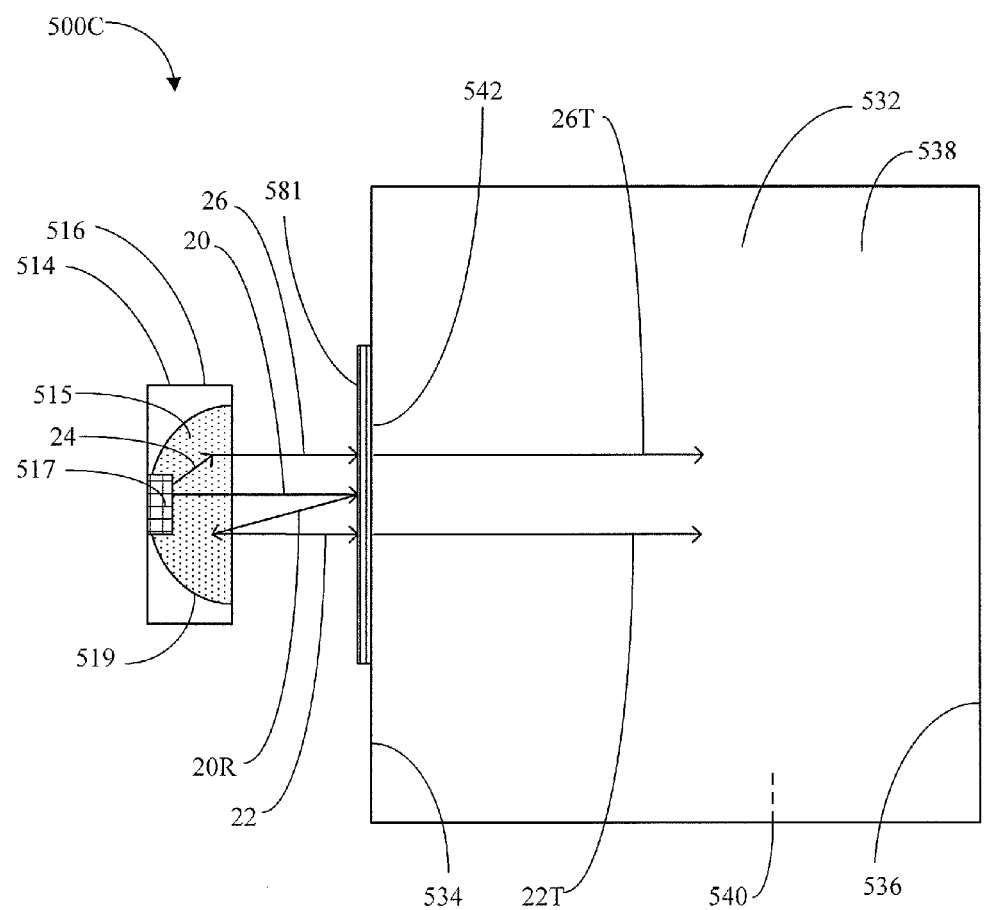

FIGS. 35B and 35C show first and second comparative examples, respectively, of the optical configuration of FIG. 35A. Specifically, the optical configuration 500B of first comparative example shown in FIG. 35B does not include a filter between the light source and the light guide. The optical configuration 500C of second comparative example shown in FIG. 35C includes a long-pass filter 581. Several light rays are used in FIGS. 35A-35C to explain several optical configurations, and are discussed in detail below.

Figure 36:
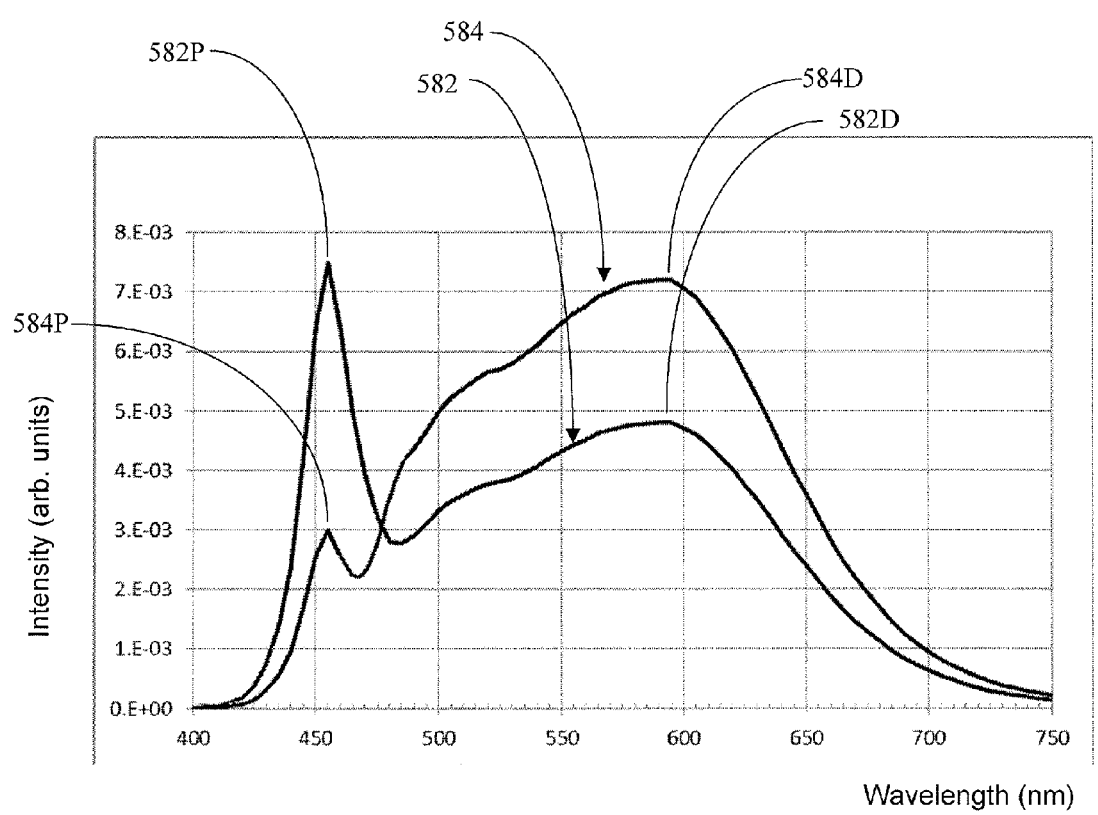
FIG. 36 shows the output spectra of: (1) the light output by the LED lamp of FIG. 35 and (2) the light output by a first comparative example LED lamp.

FIG. 36 shows the output spectra of: (1) the light output by the optical configuration of FIG. 35A (output spectrum 584), and (2) the light output by the first comparative example optical configuration shown in FIG. 35B (output spectrum 582). Each of the output spectra 582 and 584 includes a spectral component 582P, 584P having a narrower peak near 455 nm attributable to the blue light (pump light) emitted by the blue LED, and a spectral component 582D, 584D having a broader peak near 590 nm attributable to the down-converted light from the phosphor.

In the case of the first comparative example shown in FIG. 35B (i.e., having no wavelength filter 580), blue light (pump light) represented by light ray 20 is emitted by the pump light emitter 517, passes through the phosphor region 515 without being down-converted, and is incident on the light input edge 542. Aside from scattering and Fresnel reflection losses, substantially all of the blue light is transmitted into the light guide, represented by light ray 20T. Transmitted blue light ray 20T propagates in the light guide 532 from the proximal end 534 toward the distal end 536 by total internal reflection. Additionally, blue light represented by light ray 24 is emitted by the pump light emitter 517, absorbed by phosphor material in the phosphor region 515, and is re-emitted as down-converted light represented by light ray 26. Down-converted light ray 26 is incident on the light input edge 542. Aside from scattering and Fresnel reflection losses, substantially all of the down-converted light is transmitted into the light guide, represented by light ray 26T. Transmitted down-converted light ray 26T propagates in the light guide 532 from the proximal end 534 toward the distal end 536 by total internal reflection. The resulting output spectrum is shown as spectrum 582 in FIG. 36.

Figure 37A:
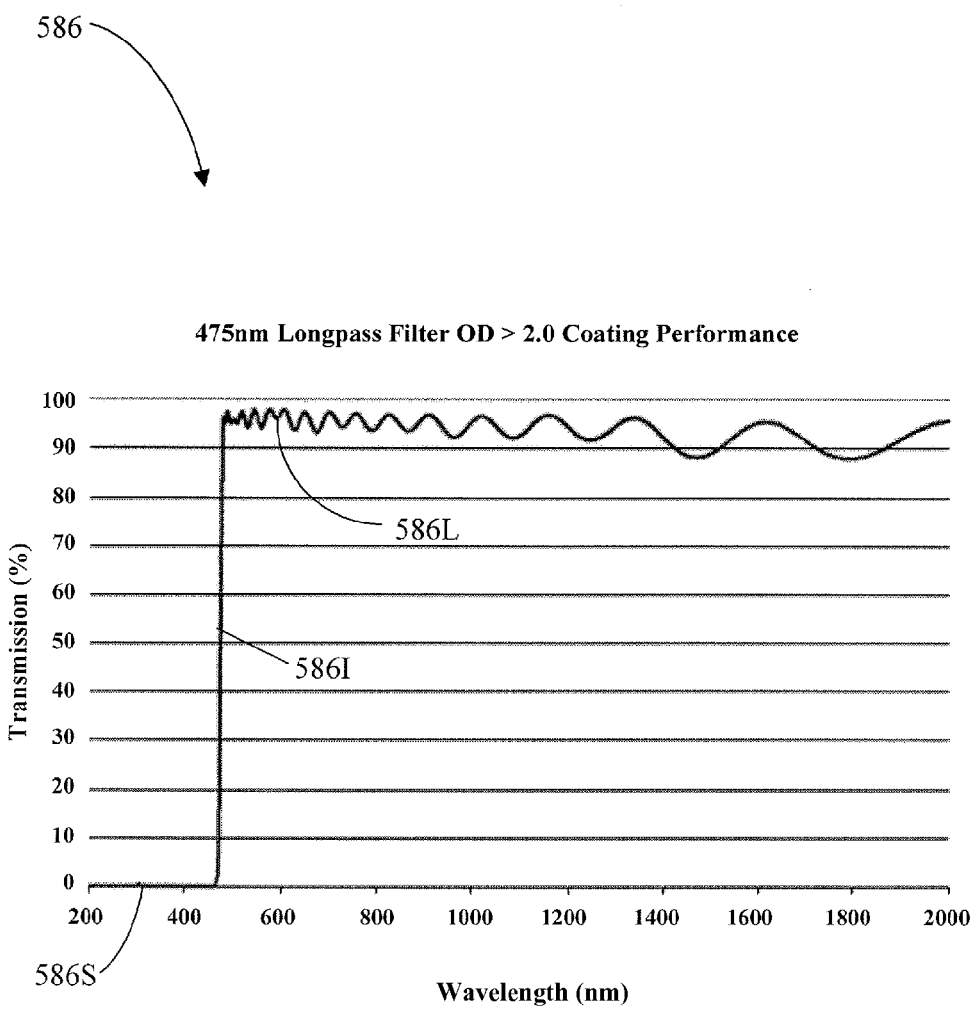
FIG. 37A is a transmittance spectrum of a long-pass filter.

In the case of the second comparative example shown in FIG. 35C, the long-pass 581 filter has a transmittance spectrum 586 as shown in FIG. 37A. A long-pass filter is an optical filter that transmits longer wavelengths and rejects (reflects) shorter wavelengths. The transmittance spectrum shown in FIG. 37A is the transmittance spectrum 586 of a commercially-available long-pass filter, stock number 64-617, available from Edmund Optics. This filter is designed for 0° incidence (normal incidence). The cut-on wavelength is 475 nm. As shown in FIG. 37A, the transmittance spectrum 586 of the long-pass filter 581 includes a shorter wavelength component 586S in which most of the light is rejected (reflected), a longer wavelength component 586L in which most of the light is transmitted, and an intermediate wavelength component 586I for wavelengths intermediate between the rejection wavelengths and transmission wavelengths and including the cut-on wavelength of 475 nm.

In the second comparative example, the long-pass filter 581 and light source 514 are positioned such that substantially all of the light output from the light source is incident on the long-pass filter 581. The down-conversion of blue light ray 24 into down-converted light ray 26 and its transmission into the light guide as transmitted down-converted light ray 26T are identical to the first comparative example. Additionally, blue light (pump light) represented by light ray 20 is emitted by the blue LED 617, passes through the phosphor region 515 without being down-converted and is incident on the long-pass filter 581. Substantially all of the blue light from the blue LED is reflected by the long-pass filter back toward the phosphor region 515, represented as reflected light ray 20R. The reflected blue light (light ray 20R) is absorbed by phosphor material in the phosphor region 515, and is re-emitted as down-converted light represented by light ray 22. Down-converted light ray 22 is incident on the long-pass filter 581. Most of the down-converted light is transmitted into the light guide, represented by light ray 22T. Transmitted down-converted light ray 22T propagates in the light guide 632 from the proximal end 534 toward the distal end 536 by total internal reflection. Hence, most of the light propagating in the light guide 532 is down-converted light and most of the blue pump light is excluded from the light guide. Since white light consists of a mix of the primary colors red, green, and blue, the resulting output spectrum would not be white.

Figure 37B:
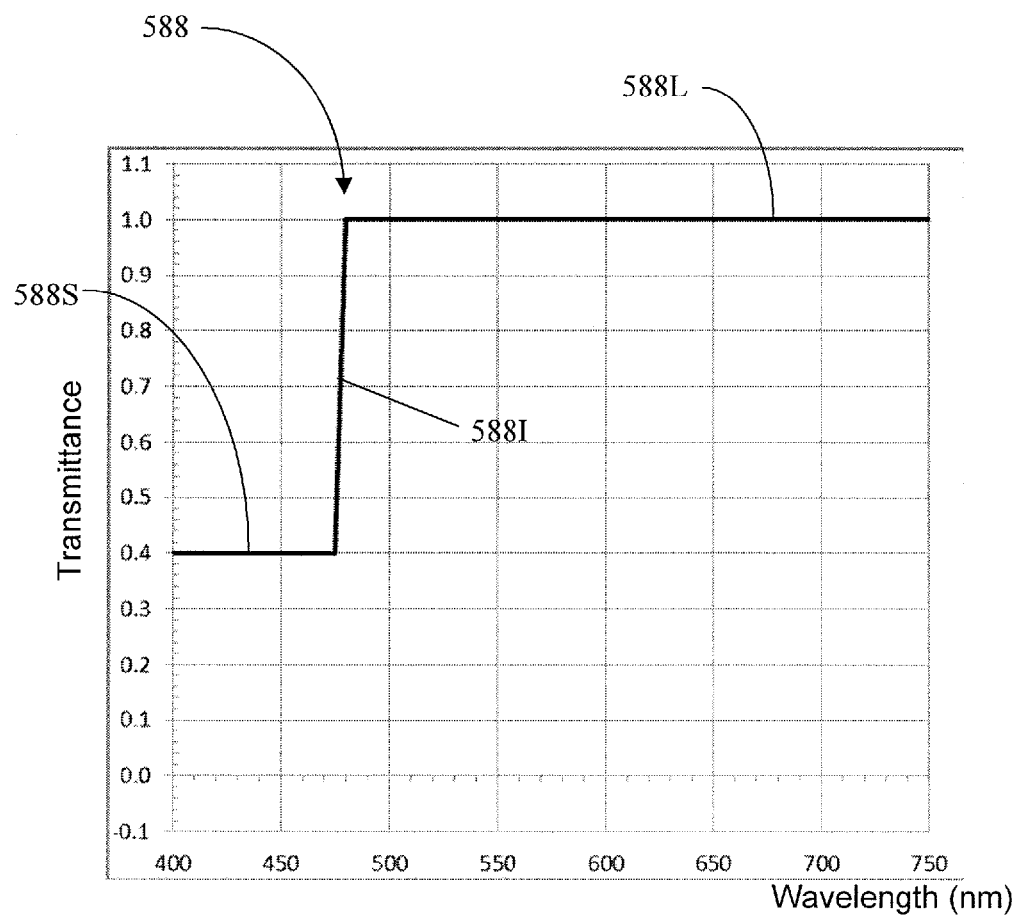
FIG. 37B is a transmittance spectrum of an idealized wavelength filter for use in the optical configuration of FIG. 35A.

In the example corresponding to the configuration of FIG. 35A, the wavelength filter 580 having a transmittance spectrum 588 shown in FIG. 37B is used as the wavelength filter. FIG. 37B shows a transmittance spectrum 588 of an idealized wavelength filter. The transmittance spectrum 588 includes a shorter wavelength component 586S in the wavelength range 400 nm-475 nm in which approximately 40% of the light is transmitted. Assuming that there is neither loss nor absorption, approximately 60% of the light is therefore reflected. The transmittance spectrum 588 also includes a longer wavelength component 588L in the wavelength range 480 nm-750 nm in which approximately 100% of the light is transmitted. Furthermore, the transmittance spectrum 588 includes an intermediate wavelength component 588I in the wavelength range 475 nm-480 nm. From 475 nm to 480 nm, the transmittance increases linearly from approximately 40% to approximately 100%.

In this example, if a wavelength filter having a transmittance spectrum 588 shown in FIG. 37B were used as the wavelength filter 580 in FIG. 35A, the resulting output spectrum is expected to be spectrum 584 in FIG. 36. In comparison to spectrum 582 which corresponds to the case in which no wavelength filter is present (FIG. 35B), the spectral component 584P corresponding to the blue pump light is lower in intensity and the spectral component 584D corresponding to the down-converted light is greater in intensity. These changes can be understood with reference to FIG. 35A. The wavelength filter would reflect approximately 60% of the blue pump light 20 (reflected light being represented as light ray 20R) and transmit approximately 40% of the blue pump light 20 into the light guide 532 (transmitted light being represented as light ray 20T). That is, the light propagating in the light guide 532 is a mixture of blue pump light and down-converted light, as the blue pump light is not completely excluded from the light guide 532. With appropriate ratios of pump and down-converted light in the light guide, the resulting spectrum can be white.

Figure 38:
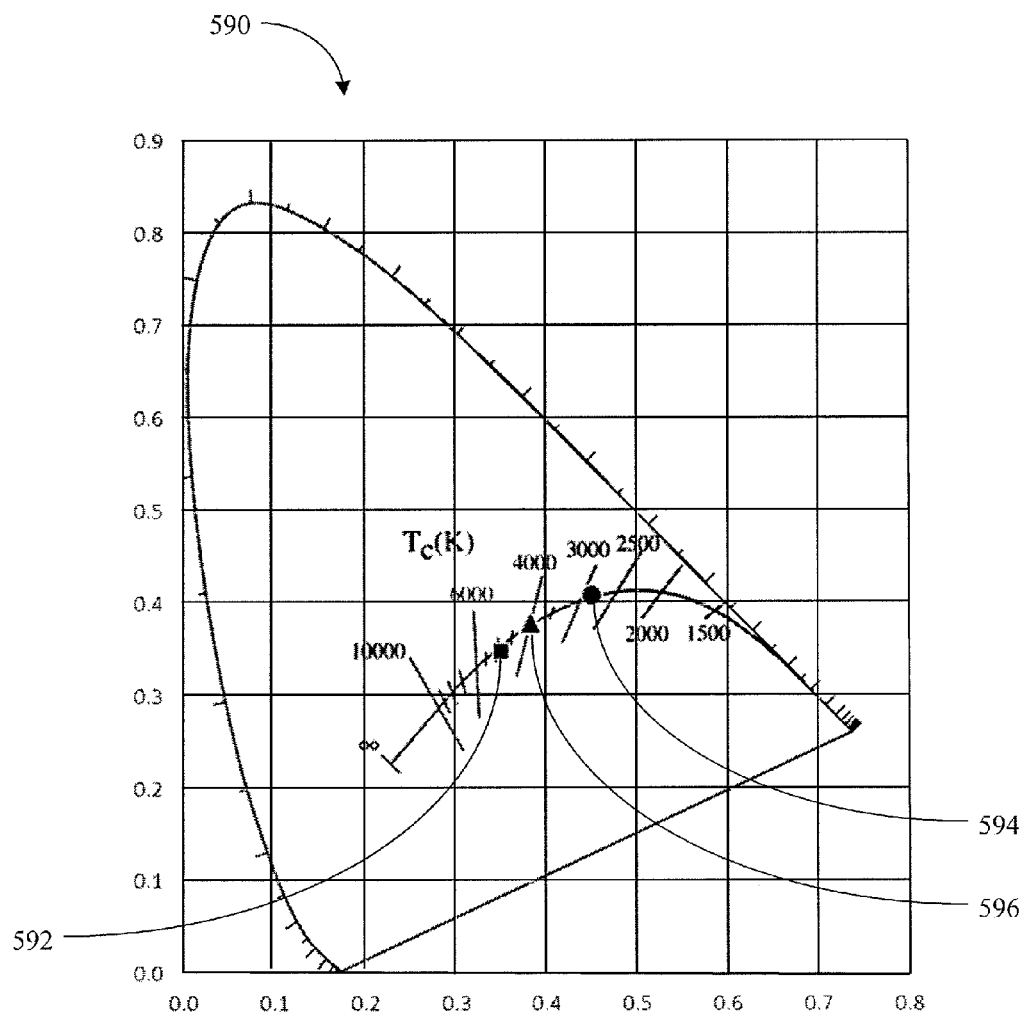
FIG. 38 is a CIE 1931 chromaticity diagram showing the color temperatures of the light output by the exemplary LED lamps of FIGS. 35A-35C.

In some embodiments, the wavelength filter 580 can be used to reduce the color temperature of the white light output from the light guide. FIG. 38 shows a CIE 1931 chromaticity diagram in which point 592 (color temperature of 5000 K) represents the output spectrum 582 (FIG. 35B) corresponding to the wavelength filter being absent, and point 594 (color temperature 3000 K) represents the output spectrum 584 corresponding to the wavelength filter 580 in FIG. 35A having the transmittance spectrum 588 (FIG. 37B).

Figure 37C:
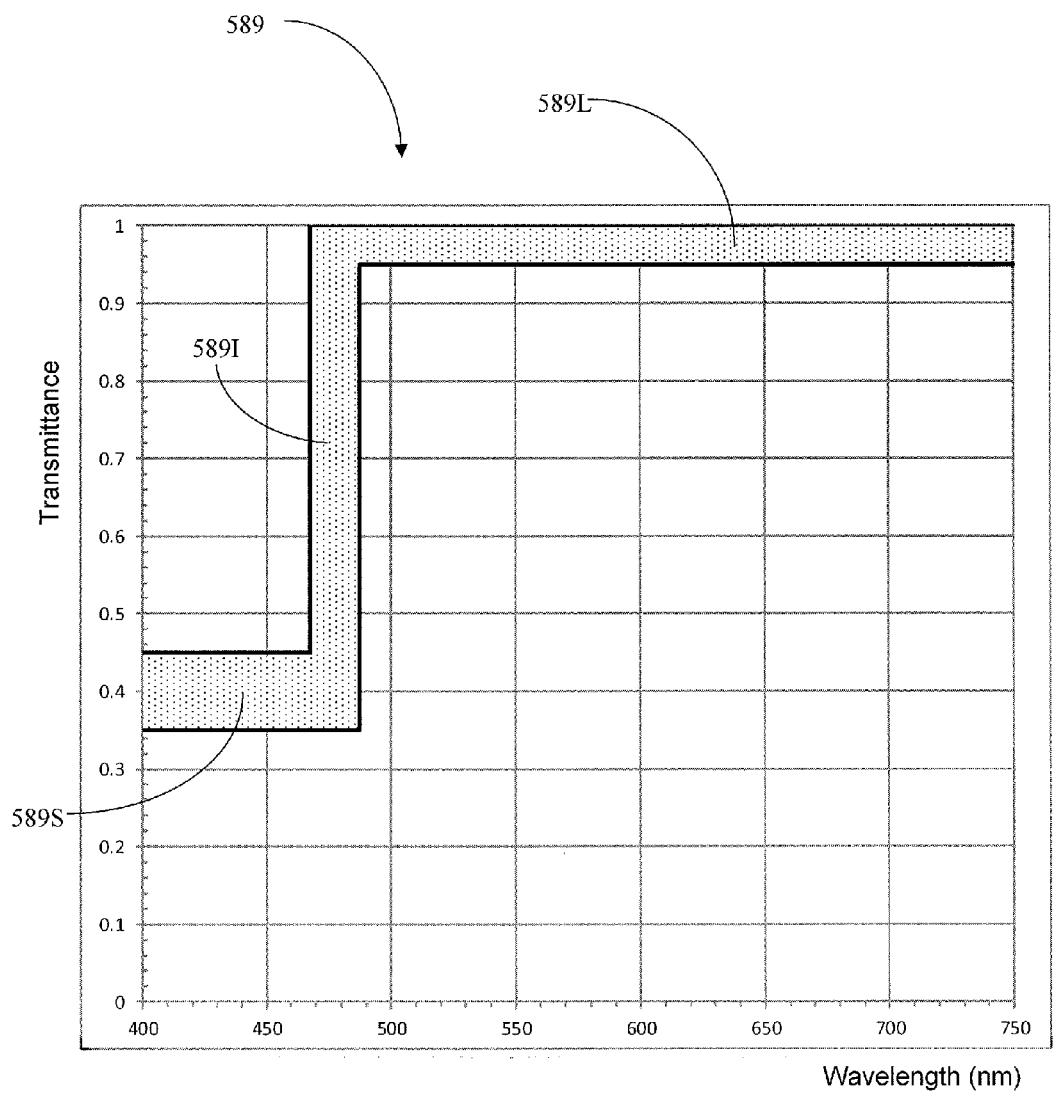
FIG. 37C is a transmittance spectrum of a wavelength filter for use in the optical configuration of FIG. 35A.

Transmittance spectrum 588 shown in FIG. 37B is that of an idealized wavelength filter. In some embodiments, a wavelength filter can be obtained that approximates the characteristics of the idealized wavelength filter in several respects. FIG. 37C shows a transmittance spectrum 589 that provides a band of allowable transmittance values in the wavelength range 400 nm-750 nm. It is expected that a wavelength filter can be realized in practice which has a transmittance spectrum falling in the allowable band. In some embodiments, the wavelength filter is specified to have a transmittance of approximately 35% to approximately 45% in the wavelength range 400 nm-467.5 nm (shorter wavelength component 189S) and a transmittance of approximately 95% to approximately 100% in the wavelength range 487.5 nm-750 nm (longer wavelength component 189L). In some embodiments, the transmittance of the wavelength filter changes from the range of approximately 35% to approximately 45% at 467.5 nm to the range of approximately 95% to approximately 100% at 487.5 nm. It is expected that if such wavelength filter were employed as wavelength filter 580 in the optical configuration of FIG. 35A, the resulting output spectrum will only deviate slightly from the output spectrum 584 (FIG. 36).

Additional options may be possible for relaxing the specifications on the wavelength filter. The photopic eye sensitivity function V(λ) decreases progressively from a maximum at 555 nm to 750 nm. Therefore, in some embodiments, it is satisfactory to limit maximum wavelength of the wavelength range of the longer wavelength component 589L over which the transmittance of the wavelength filter is specified to 700 nm, or to 650 nm. In any case, the transmittance is specified over a wavelength range that includes the peak wavelength of the down-converted light. While FIG. 37C specifies the transmittance of the longer wavelength component 589L to be in a range of approximately 95% to approximately 100%, in some embodiments, the transmittance is specified to be in a range of approximately 90% to approximately 100%, or is specified to be in a range of approximately 85% to approximately 100%, with a corresponding loss in light output from the light guide.

In the above discussion of the transmittance spectra 588, 589 of FIGS. 37B and 37C, the transmittance of the shorter wavelength component 588S, 589S is specified under the assumption that the reflectance and the transmittance add up to unity. Since the purpose of the shorter wavelength component 588S, 589S is to reflect some of the pump light back into the wavelength shifter, in some embodiments, the reflectance of the shorter wavelength component 588S, 589S is specified. Under the assumption of no loss, FIG. 37C specifies the reflectance of the shorter wavelength component 589S to be in a range of approximately 55% to approximately 65%. However, depending on factors such as the characteristics of the pump light emitter and the wavelength shifter and the desired shift in color temperature, it may be satisfactory to specify the reflectance of the shorter wavelength component to be in a range of approximately 50% to approximately 70%, or in a range of approximately 45% to approximately 75%.

FIG. 37C specifies the reflectance (via the transmittance) of the shorter wavelength component 589S over a wavelength range of approximately 400 nm to approximately 467.5 nm. The maximum wavelength (467.5 nm) of the shorter wavelength component 589S and the minimum wavelength (487.5 nm) of the longer wavelength component 589L bound the desired cut-on wavelength (477.5 nm). Since the desired cut-on wavelength should be longer in wavelength than the peak wavelength of the pump light emitter, the desired cut-on wavelength depends on the specific choice of pump light emitter. The reflectance of the shorter wavelength component can be specified at the peak wavelength of the pump light emitter, as well as a wavelength range of 20 nm, or 30 nm centered on the peak wavelength of the pump light emitter. The minimum wavelength of the longer wavelength component (589L in FIG. 37C) depends on the peak wavelength of the pump light emitter and the constraints of making a wavelength filter. In some embodiments, the minimum wavelength of the longer wavelength component can be 50 nm greater than the peak wavelength of the pump light emitter.

The optical configuration of FIG. 35A is described with respect to a generic light guide. In some embodiments, the optical configuration of FIG. 35A can be used in the LED lamps 100, 200, 300, 400 described above. For example, the LED lamps can be configured to be spectrum-adjustable, such that by rotation of the light guide about the longitudinal axis, the output can change between point 592 (5000 K) and point 594 (3000 K) on the chromaticity diagram (FIG. 38). Rotation of the light guide about the longitudinal axis can also change the output to correspond to point 596 (4000 K) on the chromaticity diagram (FIG. 38).

In some embodiments, the exemplary configuration shown in FIG. 4 includes the optical configuration of FIG. 35A. For example, with reference to FIG. 4, discussed above, first and second light input regions are alternately located along the light input edge, and each light source is associated with two adjacently located light input regions (e.g., a first light input region and a second light input region). In this example, the light source 114 corresponds to the light source 514 and the second light input region 143 includes a wavelength filter corresponding to wavelength filter 580. Rotation of the light guide and the light input regions relative to the light source, as well as apportionment of the incident light from the light source between the light input regions, has been described above in detail with reference to FIGS. 8B, 9B, and 10B.

In other embodiments, the exemplary configurations shown in FIGS. 29A-29D and 30-34 include the optical configuration of FIG. 35A. For example, the light source 114 corresponds to the light source 514 and the second light input region 143 includes a wavelength filter corresponding to wavelength filter 580. Rotation of the light guide and the light input regions relative to the light source, as well as apportionment of the incident light from the light source between the light input regions, has been described above.

Figure 39:
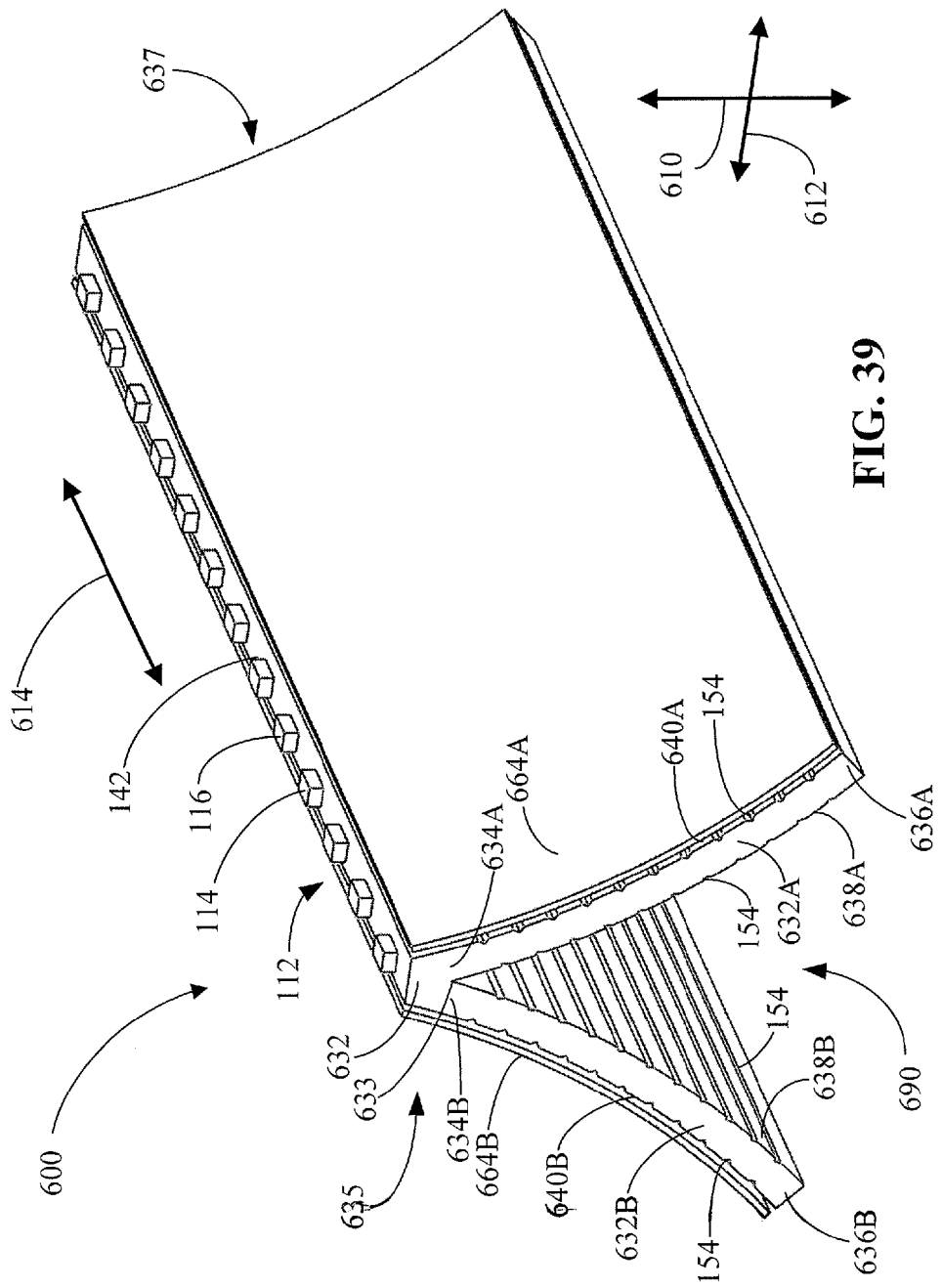
FIG. 39 is a schematic perspective view of an exemplary LED lighting assembly.
Figure 40:
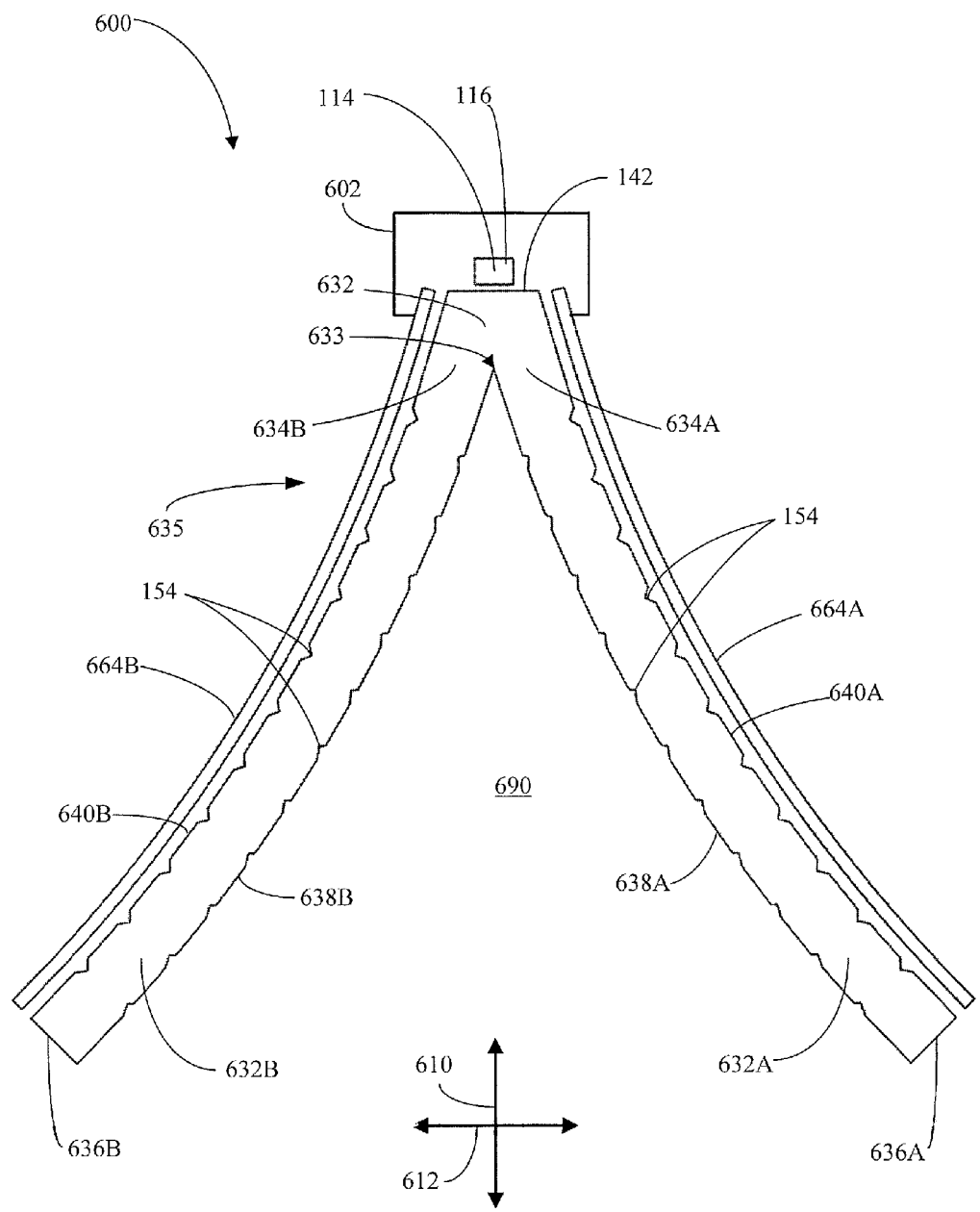
FIG. 40 is a schematic side view of the LED lighting assembly of FIG. 39.

In the exemplary embodiments of the LED lamp described above, the LED lamps include light guides that are rotatable around a longitudinal axis. Accordingly, such light guides are rotatable to vary the angular position of the light input edge relative to the light sources. Turning now to FIGS. 39 and 40, an exemplary LED lighting assembly is shown at 600. In the exemplary embodiment of the LED lighting assembly shown at 600, the light guide is a bifurcated light guide 632. The light guide and the light sources are linearly translated relative to each other along a width direction of the light guide.

The light guide 632 is a solid article of manufacture made from, for example, polycarbonate, poly(methyl-methacrylate) (PMMA), glass, or other appropriate material. The light guide may also be a multi-layer light guide having two or more layers that may differ in refractive index. In the embodiment shown, the light guide is formed from a signal element. In other embodiments, the light guide includes two or more light guide segments that collectively form the light guide. For example, the light guide 632 may be a unitary plastic product that is extruded or molded as a single monolithic part. Therefore, the light guide 632 does not have to be constructed from two or more parts. In other embodiments, the light guide 632 is constructed from two or more parts that are secured together (e.g., with adhesive).

The light guide includes light guide portions 632A and 632B. Each light guide portion 632A, 632B includes an inner major surface 638A, 638B and an outer major surface 640A, 640B. Each light guide portion 632A and 632B extends in a width direction 614 between a first end 635 and a second end 637; and extends in a length direction 610 perpendicular to the width direction 614 between a proximal end 634A, 634B and a distal end 636A, 636B. The respective major surfaces of the light guide portions 632A and 632B are oriented such that the inner major surfaces 638A, 638B face toward each other and the outer major surfaces 640A, 640B face away from each other. The volume in between the inner major surfaces is referred to as an internal volume 690.

The light guide portions 632A, 632B curve away from each other from the proximal ends 634A, 634B to the distal ends 636A, 636B such that the distal ends 636A, 636B are separated from each other in the length direction 610 and in a transverse direction 612 perpendicular to the width direction 614. For each light guide portion 632A, 632B, the distal end 636A, 636B is displaced from the proximal end 634A, 634B along the length direction 610 and transverse direction 612.

In some embodiments, the light guide 632 includes light extracting elements 154 in, on, or beneath at least one of the major surfaces 638, 640. Features of the light extracting elements 154, as well as methods of manufacturing light guides including light extracting elements 154, have already been described above. In the illustrated example, the light guide portions 632A, 632B have light extracting elements 154 on the inner major surfaces 638A, 638B and on the outer major surfaces 640A, 640B. The light extracting elements are exemplified as V-groove elements extending along the width direction 614.

The light guide portions 632A, 632B are each shown in FIG. 40 as having constant thickness between its proximal end 634A, 634B and its distal end 636A, 636B. However, in some embodiments, one or both of the light guide portions 632A, 632B to taper in thickness from its proximal end 634A, 634B to its distal end 636A, 636B. This reduction in thickness of the light guide portion will cause some of the light to be extracted from the light guide portion. Each light guide portion is also shown as having a constant curvature about an axis parallel to the width direction 614 from its proximal end 634A, 634B to its distal end 636A, 636B. In other embodiments, the curvature of one or both of the light guide portions 632A, 632B increases or decreases from its proximal end 634A, 634B to its distal end 636A, 636B.

The light guide 632 bifurcates into the two light guide portions 632A and 632B at a bifurcation region 633. The bifurcation region extends along the width direction 614 between the first end 635 and the second end 637. The proximal ends 634A, 634B of the light guide portions 632A and 632B meet at the bifurcation region 633.

The light guide includes a light input edge that extends along the width direction 614 between the first end 635 and the second 637. The bifurcation region is displaced from the light input edge along the length direction 610.

A light source assembly 112 is adjacent the light input edge 142. The light source assembly 112 includes light sources 114 arrayed along the light input edge 142 of the light guide 632 in the width direction 614. Each light source 114 is embodied as one or more solid-state light emitters 116. Features of the light source assembly 112, the light sources 114, as well as any structural components to retain the light source 114, have already been described above.

The light emitted from the light sources 114 enters the light guide 632 through the light input edge 142 and propagates toward the bifurcation region 633. The light then enters the light guide portions 632A, 632B through the respective proximal ends 634A, 634B and propagates along the light guide portions by total internal reflection at the respective inner major surface 638A, 638B and outer major surface 640A, 640B towards the respective distal ends 636A, 636B. Some of the light does not enter either light guide portion 632A, 632B but is extracted from the light guide through the bifurcation region 633 into the internal volume 690 between the light guide portions 632A and 632B.

Back reflectors 664A, 664B are juxtaposed with the outer major surfaces 640A, 640B of the light guide 632. In the example shown, the back reflector 664A, 664B conforms to the contour of the outer major surface 640A, 640B of the light guide portion 632A, 632B. Light extracted through the outer major surface 640A or 640B and incident the back reflector 664A or 664B is reflected back into the light guide, and may continue to propagate in the light guide via total internal reflection, or may be output through the inner major surface 638A, 638B. In some examples, the back reflector 664A, 664B is specularly reflective. In other examples, the back reflector 664A, 664B is diffusely reflective.

In some embodiments, when the LED lighting assembly is illuminated, a bright region may be visible due to the light being extracted from the light guide through the bifurcation region 633. In order to reduce the visibility of the bifurcation region, in some examples, a light redirecting element (not shown) is positioned in the internal volume between the inner major surfaces 638A, 638B. In an example, the light redirecting element extends in the width direction between the first end 635 and the second end 637, and extends in the transverse direction partway or all of the way between the inner major surfaces 638A, 638B. In the length direction, the light redirecting element can be positioned in close proximity to the proximal ends 634A, 634B of the light guide portions 632A, 632B, in close proximity to the distal ends 636A, 636B of the light guide portions 632A, 632B, or at an intermediate position in the length direction between the proximal ends 634A, 634B and the distal ends 636A, 636B.

The light redirecting element may be configured as a sheet, film, or substrate, and may be specularly reflective, diffusely reflective, or diffusely transmissive. A light redirecting film, sheet, or substrate that is diffusely transmissive may also be referred to as a diffuser. In another example, the light redirecting element is a member including a pattern of light redirecting optical elements (e.g., such as the light redirecting optical elements disclosed in U.S. Pat. No. 6,752,505) for redirecting the light incident thereon.

As an alternative to or in addition to a light redirecting element positioned in the internal volume, in some embodiments, one or more light redirecting elements (not shown) are positioned outside the internal volume 690 juxtaposed with the distal ends 636A, 636B of the light guide portions 632A, 632B. In an example, a light redirecting element is positioned such that light exiting the light guide through the distal end 636A, 636B is incident thereon. Additionally or alternatively, a light redirecting element can be juxtaposed with the internal volume 690 between the distal ends 636A, 636B such that light extracted through the inner major surface 638A, 638B or through the bifurcation region 633 is incident thereon. The light redirecting element can be attached to the light guide at the distal end or made integral with the distal end.

In some embodiments, the LED lighting assembly additionally includes a housing 602 (FIG. 40) for retaining the light source assembly 112 and the light guide 632. In an example, the housing 602 extends in the width direction 614 between the first end and the second end of the light guide 632. The housing 602 may function as a heat sink. Embodiments of the housing also include a light guide retaining member (not shown) that allows for the light guide 632 to be linearly translated relative to the light sources 114 along the width direction of the light guide 632.

For example, as discussed in the above embodiments, the proximal end retaining member can include a recess defined by side walls in which a portion of the light guide proximate the proximal end 142 is disposed. One or more through-holes can extend through the retaining member in the length direction, each light source 114 disposed in a respective through-hole.

Figure 41A:
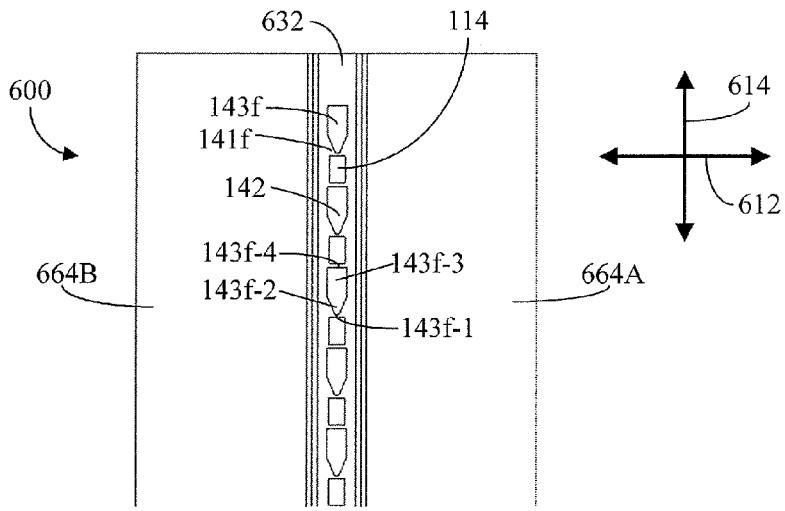
FIGS. 41A-41C are schematic plan views of exemplary positions of light sources relative to light input regions in the exemplary LED lighting assembly.
Figure 41B:
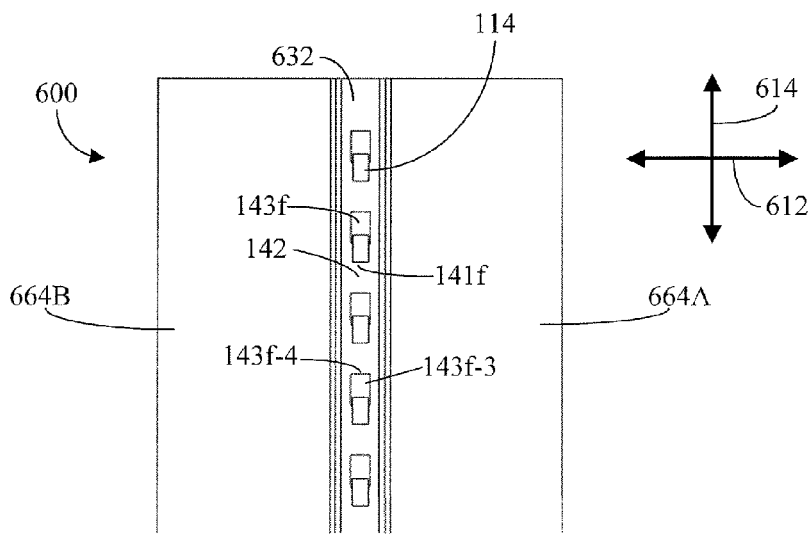
Figure 41C:
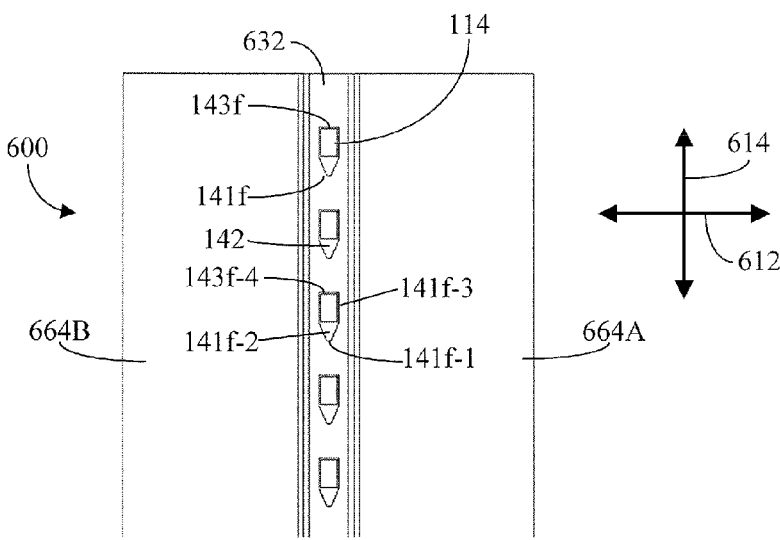

The light input edge includes light input regions. Each light source 114 is associated with multiple light input regions at the light input edge of the light guide 632. FIGS. 41A-41C are exemplary configuration of light input regions as shown relative to a light source 114. In FIGS. 41A-41C, each light source 114 is associated with first and second light input regions 141*f*, 143*f* on the light input edge 142. In this example, each second light input region 143*f* is a region including a spectrum adjuster, and the first light input region 141*f* is the remainder of the light input edge outside of the second light input regions. There is no spectrum adjuster present in the first light input region.

The second light input region including the spectrum-adjuster is configured to progressively adjust the combined spectrum of the light from the light source input to the light guide as a function of the linear translation of the light sources relative to the light guide along the width direction.

The second light input region 143*f* includes a spectrum adjuster, and may also be referred to as a spectrum-adjusting region. In one example, the spectrum adjuster is a color attenuating material, for example, a color filter. In another example, the spectrum adjuster is a wavelength-shifting material, for example, one or more of a phosphor material, a luminescent material, a luminescent nanomaterial such as a quantum dot material, a conjugated polymer material, an organic fluorescent dye, an organic phosphorescent dye, and lanthanide-doped garnet.

In some examples, the second light input region 143*f* is configured as a recessed pocket 145*f* in which a measured amount of spectrum-adjusting material (e.g., phosphor material such as an amber phosphor or a red phosphor) in a polymer matrix is applied and is cured. The second light input region 143*f* extends between end positions 143*f*-1 and 143*f*-4. The second light input region 143 has sub-region 143*f*-2 adjacent end position 143*f*-1 and sub-region 143*f*-3 adjacent 143*f*-4. In some embodiments, the thickness (in the longitudinal direction) of the spectrum adjuster is constant over the area of the recessed pocket recessed pocket 145*f*.

Sub-region 143*f*-3 is relatively wide, i.e., its dimension in the transverse direction is about the same as or greater than the extent of the light source in the transverse direction, and its dimension in the width direction is about the same as or greater than the extent of the light source in the width direction. In some embodiments, the sub-region 143*f*-3 is contiguous to itself and is sized to adjust the spectrum of substantially all light from the light source input to the light guide when the light source is positioned adjacent to the first sub-region by relative positioning of the light source and the light guide. In some embodiments, the sub-region 143*f*-2 is contiguous with the sub-region 143*f*-3 and extends in the width direction. The transverse dimension of sub-region 143*f*-2 tapers from sub-region 143*f*-3 to end position 143*f*-1. In other words, the dimension of the sub-region 143*f*-2 in the transverse direction decreases from sub-region 143*f*-3 to end position 143*f*-1 as a function of distance from sub-region 143*f*-3.

In FIG. 41A, the position of the light source 114 relative to the light guide is such that the light source 114 is overlapped with the first light input region 141*f*. In this case, there is negligible effect on the light from the spectrum adjuster. In FIG. 41B, the light source 114 is partly overlapped with the first light input region 141*f* and partly overlapped with the end position 143*f*-1 and the tapered sub-region 143*f*-2 of the second light input region 141. Therefore, there is some effect on the light from the spectrum adjuster. In FIG. 41C, the light source 114 is overlapped with the second light input region in the sub-region 143*f*-3, such that substantially all of the light from the light source incident on the light input edge is incident on the second light input region. Therefore there is more effect on the light from the spectrum adjuster than in FIG. 41B.

Other embodiments of the light input regions that have been discussed above can be utilized in connection with the proximal end 142. For example, with reference to FIG. 4, discussed above, first and second light input regions are alternately located along the light input edge, and each light source is associated with two adjacently located light input regions (e.g., a first light input region and a second light input region). FIGS. 8B, 9B, and 10B show apportionment of the incident light from the light source between the light input regions as a function of rotation of the light guide and the light input regions relative to the light source. In the embodiment of the LED lighting assembly 600, apportionment can be accomplished by translational movement of the light guide and the light sources. Apportionment of the incident light from the light source between the light input regions in such embodiment has already been described above.

Other embodiments of the light input regions such as those shown in FIGS. 29A-29D and 30-34 can be utilized in connection with the proximal end 142. Apportionment of the incident light from the light source between the light input regions in such embodiments, has been described above. In the embodiment of the LED lighting assembly 600, apportionment can be accomplished by translational movement of the light guide and the light sources.

Figure 42:
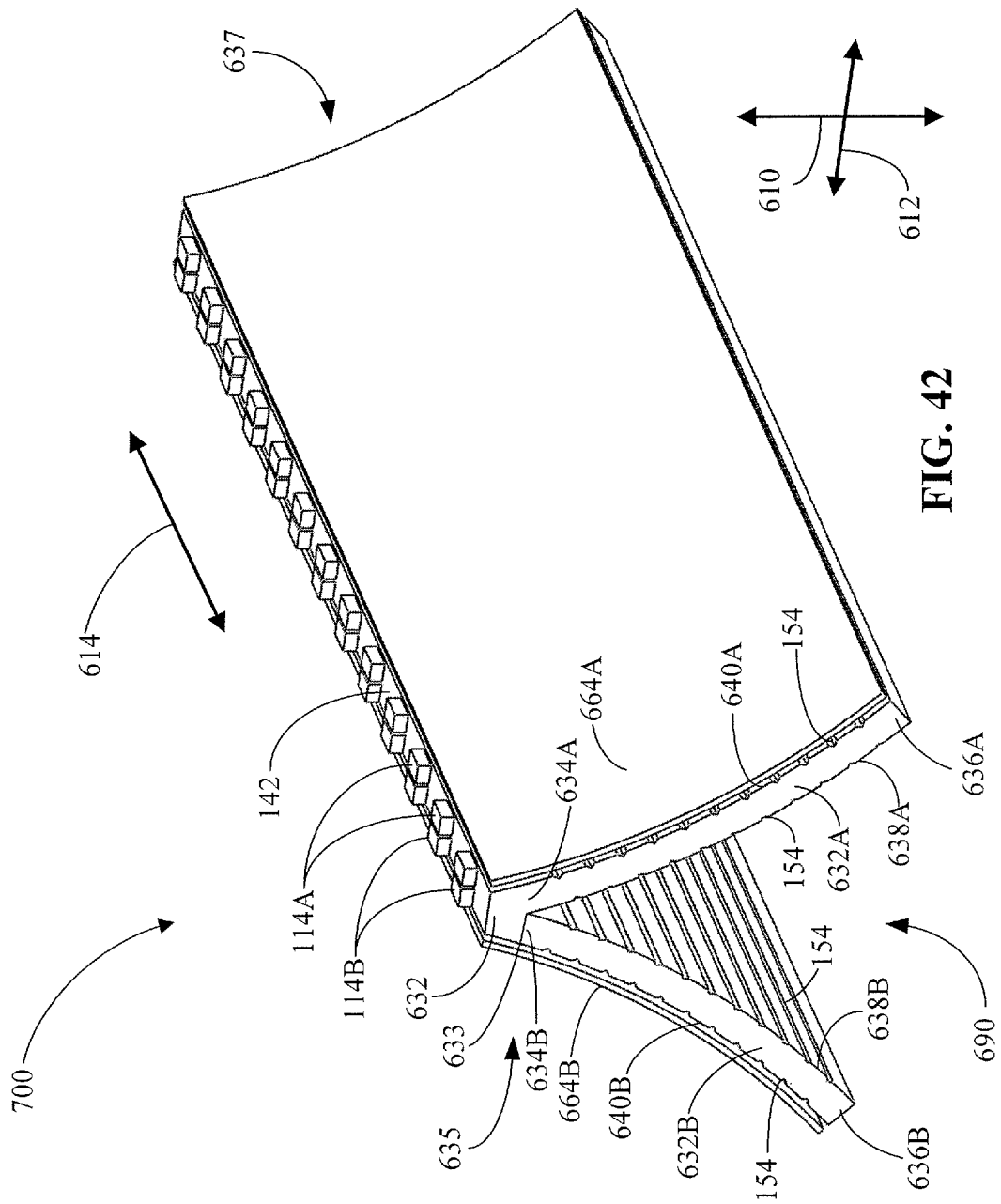
FIG. 42 is a schematic perspective view of another exemplary LED lighting assembly.

Referring now to FIG. 42, another exemplary embodiment of the LED lighting assembly is shown at 700. The LED lighting assembly 700 is similar to the LED lighting assembly 600, but includes a different embodiment of the light source. Specifically, the light sources 114 are divided into two groups of light sources 114A, 114B. Light sources 114A are closer to the proximal end 634A of light guide portion 632A than to the proximal end 634B of light guide portion 632B, and light sources 114B are closer to the proximal end 634B of light guide portion 632B than to the proximal end 634A of light guide portion 632A. More of the light from light sources 114A enters light guide portion 632A than light guide portion 632B and more of the light from light sources 114B enters light guide portion 632B than light guide portion 632A. This arrangement of light sources may reduce the light that exits the light guide through the bifurcation region into the internal volume.

Although not specifically shown, the light input edge includes light input regions. Each light source 114 is associated with multiple light input regions at the light input edge of the light guide. For example, each light source 114 is associated with a first light input region 641 and a second light input region 643 similar to that discussed with reference to the LED lighting assembly 600. Features of the light input regions have already been described above.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

In accordance with one aspect of this disclosure, an LED lamp comprises: a light guide configured as an open-ended hollow body surrounding an internal volume and extending along a longitudinal axis between a proximal end and a distal end, the light guide comprising an inner major surface and an outer major surface; a housing at the proximal end of the light guide, the housing comprising a proximal end retaining member configured to retain the proximal end of the light guide, the light guide rotatable about the longitudinal axis relative to the housing and the proximal end retaining member to vary an angular position of the light guide relative to the housing and the proximal end retaining member; a light source fixedly mounted to the housing and adjacent a light input edge at the proximal end of the light guide to edge light the light guide such that light from the light source propagates along the light guide by total internal reflection at the outer and inner major surfaces, the light guide rotatable relative to the light source to vary an angular position of the light guide relative to the light source; and a spectrum-adjusting region fixedly mounted to the light input edge of the light guide and comprising a spectrum-adjusting material, the spectrum-adjusting region configured to progressively adjust the combined spectrum of the light from the light source input to the light guide as a function of the angular position of the light guide relative to the light source, the spectrum adjusting region comprising: a first sub-region contiguous to itself and sized to adjust the spectrum of substantially all light from the light source input to the light guide when the light source is positioned adjacent to the first sub-region by relative positioning of the light source and the light guide; and a second sub-region contiguous with the first sub-region and extending in a circumferential dimension, the second sub-region becoming smaller in a radial dimension as a function of distance from the first sub-region such that the second sub-region has a radial dimension less than the first sub-region.

In one embodiment, the spectrum-adjusting material comprises a wavelength-shifting material.

In one embodiment, the wavelength-shifting material comprises a phosphor.

In one embodiment, the light guide additionally comprises a recessed pocket at the light input edge, the wavelength-shifting material being disposed in the recessed pocket.

In one embodiment, a thickness of the wavelength-shifting material is constant over the area of the recessed pocket.

In one embodiment, the spectrum-adjusting material comprises a color-attenuating material.

In one embodiment, the first sub-region of the spectrum-adjusting region comprises a radial dimension about the same as or greater than the radial dimension of the light source and a circumferential dimension about the same as or greater than the circumferential dimension of the light source.

In one embodiment, the second sub-region tapers in the radial dimension as a function of distance from the first sub-region.

In one embodiment, the LED lamp comprises a light-redirecting region fixedly mounted to the light input edge of the light guide, the light output from the light source being apportioned between the light-redirecting region and the spectrum-adjusting region based on the relative positioning of the light guide and the light source.

In one embodiment, at least a portion of the light-redirecting region is shaped to be approximately complementary to the second sub-region of the spectrum-adjusting region in the radial dimension.

In one embodiment, the light-redirecting region comprises a light-scattering material.

In one embodiment, the light-scattering material comprises at least one of titanium dioxide, aluminum oxide, silicon dioxide, and micro beads.

In one embodiment, the light guide additionally comprises a secondary recessed pocket at the light input edge, the light-scattering material being disposed in the secondary recessed pocket.

In one embodiment, a thickness of the light-scattering material is constant over the area of the recessed pocket.

In one embodiment, the light guide comprises circumferential light guide segments, each circumferential light guide segment comprising a side surface extending along the longitudinal axis between the proximal end and the distal end, the side surface abutting a side surface of another respective circumferential light guide segment.

In one embodiment, the LED lamp comprises light extracting elements at at least one of the major surfaces of the light guide, the light extracting elements configured to extract light through at least one of the outer major surface and the inner major surface of the light guide.

In one embodiment, the shape of the light guide is substantially frustoconical.

In one embodiment, a proximal portion of the light guide extending along the longitudinal axis proximate the proximal end forms a cylinder, and a distal portion of the light guide extending along the longitudinal axis proximate the distal end is inwardly curved.

In one embodiment, the light source comprises a solid-state light emitter.

In one embodiment, the proximal end retaining member comprises a through-hole extending longitudinally therethrough, the light source disposed in the through-hole and the through-hole having a longitudinal dimension along the longitudinal axis, wherein the light source is recessed in the through-hole such that the proximal end retaining member defines a spacing between a light emitting surface of the light source and the light input edge.

In one embodiment, the LED lamp comprises a distal end retaining member configured to retain the distal end of the light guide.

In one embodiment, the distal end retaining member is fixedly mounted to the distal end of the light guide and is configured to rotate with the light guide about the longitudinal axis.

In one embodiment, the distal end retaining member is fixedly mounted to the proximal end retaining member.

In one embodiment, the LED lamp comprises a base coupled to the housing, the base configured to mechanically mount the light bulb and receive electrical power.

In one embodiment, the LED lamp conforms to the outer envelope of an A-series lamp.

In one embodiment, the LED lamp conforms to the outer envelope of a PAR lamp.

In accordance with another aspect of this disclosure, an LED lamp comprises: a light guide configured as an open-ended hollow body surrounding an internal volume and extending along a longitudinal axis between a proximal end and a distal end, the light guide comprising an inner major surface and an outer major surface, a proximal portion of the light guide extending along the longitudinal axis proximate the proximal end forming a cylinder, a distal portion of the light guide extending along the longitudinal axis proximate the distal end being inwardly curved; a housing at the proximal end of the light guide, the housing comprising a proximal end retaining member configured to retain the proximal end of the light guide, the proximal end retaining member comprising: a first circumferential wall having a first reflective circumferential surface abutting the outer major surface of the light guide and extending along the longitudinal axis proximate the proximal end to reflect light into the light guide; and a second circumferential wall having a second reflective circumferential surface abutting the inner major surface of the light guide and extending along the longitudinal axis between the proximal end and the distal end; a light source mounted to the housing and adjacent a light input edge at the proximal end of the light guide to edge light the light guide such that light from the light source propagates along the light guide by total internal reflection at the outer and inner major surfaces; and a distal end retaining member mounted to the second circumferential wall of the proximal end retaining member proximate the distal end of the light guide, the distal end retaining member configured to retain the distal end of the light guide, the distal end retaining member comprising a surface abutting the distal end of the light guide that is configured to redirect light from the light guide.

In one embodiment, the LED lamp comprises light extracting elements at at least one of the major surfaces of the light guide, the light extracting elements configured to extract light through at least one of the outer major surface and the inner major surface of the light guide.

In one embodiment, the light extracting elements comprise: at least one of V-grooves and lenticular grooves at the outer major surface and oriented substantially along the longitudinal direction; and micro-optical elements at the inner major surface.

In one embodiment, the light extracting elements comprise at least one of V-grooves, lenticular grooves, light-scattering elements, and micro-optical elements.

In one embodiment, the light extracting elements comprise: at least one of V-grooves and lenticular grooves at the outer major surface and oriented substantially along the longitudinal direction; and micro-optical elements at the inner major surface. In one embodiment, the light extracting elements comprise micro-optical elements characterized by a density ρ(x) per unit area as a function of position x along the light guide away from the proximal end and toward the distal end, wherein p (x) satisfies the following relationships:

$$\rho(x_1) < \rho(x_2); \text{ and}$$

$$\rho(x_2) > \rho(x_3);$$

where $x_3 > x_2 > x_1$, $x = x_1$ and $x = x_2$ are positions in the proximal portion, and $x = x_3$ is a position in the distal portion.

In one embodiment, the light extracting elements comprise micro-optical elements characterized by a density ρ(x) per unit area as a function of position x along the light guide away from the proximal end and toward the distal end, wherein ρ(x) satisfies the following relationships:

$$\rho(x_1) < \rho(x_2); \text{ and}$$

$$\frac{d\rho(x_2)}{dx} > \frac{d\rho(x_3)}{dx};$$

where $x_3 > x_2 > x_1$, $x = x_1$ and $x = x_2$ are positions in the proximal portion, and $x = x_3$ is a position in the distal portion.

In one embodiment, the light guide comprises circumferential light guide segments, each circumferential light guide segment comprising a side surface extending along the longitudinal axis between the proximal end and the distal end, the side surface abutting a side surface of another respective circumferential light guide segment.

In one embodiment, the distal end retaining member is configured to retain the distal end of the light guide, the distal end retaining member and the proximal end retaining member configured to collectively retain the light guide segments.

In one embodiment, the surface of the distal end retaining member abutting the distal end of the light guide comprises optical elements configured to redirect light output from the light guide and incident on the surface abutting the distal end.

In one embodiment, the surface of the distal end retaining member abutting the distal end of the light guide is a reflective surface.

In one embodiment, the distal end retaining member is smaller in circumference than the proximal end retaining member.

In one embodiment, the proximal end retaining member comprises a through-hole extending longitudinally therethrough, the light source disposed in the through-hole and the through-hole having a longitudinal dimension along the longitudinal axis, wherein the light source is recessed in the through-hole such that a the light input retaining member defines a spacing between a light emitting surface of the light source and the light input edge.

In one embodiment, the second reflective circumferential surface of the second circumferential wall comprises a diffusely reflecting surface.

In one embodiment, the LED lamp comprises a base coupled to the housing, the base configured to mechanically mount the light bulb and receive electrical power.

In one embodiment, the LED lamp conforms to the outer envelope of an A-series lamp.

In one embodiment, the LED lamp comprises vents extending through the housing to the internal volume.

In one embodiment, the light source comprises a solid-state light emitter.

In one embodiment, the light guide is rotatable about the longitudinal axis relative to the housing and the light source to vary a position of the light guide relative to the housing and the light source.

In one embodiment, the light input edge comprises light input regions, at least one of the light input regions associated with an optical modifying characteristic.

In one embodiment, light emitted from the light source is selectively apportioned between the light input regions so that a characteristic of the light output from the light bulb is modified based on the optical modifying characteristic of the at least one of the light input regions and the relative positioning of the light input regions and the light source.

In one embodiment, the LED lamp further comprises a spectrum-adjusting region fixedly mounted to the light input edge of the light guide and comprising a spectrum-adjusting material, the spectrum-adjusting region configured to progressively adjust the combined spectrum of the light from the light source input to the light guide as a function of the angular position of the light guide relative to the light source.

In one embodiment, the spectrum-adjusting material comprises a wavelength-shifting material.

In one embodiment, the light guide additionally comprises a recessed pocket at the light input edge, the wavelength-shifting material being disposed in the recessed pocket.

In one embodiment, the spectrum-adjusting material comprises a color-attenuating material.

In one embodiment, the spectrum-adjusting region comprises: a first sub-region contiguous to itself and sized to adjust the spectrum of substantially all light from the light source input to the light guide when the light source is positioned adjacent to the first sub-region by relative positioning of the light source and the light guide; and a second sub-region contiguous with the first sub-region and extending in a circumferential dimension, the second sub-region becoming smaller in a radial dimension as a function of distance from the first sub-region such that the second sub-region has a radial dimension less than the first sub-region.

In one embodiment, the second sub-region tapers in the radial dimension as a function of distance from the first sub-region.

In one embodiment, the LED lamp comprises a light-redirecting region fixedly mounted to the light input edge of the light guide, the light output from the light source being apportioned between the light-redirecting region and the spectrum-adjusting region based on the relative positioning of the light guide and the light source.

In one embodiment, at least a portion of the light-redirecting region is shaped to be approximately complementary to the second sub-region of the spectrum-adjusting region in the radial dimension.

In one embodiment, the light-redirecting region comprises a light-scattering material.

In one embodiment, the light guide additionally comprises a secondary recessed pocket at the light input edge, the light-scattering material being disposed in the secondary recessed pocket.

In accordance with another aspect of the disclosure, an LED lamp comprises: a light guide configured as an open-ended hollow body surrounding an internal volume and extending along a longitudinal axis between a proximal end and a distal end, the light guide comprising an inner major surface and an outer major surface, a proximal portion of the light guide extending along the longitudinal axis proximate the proximal end forming a cylinder, a distal portion of the light guide extending along the longitudinal axis proximate the distal end being inwardly curved, the light guide comprising circumferential light guide segments; a housing at the proximal end of the light guide, the housing comprising a proximal end retaining member configured to retain the proximal end of the light guide; a distal end retaining member configured to retain the distal end of the light guide, the distal end retaining member and the proximal end retaining member configured to collectively retain the light guide segments; and a light source mounted to the housing and adjacent a light input edge at the proximal end of the light guide to edge light the light guide such that light from the light source propagates along the light guide by total internal reflection at the outer and inner major surfaces; wherein the LED lamp is see-through such that when the light guide is not illuminated, an object on a first side of the LED lamp located adjacent the outer major surface of the light guide is visible through the light guide and through the internal volume from a second side of the LED lamp at a vantage point adjacent the outer major surface of the light guide and opposite the first side.

In one embodiment, the LED lamp comprises light extracting elements at at least one of the major surfaces of each light guide segment configured to extract light through at least one of the outer major surface and the inner major surface of the light guide.

In one embodiment, the LED lamp comprises the light extracting elements comprise: at least one of V-grooves and lenticular grooves at the outer major surface oriented substantially along the longitudinal axis; and micro-optical elements at the inner major surface.

In one embodiment, the light extracting elements comprise: at least one of V-grooves and lenticular grooves at the outer major surface and oriented substantially along the longitudinal direction; and micro-optical elements at the inner major surface. In one embodiment, the light extracting elements comprise micro-optical elements characterized by a density $\rho(x)$ per unit area as a function of position x along the light guide away from the proximal end and toward the distal end, wherein $\rho(x)$ satisfies the following relationships:

$\rho(x_1)<\rho(x_2);$ and $\rho(x_2)>\rho(x_3);$ where $x_3>x_2>x_1$, $x=x_1$ and $x=x_2$ are positions in the proximal portion, and $x=x_3$ is a position in the distal portion.

In one embodiment, the light extracting elements comprise micro-optical elements characterized by a density $\rho(x)$ per unit area as a function of position x along the light guide away from the proximal end and toward the distal end, wherein p(x) satisfies the following relationships:

$\rho(x_1)<\rho(x_2);$ and $$\frac{d\rho(x_2)}{dx} > \frac{d\rho(x_3)}{dx};$$

where $x_3>x_2>x_1$, $x=x_1$ and $x=x_2$ are positions in the proximal portion, and $x=x_3$ is a position in the distal portion.

In one embodiment, each circumferential light guide segment comprises a side surface extending along the longitudinal axis between the proximal end and the distal end, the side surface abutting a side surface of another respective circumferential light guide segment.

In one embodiment, the distal end retaining member comprises a surface abutting the distal end of the light guide, the surface abutting the distal end comprising optical elements configured to redirect light output from the light guide and incident on the surface abutting the distal end.

In one embodiment, the distal end retaining member comprises a reflective surface abutting the distal end of the light guide.

In one embodiment, the distal end retaining member comprises a transparent material.

In one embodiment, the distal end retaining member is smaller in circumference than the proximal end retaining member.

In one embodiment, the proximal end retaining member comprises a reflective circumferential surface extending along the longitudinal axis proximate the proximal portion of the light guide and abutting the outer major surface of the light guide to reflect light into the light guide.

In one embodiment, the proximal end retaining member comprises a through-hole extending longitudinally therethrough, the light source disposed in the through-hole and the through-hole having a longitudinal dimension along the longitudinal axis, wherein the light source is recessed in the through-hole such that the light input retaining member defines a spacing between a light emitting surface of the light source and the light input edge.

In one embodiment, the LED lamp comprises a base coupled to the housing, the base configured to mechanically mount the light bulb and receive electrical power.

In one embodiment, the LED lamp comprises an electronics module disposed in the housing, the electronics module configured to receive electrical power from the base and provide electrical power to the light source.

In one embodiment, the LED lamp comprises a protective cover covering the electronics module, the protective cover facing toward the interior volume and the comprising a diffusely reflecting surface.

In one embodiment, the LED lamp conforms to the outer envelope of an A-series lamp.

In one embodiment, the LED lamp comprises vents extending through the housing to the internal volume of the light guide.

In one embodiment, the internal volume of the light guide is devoid of a heat sink.

In one embodiment, the light source comprises a solid-state light emitter.

In accordance with another aspect of the disclosure, an LED lamp comprises: a housing configured as an open-ended hollow body surrounding an internal volume and defining a longitudinal axis; a light guide disposed within the internal volume of the housing, the light guide configured as an open-ended hollow body extending along the longitudinal axis between a proximal end and a distal end and comprising an inner major surface and an outer major surface; a light source mounted to the housing and adjacent a light input edge at the proximal end of the light guide to edge light the light guide such that light from the light source propagates along the light guide by total internal reflection at the outer and inner major surfaces; and an adjustment member fixedly mounted to the light guide at the distal end and moveably mounted to the housing so that the adjustment member is rotatable relative to the housing to vary an angular position of the light guide relative to the housing and the light source, the adjustment member holding the light guide within the internal volume of the housing.

In one embodiment, the adjustment member comprises a reflective surface configured to reflect a portion of the light output from the distal end of the light guide and incident thereon in a direction having a greater longitudinal component than the longitudinal component of the light prior to being incident on the reflective surface.

In one embodiment, the reflective surface extends in a direction oblique to the longitudinal axis.

In one embodiment, the light guide comprises radially extending recesses at the distal end of the light guide; and the adjustment member comprises radial retaining tabs complementary to the recesses and respectively disposed therein.

In one embodiment, the adjustment member is annular in shape and is adjacent the outer major surface of the light guide and extending beyond the distal end of the light guide.

In one embodiment, the adjustment member comprises a control tab mechanically coupled to the housing.

In one embodiment, the control tab is manually rotatable between predetermined positions along the housing so that the light guide is rotatable between predetermined angular positions relative to the light source.

In one embodiment, the adjustment member additionally comprises a back reflector adjacent the outer major surface of the light guide and extending along at least a portion of the light guide between the proximal end and the distal end.

In one embodiment, the light input edge comprises light input regions, at least one of the light input regions associated with an optical modifying characteristic.

In one embodiment, light emitted from the light source is selectively apportioned between the light input regions so that a characteristic of the light output from the light bulb is modified based on the optical modifying characteristic of the at least one of the light input regions and the relative positioning of the light input regions and the light source.

In one embodiment, the light input regions are rotatable relative to the light source between a first angular position wherein more of the light emitted from the light source is incident on one of the light input regions than on another of the light input regions, and a second angular position wherein similar portions of the light emitted from the light source are respectively incident on the one of the light input regions and on the other of the light input regions.

In one embodiment, the at least one of the light input regions comprises a spectrum adjuster that modifies a spectrum of the light input to the light guide.

In one embodiment, the spectrum adjuster comprises a color-attenuating material.

In one embodiment, the spectrum adjuster comprises a wavelength-shifting material.

In one embodiment, another of the light input regions is specularly transmissive.

In one embodiment, the light emitted from the light source and incident on the spectrum adjuster in one of the light input regions is input to the light guide with a first spectrum; the light emitted from the light source and incident on another of the light input regions is input to the light guide with a second spectrum, different from the first spectrum; and light input to the light guide with the first spectrum and light input to the light guide with the second spectrum mix in the light guide such that the light has a combined spectrum that is the combination of the first spectrum and the second spectrum weighted in accordance with the apportioning of the light between the one of the light input regions and the other of the light input regions.

In one embodiment, the LED lamp comprises light extracting elements at at least one of the major surfaces of the light guide configured to extract light through at least one of the outer major surface and the inner major surface of the light guide.

In one embodiment, the light guide comprises circumferential light guide segments.

In one embodiment, each light guide segment comprises a radially extending recess at the distal end; and the adjustment member comprises radial retaining tabs complementary to the recesses and respectively disposed therein.

In one embodiment, the adjustment member comprises a frame portion adjacent the outer major surface of the light guide segments and extending between the proximal end and the distal end, wherein: each light guide segment additionally comprises a radially extending recess at the proximal end; and the frame portion comprises additional radial retaining tabs complementary to the recesses at the proximal end and respectively disposed therein.

In one embodiment, the shape of the light guide is substantially frustoconical.

In one embodiment, the housing comprises a retaining member that retains the proximal end of the light guide, the retaining member comprising a recess in which the proximal end of the light guide is disposed, wherein the recess comprises a through-hole extending through the retaining member in the longitudinal direction, the light source disposed in the through-hole.

In one embodiment, the housing comprises a heat sink disposed in the internal volume for dissipating heat generated by the light source.

In one embodiment, the housing comprises radial fins extending outward from an outer surface of the housing for dissipating heat generated by the light source.

In one embodiment, the LED lamp comprises a base coupled to the housing, the base configured to mechanically mount the light bulb and receive electrical power.

In one embodiment, the light bulb conforms to the outer envelope of a PAR (parabolic aluminized reflector) lamp.

In accordance with another aspect of the disclosure, an adjustment member is provided for adjusting the angular position of a light guide relative to a housing, the light guide disposed within an internal volume of the housing and configured as an open-ended hollow body extending along a longitudinal axis between a proximal end and a distal end, the light guide configured to propagate light by total internal reflection at inner and outer major surfaces, the adjustment member comprising: retaining tabs configured to fixedly mount to the distal end of the light guide; and a control tab configured to movably mount to the housing and allow rotation of the adjustment member and the light guide relative to the housing.

In one embodiment, the LED lamp comprises a reflective surface configured to reflect light output from the distal end of the light guide and incident thereon in a direction having a greater longitudinal component than the longitudinal component of the light prior to being incident on the reflective surface.

In one embodiment, the adjustment member is annular in shape and is configured to extend beyond the distal end of the light guide.

In one embodiment, the adjustment member comprises a back reflector configured to extend along at least a portion of the light guide between the proximal end and the distal end adjacent the outer major surface.

In one embodiment, the adjustment member comprises a frame portion configured to extend between the proximal end and the distal end of the light guide adjacent the outer major surface.

In one embodiment, the frame portion comprises additional radial retaining tabs configured to fixedly mount to the proximal end of the light guide.

In accordance with another aspect of the disclosure, an LED lamp comprises: a housing; a light guide moveably mounted to the housing, the light guide comprising opposed major surfaces configured to propagate light by total internal reflection and a light input edge; a light source fixedly mounted to the housing to edge light the light guide through the light input edge such that light from the light source propagates along the light guide by total internal reflection at the opposed major surfaces, and such that the light guide is moveable relative to the light source to vary a position of the light input edge relative to the light source, the light source comprising: a pump light emitter emitting pump light having at least one peak in a wavelength range of 400 nm-470 nm; and a wavelength shifter configured to absorb and re-emit some of the pump light as down-converted light in a wavelength range of x nm-700 nm, the pump light and the down-converted light constituting source light output from the light source, x nm being 50 nm greater than the wavelength corresponding to the at least one peak of the pump light; a spectrum-adjusting region fixedly mounted to the light input edge of the light guide, the spectrum-adjusting region comprising a wavelength filter configured to transmit the source light incident thereon at normal incidence with a transmittance in a range 85%-100% in a wavelength range of x nm-650 nm and reflect the source light incident thereon at normal incidence with a reflectance in a range of 45%-75% at a wavelength corresponding to the at least one peak of the pump light, the spectrum-adjusting region configured to progressively adjust the combined spectrum of the light from the light source input to the light guide as a function of the position of the light guide relative to the light source.

In one embodiment, the wavelength filter is additionally configured to transmit the source light incident thereon with a transmittance in a range 90%-100% in the wavelength range of x nm-650 nm.

In one embodiment, the wavelength filter is additionally configured to transmit the source light incident thereon at normal incidence with a transmittance in a range 85%-100% in a wavelength range of x nm-700 nm.

In one embodiment, the wavelength filter is additionally configured to transmit the source light incident thereon at normal incidence with a transmittance in a range 85%-100% in a wavelength range of x nm-750 nm.

In one embodiment, the wavelength filter is additionally configured to reflect the source light incident thereon at normal incidence with a reflectance in a range of 50%-70% at the wavelength corresponding to the at least one peak of the pump light.

In one embodiment, the wavelength filter is additionally configured to reflect the source light incident thereon at normal incidence with a reflectance in a range of 55%-65% at the wavelength corresponding to the at least one peak of the pump light.

In one embodiment, the wavelength filter is additionally configured to reflect the source light incident thereon at normal incidence with a reflectance in a range of 45%-75% in a wavelength range of 20 nm centered on the wavelength corresponding to the at least one peak of the pump light.

In one embodiment, the wavelength filter is additionally configured to reflect the source light incident thereon at normal incidence with a reflectance in a range of 45%-75% in a wavelength range of 30 nm centered on the wavelength corresponding to the at least one peak of the pump light.

In one embodiment, the pump light emitter comprises a blue LED or a violet LED.

In one embodiment, the light source comprises a white LED.

In one embodiment, the wavelength shifter comprises at least one of a phosphor and a luminescent nanomaterial.

In one embodiment, the LED lamp comprises light extracting elements at at least one of the major surfaces of the light guide, the light extracting elements configured to extract light through at least one of the outer major surface and the inner major surface of the light guide.

In one embodiment, the light guide is configured as an open-ended hollow body surrounding an internal volume and extending along a longitudinal axis between a proximal end and a distal end, the light input edge located at the proximal end.

In one embodiment, the shape of the light guide is substantially frustoconical.

In one embodiment, a proximal portion of the light guide extending along the longitudinal axis proximate the proximal end forms a cylinder, and a distal portion of the light guide extending along the longitudinal axis proximate the distal end is inwardly curved.

In one embodiment, the spectrum adjusting region comprises: a first sub-region contiguous to itself and sized to adjust the spectrum of substantially all light from the light source input to the light guide when the light source is positioned adjacent to the first sub-region by relative positioning of the light source and the light guide; and a second sub-region contiguous with the first sub-region and extending in a circumferential dimension, the second sub-region becoming smaller in a radial dimension as a function of distance from the first sub-region such that the second sub-region has a radial dimension less than the first sub-region.

In one embodiment, the second sub-region tapers in the radial dimension as a function of distance from the first sub-region.

In one embodiment, the light guide additionally comprises a recessed pocket at the light input end, the wavelength filter being disposed in the recessed pocket.

In accordance with another aspect of the disclosure, an LED lighting assembly comprises: a housing; a bifurcated light guide mounted to the housing, the bifurcated light guide configured to propagate light by total internal reflection, the bifurcated light guide comprising: a light input edge extending along a width direction; a bifurcation region extending along the width direction, the bifurcation region displaced from the light input edge along a length direction perpendicular to the width direction; first and second light guide portions extending along the width direction and extending from the bifurcation region along the length direction, each light guide portion comprising a proximal end proximate the bifurcation region, a distal end distal the bifurcation region, an outer major surface, and an inner major surface, the inner major surfaces facing toward each other and the outer major surfaces facing away from each other, the light guide portions curving away from each other from the proximal ends to the distal ends such that the distal ends are separated from each other in a transverse direction perpendicular to the width direction and the length direction; and a light source mounted to the housing to edge light the light guide through the light input edge such that light from the light source enters the light guide portions through the respective proximal ends and propagates along the light guide portions by total internal reflection at the respective inner and outer major surfaces toward the respective distal ends.

In one embodiment, at least one of the light guide portions tapers in thickness from the proximal end to the distal end.

In one embodiment, a curvature of at least one of the light guide portions increases from the proximal end to the distal end.

In one embodiment, the LED lighting assembly comprises light extracting elements at at least one of the major surfaces of at least one of the light guide portions, the light extracting elements configured to extract light through at least one of the respective outer major surface and the inner major surface.

In one embodiment, the LED lighting assembly comprises a light redirecting element configured to redirect light output from the distal end of at least one of the light guide portions.

In one embodiment, the light redirecting element comprises a diffuser.

In one embodiment, the light redirecting element is integral with the distal end.

In one embodiment, the LED lighting assembly comprises a light redirecting element positioned between the light guide portions.

In one embodiment, the light redirecting element comprises a diffuser.

In one embodiment, the LED lighting assembly comprises a reflective surface juxtaposed the outer major surface of at least one of the light guide portions.

In one embodiment, the light guide is moveable relative to the housing and the light source to vary a position of the light guide relative to the housing and the light source.

In one embodiment, the light input edge comprises light input regions, at least one of the light input regions associated with an optical modifying characteristic.

In one embodiment, light emitted from the light source is selectively apportioned between the light input regions so that a characteristic of the light output from the light bulb is modified based on the optical modifying characteristic of the at least one of the light input regions and the relative positioning of the light input regions and the light source.

In one embodiment, the LED lighting assembly further comprises a spectrum-adjusting region fixedly mounted to the light input edge of the light guide and comprising a spectrum-adjusting material, the spectrum-adjusting region configured to progressively adjust the combined spectrum of the light from the light source input to the light guide as a function of the position of the light guide relative to the light source.

In one embodiment, the spectrum adjusting region comprises: a first sub-region contiguous to itself and sized to adjust the spectrum of substantially all light from the light source input to the light guide when the light source is positioned adjacent to the first sub-region by relative positioning of the light source and the light guide; and a second sub-region contiguous with the first sub-region and extending in the width dimension, the second sub-region becoming smaller in the transverse dimension as a function of distance from the first sub-region such that the second sub-region has a transverse dimension less than the first sub-region.

In one embodiment, the first sub-region of the spectrum-adjusting region comprises a transverse dimension about the same as or greater than the transverse dimension of the light source and a width dimension about the same as or greater than the width dimension of the light source.

In one embodiment, the second sub-region tapers in the transverse dimension as a function of distance from the first sub-region.

In one embodiment, the light guide additionally comprises a recessed pocket at the light input edge, the spectrum-adjusting material being disposed in the recessed pocket.

In one embodiment, the spectrum-adjusting material comprises a wavelength-shifting material.

In one embodiment, the LED lighting assembly comprises a light-redirecting region fixedly mounted to the light input edge of the light guide and comprising a light-redirecting material, the light output from the light source being apportioned between the light-redirecting region and the spectrum-adjusting region based on the relative positioning of the light input edge and the light source.

In one embodiment, at least a portion of the light-redirecting region is shaped to be approximately complementary to the second sub-region of the spectrum-adjusting region in the radial dimension.

In one embodiment, the light-redirecting material comprises a light-scattering material.

In one embodiment, the light source comprises a solid-state light emitter.

In one embodiment, the light source comprises a first group of light sources and a second group of light sources, the first group of light sources positioned to output more light toward the proximal end of a first one of the light guide portions than to the proximal end of a second one of the light guide portions, and the second group of light sources positioned to output more light toward the proximal end of the second one of the light guide portions than to the proximal end of the first one of the light guide portions.

What is claimed is:

1. An LED lighting assembly, comprising:
   a bifurcated light guide configured to propagate light by total internal reflection, the bifurcated light guide comprising:
      a light input edge extending along a width direction;
      a bifurcation region extending along the width direction, the bifurcation region displaced from the light input edge along a length direction perpendicular to the width direction; and
      first and second light guide portions extending along the width direction and extending from the bifurcation region along the length direction, each light guide portion comprising a proximal end proximate the bifurcation region, a distal end distal the bifurcation region, an outer major surface, and an inner major surface, the inner major surfaces facing toward each other and the outer major surfaces facing away from each other, the distal ends separated from each other in a transverse direction perpendicular to the width direction and the length direction; and
   a light source juxtaposed the light input edge to edge light the light guide through the light input edge such that light from the light source enters the light guide portions through the respective proximal ends and propagates along the light guide portions by total internal reflection at the respective inner and outer major surfaces toward the respective distal ends.

2. The LED lighting assembly of claim 1, wherein a curvature of at least one of the light guide portions extending toward the distal end decreases in the transverse direction.

3. The LED lighting assembly of claim 1, wherein a curvature of at least one of the light guide portions extending toward the distal end increases in the transverse direction.

4. The LED lighting assembly of claim 1, wherein at least one of the light guide portions tapers in thickness from the proximal end to the distal end.

5. The LED lighting assembly of claim 1, additionally comprising light extracting elements at at least one of the major surfaces of at least one of the light guide portions, the light extracting elements configured to extract light through at least one of the respective outer major surface and the inner major surface.

6. The LED lighting assembly of claim 1, additionally comprising a light redirecting element juxtaposed the distal end of at least one of the light guide portions, the light redirecting element configured to redirect light output from the distal end.

7. The LED lighting assembly of claim 1, additionally comprising a light redirecting element positioned between the inner major surfaces of the light guide portions, the light redirecting element configured to redirect light output from at least one of the first light guide portion, the second light guide portion, and the bifurcation region.

8. The LED lighting assembly of claim 7, wherein the light redirecting element is diffusive.

9. The LED lighting assembly of claim 1, additionally comprising a reflective surface juxtaposed the outer major surface of at least one of the light guide portions.

10. The LED lighting assembly of claim 1, additionally comprising a housing configured to retain the bifurcated light guide and the light source.

11. The LED lighting assembly of claim 1, wherein the light guide is moveable relative to the light source to vary a position of the light guide relative to the housing and the light source.

12. The LED lighting assembly of claim 11, wherein the light input edge comprises light input regions, at least one of the light input regions associated with an optical modifying characteristic, wherein light emitted from the light source is selectively apportioned between the light input regions so that a characteristic of the light output from the lighting assembly is modified based on the optical modifying characteristic of the at least one of the light input regions and the relative positioning of the light input regions and the light source.

13. The LED lighting assembly of claim 1, wherein the bifurcated light guide is constructed from two or more light guide parts.

14. The LED lighting assembly of claim 1, wherein the light source comprises a solid-state light emitter.

15. A bifurcated light guide configured to propagate light by total internal reflection, the bifurcated light guide comprising:
　a light input edge extending along a width direction;
　a bifurcation region extending along the width direction, the bifurcation region displaced from the light input edge along a length direction perpendicular to the width direction; and
　first and second light guide portions extending along the width direction and extending from the bifurcation region along the length direction, each light guide portion comprising a proximal end proximate the bifurcation region, a distal end distal the bifurcation region, an outer major surface, and an inner major surface, the inner major surfaces facing toward each other and the outer major surfaces facing away from each other, the distal ends separated from each other in a transverse direction perpendicular to the width direction and the length direction.

16. The bifurcated light guide of claim 15, wherein a curvature of at least one of the light guide portions extending toward the distal end decreases in the transverse direction.

17. The bifurcated light guide of claim 15, wherein a curvature of at least one of the light guide portions extending toward the distal end increases in the transverse direction.

18. The bifurcated light guide of claim 15, additionally comprising light extracting elements at at least one of the major surfaces of at least one of the light guide portions, the light extracting elements configured to extract light through at least one of the respective outer major surface and the inner major surface.

19. The bifurcated light guide of claim 15, additionally comprising a light redirecting element juxtaposed the distal end of at least one of the light guide portions, the light redirecting element configured to redirect light output from the distal end.

20. The bifurcated light guide of claim 15, wherein the bifurcated light guide is constructed from two or more light guide parts.

* * * * *